US012646061B2

(12) United States Patent
Madisetti et al.

(10) Patent No.: US 12,646,061 B2
(45) Date of Patent: *Jun. 2, 2026

(54) METHODS AND SYSTEMS FOR FORENSIC INVESTIGATIONS IN CONTRACT NETWORKS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/328,973

(22) Filed: Sep. 15, 2025

(65) Prior Publication Data

US 2026/0017650 A1 Jan. 15, 2026

Related U.S. Application Data

(60) Continuation of application No. 19/249,061, filed on Jun. 25, 2025, now Pat. No. 12,443,954, which is a
(Continued)

(51) Int. Cl.
*G06Q 20/38* (2012.01)
*H04L 9/00* (2022.01)
(Continued)

(52) U.S. Cl.
CPC ......... *G06Q 20/389* (2013.01); *G06Q 20/381* (2013.01); *H04L 9/3236* (2013.01);
(Continued)

(58) Field of Classification Search
CPC .............. G06Q 20/389; G06Q 20/381; G06Q 20/4016; G06Q 2220/00; H04L 9/3236;
(Continued)

(56) References Cited

U.S. PATENT DOCUMENTS 10,318,956 B2 * 6/2019 Shah .................. G06Q 20/4015
10,742,393 B2 * 8/2020 Wooden ................ G06F 21/123
(Continued)

FOREIGN PATENT DOCUMENTS

WO WO-2019094797 A1 * 5/2019 ........... G06Q 20/223

OTHER PUBLICATIONS

Apache HTTP Server Version 2.4, Apache MPM worker, retrieved from https://web.archive.org/web/20170105233133/http://httpd.apache.org/docs/2.4/mod/worker.html , scrape date of Jan. 5, 2017, 3 pages, hereinafter referred to as Apache (Year: 2017).*
(Continued)

*Primary Examiner* — James D Nigh
(74) *Attorney, Agent, or Firm* — Daniel C. Pierron; Widerman Malek, PL

(57) ABSTRACT

Systems and methods of blockchain value transfer utilizing a smart contract system including processing transaction requests, performing a balance check procedure on each transaction request based on an aggregation of credits and debits, determining by the smart contract system a net transaction amount for each account address comprised by an aggregate transaction record, and executing the net transaction amount for each account address by transacting tokens to and from the account addresses and receiving account addresses included in the transaction requests upon reaching an execution condition.

25 Claims, 45 Drawing Sheets

Aggregation of In-Network Tokens

2000 Tom 2002 Mary 2004 Joe 2006 Jerry

2008 ---→ Tom
2010 ---→ Mary
2012 ---→ Joe
2014 ---→ Jerry

+4 2024
+3 2020
+6 2022
+9 2028
+7 2026

4
18
7

3 10 7

Joe = Net debit of (7-18) = 11 in-network tokens = (-) 5.5 tethered tokens
Tom = Net debit of 1 in-network tokens = (-) 0.5 tethered tokens
Mary = Net credit of (4+6) = 10 in-network tokens = (+) 5 tethered tokens
Jerry = Net debit of (7-9) = 2 in-network tokens = (-) 1 tethered tokens Conversion ratio:
2 in-network tokens = 1 tethered token

Related U.S. Application Data continuation of application No. 18/743,993, filed on Jun. 14, 2024, now Pat. No. 12,373,830, which is a continuation of application No. 18/422,755, filed on Jan. 25, 2024, now Pat. No. 12,067,559, which is a continuation-in-part of application No. 17/822,303, filed on Aug. 25, 2022, now Pat. No. 11,915,237, which is a continuation of application No. 17/647,776, filed on Jan. 12, 2022, now Pat. No. 11,494,764, which is a continuation-in-part of application No. 16/744,231, filed on Jan. 16, 2020, now Pat. No. 11,861,609, which is a division of application No. 16/396,845, filed on Apr. 29, 2019, now abandoned, which is a continuation-in-part of application No. 15/976,910, filed on May 11, 2018, now Pat. No. 10,853,772.

(60) Provisional application No. 63/622,595, filed on Jan. 19, 2024, provisional application No. 62/818,798, filed on Mar. 15, 2019, provisional application No. 62/652,341, filed on Apr. 4, 2018.

(51) Int. Cl.

| | |
|---|---|
| *H04L 9/32* | (2006.01) |
| *G06F 16/901* | (2019.01) |
| *G06F 18/22* | (2023.01) |
| *G06F 18/24* | (2023.01) |
| *G06Q 20/40* | (2012.01) |

(52) U.S. Cl.
CPC .............. *H04L 9/3268* (2013.01); *H04L 9/50* (2022.05); *H04L 2209/56* (2013.01)

(58) Field of Classification Search
CPC ..... H04L 9/3268; H04L 9/50; H04L 2209/56; H04L 9/3213; H04L 9/3263; G06F 16/9024; G06F 18/22; G06F 18/24

USPC ........................................................ 705/44
See application file for complete search history.

(56) References Cited

U.S. PATENT DOCUMENTS

| | | | | |
|---|---|---|---|---|
| 11,689,616 | B2 * | 6/2023 | Novotny ................ | H04L 67/61 |
| | | | | 709/223 |
| 2018/0068282 | A1 * | 3/2018 | Patel .................... | G06Q 20/023 |
| 2018/0204216 | A1 * | 7/2018 | Jayaram .............. | G06Q 20/405 |
| 2018/0309567 | A1 * | 10/2018 | Wooden .................. | H04L 63/12 |
| 2019/0188706 | A1 * | 6/2019 | McCurtis .............. | H04L 9/3239 |
| 2019/0287100 | A1 | 9/2019 | Song et al. | |
| 2019/0318424 | A1 * | 10/2019 | McWilliams .......... | G06Q 20/10 |
| 2020/0286083 | A1 * | 9/2020 | Ma ........................ | H04L 9/3255 |
| 2020/0320529 | A1 * | 10/2020 | Lyadvinsky .......... | H04L 9/3239 |
| 2021/0073212 | A1 * | 3/2021 | Conley ................. | H04L 9/3213 |
| 2022/0129884 | A1 * | 4/2022 | Agrawal .............. | H04L 9/3218 |
| 2022/0172207 | A1 * | 6/2022 | Cella ..................... | G06N 20/00 |
| 2023/0004970 | A1 * | 1/2023 | Jakobsson ........... | G06Q 20/407 |

OTHER PUBLICATIONS

Xu et al "A Taxonomy of Blockchain-Based Systems for Architecture Design" 2017 IEEE International Conference on Software Architecture, created on Mar. 21, 2017 and modified on Dec. 11, 2018, pp. 243-252 (Year: 2018).*

Non-Final Office Action received in related U.S. Appl. No. 19/355,429 issued on Apr. 8, 2026; 51 pages.

Hu "Guide to using the Gnosis Multisig Wallet—ETH", Medium, Jan. 24, 2019, 27 pages (Year: 2019).

Berentsen, et al. Stablecoins: The quest for a low-volatility cryptocurrency, published in The Economics of Fintech and Digital Currencies, Mar. 2019, pp. 65-71 (Year: 2019).

* cited by examiner

| Command | Purpose |
|---|---|
| GET | Retrieve information about an account, contract, transaction, exchange rate for a token |
| SEND | Send value from one account to another account in same network |
| XSEND | Send value from one account to another account in another network |
| REQUEST | Request value from an account in the same network |
| XREQUEST | Request value from an account in another network |
| RESPOND | Accept or deny a request received from an account in the same network |
| XRESPOND | Accept or deny a request received from an account in the another network |
| SIGN | Sign and approve a transaction |

FIG. 8

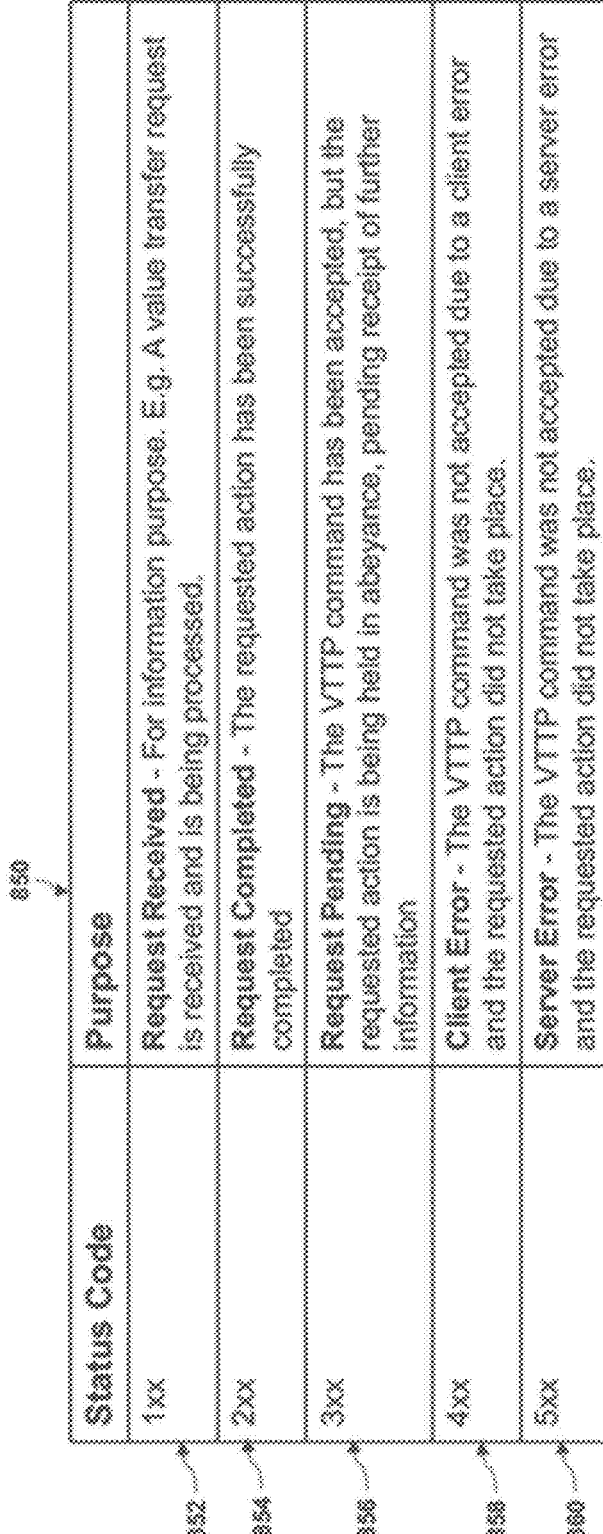

| Status Code | Purpose |
|---|---|
| 1xx | Request Received - For information purpose. E.g. A value transfer request is received and is being processed. |
| 2xx | Request Completed - The requested action has been successfully completed |
| 3xx | Request Pending - The VTTP command has been accepted, but the requested action is being held in abeyance, pending receipt of further information |
| 4xx | Client Error - The VTTP command was not accepted due to a client error and the requested action did not take place. |
| 5xx | Server Error - The VTTP command was not accepted due to a server error and the requested action did not take place. |

FIG. 16

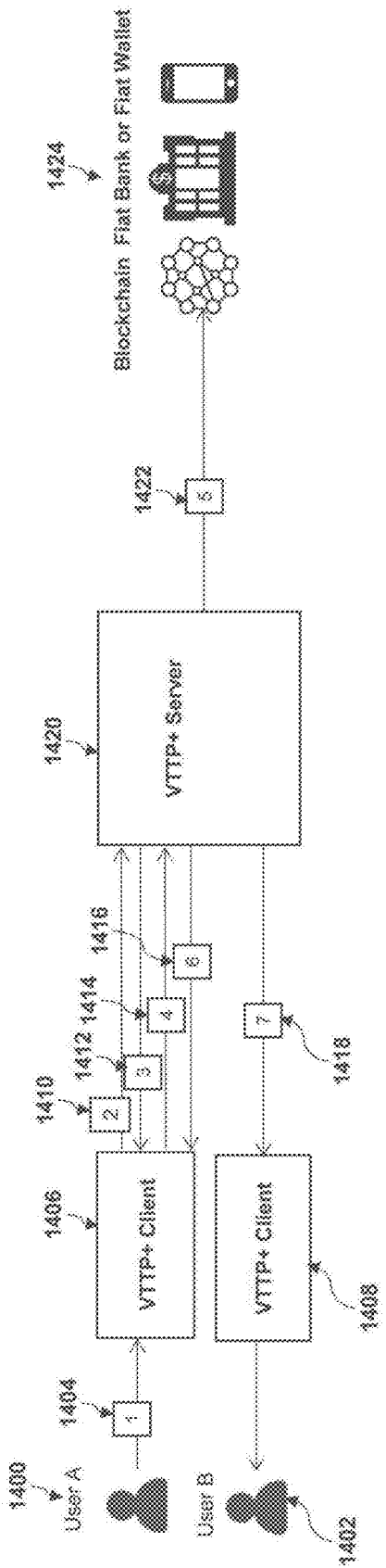

Blockchain  Fiat Bank or Fiat Wallet

1424

1422

1420  VTTP+ Server 1416
1414
1412
1410

1406  VTTP+ Client

1408  VTTP+ Client

1404

1400  User A

1402  User B

1418

| | |
|---|---|
| 1 | User A initiates an intra-entity value transfer request to send value (cryptocurrency, tokens or fiat currency) to User B |
| 2 | VTTP+ client sends a VTTP+ SEND request to the VTTP+ Server |
| 3 | VTTP+ Server generates a raw transaction and returns the same in SEND response |
| 4 | User A signs the raw transaction with the private key and VTTP+ Client sends the VTTP+ SIGN transaction |
| 5 | VTTP+ Server verifies the signature and broadcasts the transaction to the participating blockchain network, fiat bank or fiat wallet |
| 6 | User A receives a value transfer notification |
| 7 | User B receives a value transfer notification |

FIG. 21

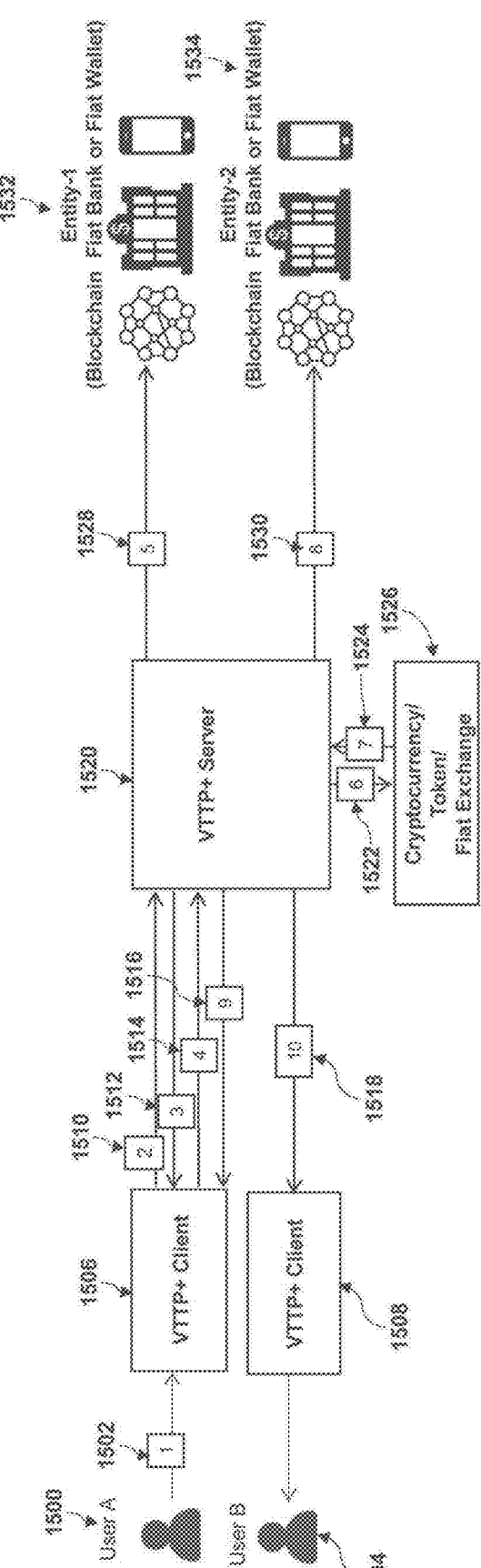

FIG. 22

1  User A initiates a cross entity value transfer request to User B

2  VTTP+ client sends a VTTP SEND request to the VTTP+ Server

3  VTTP+ Server generates a raw transaction and returns the same in SEND response.

4  User A signs the raw transaction with the private key and VTTP+ Client sends the VTTP SIGN transaction 5  VTTP+ Server verifies the signature and broadcasts the transaction to the Entity-1 (blockchain network, fiat bank or fiat wallet)

6  When the value transfer from User A account to Vault account on Entity-1 is confirmed, the value is sent to an Exchange account 7  Cryptocurrency, tokens or fiat currency are exchanged 8  The exchanged cryptocurrency, tokens or fiat currency are sent to User B account on Entity-2 (blockchain network, fiat bank or fiat wallet)

9  User A receives a value transfer notification

10  User B receives a value transfer notification

Actions 3516

- Smart Contract Transaction — 3518
- Webhook Trigger — 3520
- Log to External Data Store — 3522
- Email Notification — 3524
- SMS Notification — 3526
- Mobile Push Notification — 3528

HTTP/REST, WebSocket or Web3 — 3514

Consumer/Subscriber Client 3508

- Rules & Triggers — 3510
- Actions — 3512

HTTP/REST or WebSocket — 3506

Bulletin Board Server 3500

- Topic-1 — 3502
- Topic-N — 3504

METHODS AND SYSTEMS FOR FORENSIC INVESTIGATIONS IN CONTRACT NETWORKS

RELATED APPLICATIONS

This application is a continuation application of and claims priority under 35 U.S.C. § 120 of U.S. patent application Ser. No. 19/249,061 filed on Jun. 25, 2025 and titled METHODS AND SYSTEMS FOR FORENSIC INVESTIGATIONS IN CONTRACT NETWORKS, which in turn is a continuation application of and claims priority under 35 U.S.C. § 120 of U.S. patent application Ser. No. 18/743,993, now U.S. Pat. No. 12,373,830, issued Jul. 29, 2025 filed on Jun. 14, 2024 and titled METHODS AND SYSTEMS FOR FORENSIC INVESTIGATIONS IN CONTRACT NETWORKS, which in turn is a continuation application of and claims priority under 35 U.S.C. § 120 of U.S. patent application Ser. No. 18/422,755, now U.S. Pat. No. 12,067,559, issued Aug. 20, 2024 filed on Jan. 25, 2024 and titled METHODS AND SYSTEMS FOR FORENSIC INVESTIGATIONS IN CONTRACT NETWORKS, which in turn claims priority under 35 U.S.C. § 119(e) of U.S. Provisional Patent Application Ser. No. 63/622,595 filed on Jan. 19, 2024 and titled Forensics for Related Smart Contracts through Graphs, and is a continuation-in-part application of and claims priority under 35 U.S.C. § 120 of U.S. patent application Ser. No. 17/822,303, now U.S. Pat. No. 11,915,237, issued Feb. 27, 2024 filed on Aug. 25, 2022 and titled Methods and Systems for Smart Contracts for Security and Filtering, which in turn is a continuation application of and claims priority under 35 U.S.C. § 120 of U.S. patent application Ser. No. 17/647,776, now U.S. Pat. No. 11,494, 764, issued Nov. 8, 2022 filed on Jan. 12, 2022 and titled Methods and Systems for Smart Contracts for Security and Filtering, which in turn is a continuation-in-part application of and claims priority under 35 U.S.C. § 120 of U.S. patent application Ser. No. 16/744,231, now U.S. Pat. No. 11,861, 609, issued Jan. 2, 2024 filed on Jan. 16, 2020 and titled Method and System for Exchange of Value or Tokens Between Blockchain Networks, which in turn is a divisional application of and claims priority under 35 U.S.C. § 120 of U.S. patent application Ser. No. 16/396,845 filed on Apr. 29, 2019 and titled Method and System for Exchange of Value or Tokens Between Blockchain Networks, which in turn claims priority under 35 U.S.C. § 119(e) of U.S. Provisional Patent Application Ser. No. 62/818,798, filed on Mar. 15, 2019 and titled A Use Case Extension to the Value Token Transfer Protocol, and is a continuation-in-part application of and claims priority under 35 U.S.C. § 120 of U.S. patent application Ser. No. 15/976,910, now U.S. Pat. No. 10,853, 772, issued Dec. 1, 2020 filed on May 11, 2018 and titled Method and System for Exchange of Value or Tokens Between Blockchain Networks, which in turn claims priority under 35 U.S.C. § 119(e) of U.S. Provisional Patent Application Ser. No. 62/652,341, filed on Apr. 4, 2018 and titled Value Token Transfer Protocol—VTTP. The contents of these applications are incorporated herein by reference.

FIELD OF THE INVENTION

The present invention relates to Value Token Transfer Protocol (VTTP), a protocol for exchange of value or tokens within and between blockchain networks.

BACKGROUND OF THE INVENTION

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

Even though decentralized finance (DeFi) applications are becoming popular and entering mainstream adoption, there remain issues with respect to upgrades in smart contracts. A typical finance or DeFi application involves multiple parties which are linked through multiple smart contracts within the application. Currently there is no way to organize multiparty smart contracts (such as Swap contracts) and track their updates where each update is unique and can involve changes in parties and terms and is linked to previous contracts. For example, three new contracts resulting from one contract where the new contract references multiple older versions. Tracking updates to multi-party smart contracts is challenging. Upgrading smart contracts in general is difficult as smart contracts, by definition, are immutable once deployed on a blockchain. Deploying a new version of a contract can break the applications using the contract and result in loss of data stored in an older contract.

In addition to challenges related to upgrades, there are issues related to fraudulent transactions by hackers. Smart contract vulnerabilities can be exploited by hackers to steal funds stored in smart contracts, centralized or decentralized exchanges. Hackers can gain access to cryptocurrency wallets of users due to security leaks and smart contract vulnerabilities. Malicious actors can mint new tokens due to vulnerabilities in token smart contracts.

Smart contracts and decentralized applications built on blockchain networks have gained tremendous popularity. However, the irreversible and pseudonymous nature of blockchain transactions also enables criminal exploitation and fraud. Major incidents have resulted in billions in losses.

A common pattern is orchestrating fraud through collections of smart contracts that appear legitimate individually but enact illicit activity when their interactions are examined. For example, a network of contracts can enable circular self-dealing (round-tripping) to artificially inflate asset values, or obfuscate fund flows to bypass regulation. Different contracts are crafted to play specific roles in the scheme. Detecting such frauds requires evaluating groups of contracts holistically.

Most existing fraud identification approaches focus on validating individual contract code or analyzing transactions independently for anomalies. These have limitations when applied to detecting fraud propagated across networks. Smart contract code audits check for coding vulnerabilities, bugs, or specific malicious logic. However, the code may be clean while still playing a role in a broader fraud scheme. Transaction monitoring approaches scan transactions for anomalies in isolation, such as irregular values or frequencies. This misses legitimate transactions within wider illicit workflows. Activity profiling techniques compare contract behaviors to profiles of known fraud types. However, new fraud patterns involving collusion may be missed. All these existing solutions examine contracts in separation. Therefore, new techniques assessing collective behaviors are required to identify sophisticated fraud orchestrated across multiple contracts collaborating together.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for exchange of value or tokens within and between blockchain networks.

In some embodiments, the method may further comprise a Value Token Transfer Protocol (VTTP) that provides the following features:

Intra-chain value transfer of native cryptocurrency (e.g. ETH on Ethereum blockchain);

Intra-chain value transfer of ERC20 tokens (e.g. sending OMG tokens and receiving SNT tokens);

Inter-chain value transfer of cryptocurrencies (e.g. Send ETH from Ethereum blockchain and receive LTC on Litecoin blockchain);

Intra and Inter-chain exchange of cryptocurrencies and ERC20 tokens (e.g. send BAT token from Ethereum blockchain and receive LTC on Litecoin blockchain); and Retrieve information on accounts, contracts, transactions for all participating blockchain networks.

In some embodiments, the method may further comprise client-server model in which VTTP works as a request-response protocol based on a client-server architecture, where a VTTP Client sends requests to a VTTP Server, and the server responds to the requests.

In some embodiments, the method may further comprise a peer-to-peer model in which VTTP works as a peer-to-peer protocol where VTTP Peers communicate directly with their peers and a VTTP Coordinator may be used for coordinating the communication between peers.

VTTP is blockchain platform or network independent. VTTP can be used to send any type of tokens between different blockchain networks or within a blockchain network, as long as the VTTP client and server know how to interpret and transfer tokens.

VTTP is a stateless protocol. Each VTTP request contains all the information required to process a request. VTTP client and server do not maintain state between successive requests.

Further embodiments may be directed to a blockchain value transfer method comprising receiving a plurality of transaction requests, each transaction request comprising a sending user account address, a receiving user account address, and a transaction value expressed in terms of a quantity of first in-network tokens, the user account addresses being addresses on a blockchain network. The method further comprises performing a balance check procedure on each transaction request comprising identifying a present permitted transaction amount in first in-network tokens for the sending user account address, and determining if the transaction value in first in-network tokens is greater than the present permitted transaction amount of the sending user account address. Upon determining the transaction value in first in-network tokens is greater than the present permitted transaction amount in first in-network tokens of the sending user account address, the method may continue with refusing the transaction. Upon determining the transaction value is not greater than the present permitted transaction amount of the sending user account address, the method may continue with adding the transaction request to an aggregate transaction record, updating the present permitted transaction amount of the sending user account address reflecting a debit of the transaction value, and updating the present permitted transaction amount of the receiving user account address reflecting a credit of the transaction value. The method may further comprise determining a net transaction amount for each user account address for each transaction in the aggregate transaction record, with the transaction value for transactions including the user account address as the sending user account address as a debit and as the receiving user account address as a credit and executing the net transaction amount for each user account address associated with the net transaction amount by transacting tokens to and from the user account addresses upon reaching an aggregation threshold, comprising withdrawing an amount of tokens from user account addresses with a net debit having a value equal to the value of the net debit, defined as debit user account addresses, defining debited tokens and depositing an amount of tokens from the debited tokens to user account addresses with a net credit in an amount equal to the amount of the net credit, defined as credit user account addresses.

In some embodiments, execution of the net transaction amount may comprise recording a net transaction smart contract to the blockchain network, the net transaction smart contract comprising each of the user account addresses and the tokens transacted with each of the user account addresses. Furthermore, the net transaction smart contract may add a transaction fee to each token transaction for the user account addresses.

In some embodiments, the aggregation threshold may be defined as at least one of a length of time elapsing since a previous net transaction execution, a gross transaction amount, or a risk tolerance.

In some embodiments, each transaction request of the plurality of transaction requests may have an associated transaction request smart contract recorded on the blockchain network, defining a plurality of transaction request smart contracts. Each transaction request smart contract may comprise a transaction tax added to the transaction value.

In some embodiments, the method may further comprise, for each refused transaction, re-determining if the transaction value in first in-network tokens is greater than the present permitted transaction amount of the sending user account address after at least one of a first time interval and an intervening transaction involving the sending user account address, defining a transaction retry, for one or more of a fixed number of transaction retry attempts or after a second time interval.

In some embodiments, the method may further comprise a first sending user account address of a first transaction request of the plurality of transaction requests is on a first blockchain network comprising the first in-network token, a first receiving user account address of the first transaction request is on a second blockchain network and comprises a second in-network token, and the first receiving user account address is determined to be a credit user account address. Executing the net transaction amount for the receiving user account may further comprise exchanging an amount of first in-network tokens, equal in value to the net credit for the first receiving user account, defining a net credit value, for an amount of first tethered tokens having a value equal to the net credit value, the first tethered tokens being comprised by a first tethered token transfer record, recording a transaction to the first blockchain network of sending the first tethered token transfer record from the first blockchain network to the second blockchain network, recording a transaction to the second blockchain network of receiving the first tethered token transfer record at the second blockchain network from the first blockchain network, exchanging the first tethered tokens comprised by the first tethered transfer record for an amount of second in-network tokens having a value equal to the net credit value, defining a second blockchain network deposit, and depositing the second blockchain network deposit to the receiving user account address. Furthermore, the first tethered token may have a value thereof tethered to a first fiat currency, the first in-network token may have a first exchange rate with the first tethered token, and the second in-network token may have a second exchange rate with the first tethered token that is different from the first exchange rate.

In some embodiments, a first sending user account address of a first transaction request of the plurality of transaction requests may be on a first blockchain network comprising the first in-network token, a first receiving user account address of the first transaction request may be on a second blockchain network and comprises a second in-network token, and the first receiving user account address may be determined to be a credit user account address. Executing the net transaction amount for the receiving user account may comprise exchanging an amount of first in-network tokens, equal in value to the net credit for the first receiving user account, defining a net credit value, for an amount of first tethered tokens having a value equal to the net credit value, the first tethered tokens being comprised by a first tethered token transfer record, recording a transaction to the first blockchain network of sending the first tethered token transfer record from the first blockchain network to a tethered token exchange, exchanging the first tethered tokens comprised by the first tethered token transfer record for an amount of second tethered tokens having a value equal to the net credit value, the second tethered tokens being comprised by a second tethered token transfer record, recording a transaction to the second blockchain network of receiving the second tethered token transfer record at the second blockchain network from the tethered token exchange, exchanging the second tethered tokens comprised by the second tethered transfer record for an amount of second in-network tokens having a value equal to the net credit value, defining a second blockchain network deposit, and depositing the second blockchain network deposit to the receiving user account address. A value of the first tethered token may be tethered to a first fiat currency, a value of the second tethered token may be tethered to a second fiat currency different from the first fiat currency, the first in-network token may have a first exchange rate with the first tethered token, the second in-network token may have a second exchange rate with the second tethered token, and the first tethered token may have a third exchange rate with the second tethered token. The method may further comprise at least one of defining the first exchange rate responsive, the second exchange rate, and the third exchange rate responsive to the second fiat currency. The method may further comprise updating the present permitted transaction amount responsive to at least one of the first fiat currency and the second fiat currency.

Further embodiments of the present invention are directed to a system and associated methods for detecting fraud perpetrated through networks of collaborating smart contracts on blockchain platforms. By modeling inter-contract relationships as computational graphs and applying analytic techniques, coordinated groups of contracts enabling illegal activity can be automatically surfaced, investigated, and disabled via configurable on-chain actions.

In some embodiments, the system comprises a contract graph generator continuously ingesting new blockchain data to construct relationship maps between smart contracts based on transactional and informational flows, a fraud pattern knowledge base codifying signatures of known deceptive contract graphs and cluster profiles encapsulating features, rules, and risk models derived from past detections, a set of graph matching engines executing algorithms to recognize sub-graphs within the contract ecosystem whose topology and activities closely resemble templates in the knowledge base, indicative of potential fraud networks warranting further review, an array of targeted filtering contracts that scrutinize transactions, logic flows, and user behaviors associated with contracts in the flagged sub-graphs to quantify a probabilistic fraud risk score along various severity dimensions, accompanied by granular evidence support packets, an orchestration layer including filtering engines and fraud classifiers to confirm high-likelihood frauds, and response triggers to select appropriate response actions based on configurable system policies.

In some embodiments, the method may further comprise continual enhancement of the knowledge base with details of newly confirmed fraud schemes to improve detection capabilities over time as malicious behaviors evolve ongoing aggregation of forensic evidence packets into case management store preserved to aid future investigations, recovery efforts, regulatory actions, and data-driven policy enhancements, integration interfaces dispatching alerts, risk scores, and evidence support packages to external systems for downstream analysis, investigative workflows, user notifications, and regulatory reporting requirements.

By automating detection of orchestrated fraud spanning collaborating smart contracts that mimic legitimate purposes when inspected individually, the present invention substantially improves and accelerates identification of sophisticated deception campaigns designed to bypass legacy validation approaches reliant on individual contract analysis. Compared to existing practices, graphical modeling of the inter-contract ecosystem combined with analytic techniques applied collectively across associated transaction sequences and logic flows enables faster detection of fraudulent schemes.

BRIEF DESCRIPTION OF THE DRAWINGS

FIG. 8 is an illustration the VTTP commands, according to an embodiment of the invention.

FIG. 16 is an illustration of VTTP status codes, according to an embodiment of the invention.

FIG. 21 is an illustration of a VTTP+ intra-entity value transfer process, according to an embodiment of the invention.

FIG. 22 is an illustration of a VTTP+ inter-entity value transfer process, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Various types of computing hardware may be disclosed herein, e.g. server, computer, computerized device, smart phone, etc. Except where described otherwise, it is contemplated and included within the scope of the invention that such hardware may comprise a processor operable to execute software resulting in a described function, a memory device positioned in communication with the processor permitting the storage of software thereon as well as data generated or processed by the processor, and a communication device positioned in communication with the processor and, in some embodiments, the memory device, and is operable to send and receive data across any type of computer network as is known in the art. The memory device may be permanent and non-transitory.

Figure 1:
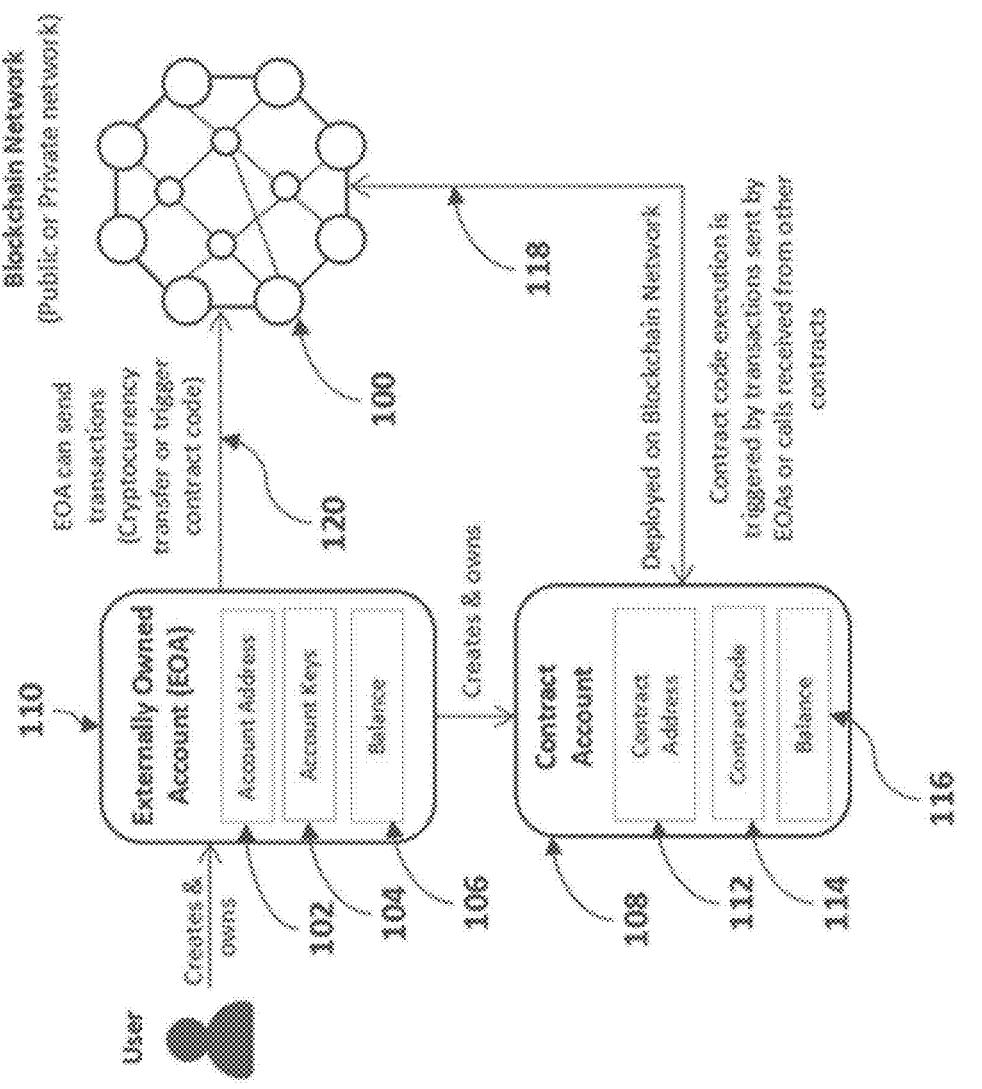
FIG. 1 is an illustration of the blockchain account types and interactions.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 114 execution is triggered by transactions 118 sent by EOAs or messages sent by other contracts.

Figure 2:
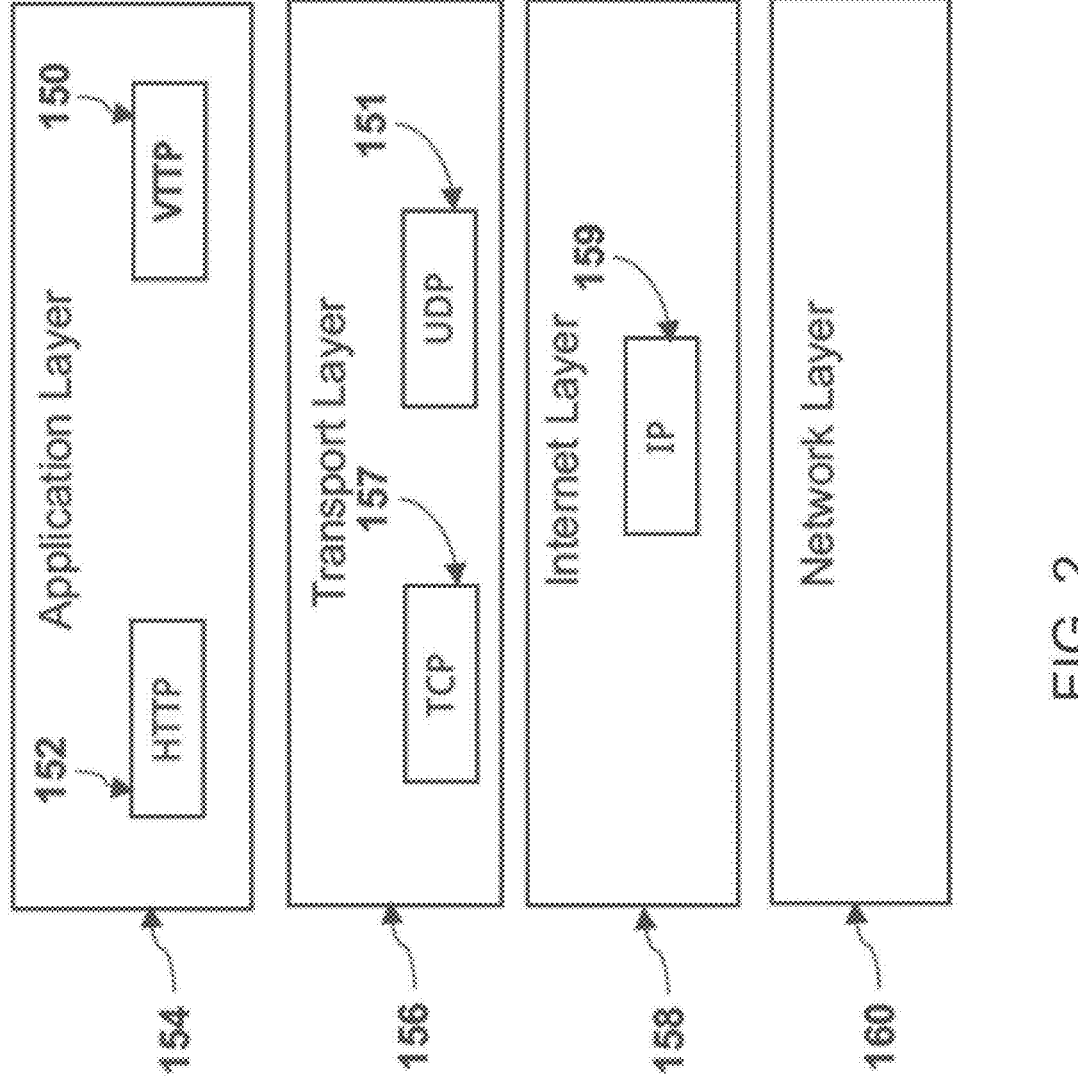
FIG. 2 is an illustration of the TCP/UDP/IP reference model layers with the VTTP protocol as part of the application layer, according to an embodiment of the invention.

Referring now to FIG. 2, the TCP/IP reference model layers with the VTTP protocol 150 as part of an application layer 154, is described in more detail. VTTP 150 is an application layer protocol and works alongside Hypertext Transfer Protocol (HTTP) 152 and on top of a transport layer 156 executing Transmission Control Protocol (TCP) 157 and an Internet layer 158 executing Internet Protocol (IP) 159. While TCP is specifically recited, all other transport layer protocols as are known in the art are contemplated and included within the scope of the invention, including, but not limited to, User Datagram Protocol (UDP), SCTP (Stream Controlled Transfer Protocol), and Quick UDP Internet Connections (QUIC). Additionally, while VTTP may operate over the Internet, it is contemplated and included within the scope of the invention that VTTP may operate over any Wide Area Network (WAN), Local Area Network (LAN), Personal Area Network (PAN), cellular network, and the like. Additionally, any communication medium is contemplated and included within the scope of the invention, including, but not limited to, Ethernet, fiber optical communication, cable communication, wireless communication (including radio, visible light, microwave, and any other electromagnetic transmission) such as IEEE 802.xx standards, and any other telecommunication standard, method, or medium. Moreover, VTTP may be implemented on devices operating configured to communicate with other devices, i.e., the Internet of Things (IoT).

Figure 3:
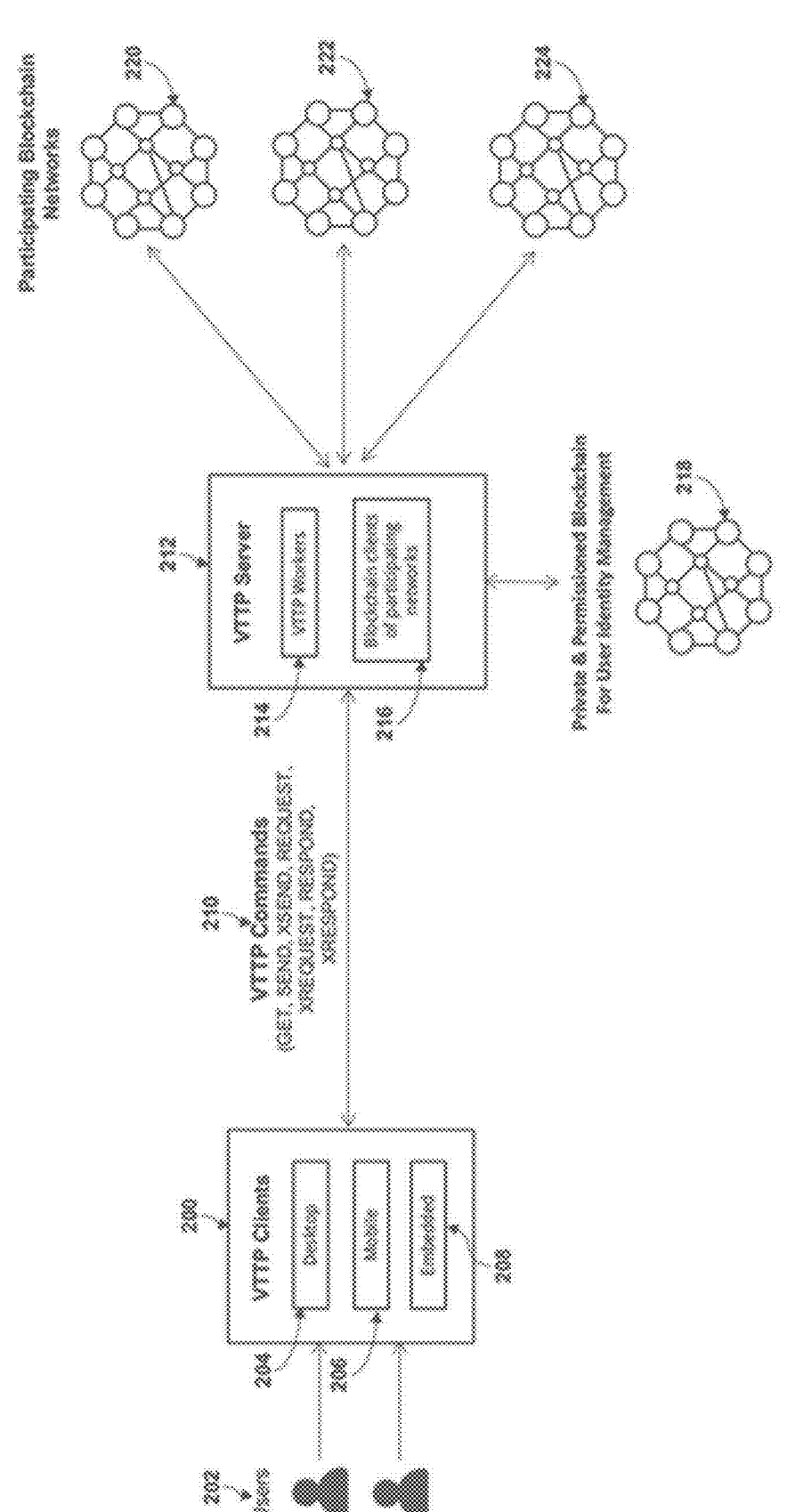
FIG. 3 is an illustration of the VTTP components, according to an embodiment of the invention.

Referring now to FIG. 3, the components of the Value Token Transfer Protocol (VTTP), are described in more detail. In one embodiment, VTTP works as a request-response protocol based on a client-server architecture, where a VTTP client 200 sends requests to a VTTP Server 212, and the server responds to the requests. The VTTP clients 200 may be available for different platforms and devices such as a desktop client 204, a mobile client 206 or an embedded client 208. Users 202 send VTTP requests to the VTTP server 212 using VTTP clients 200. VTTP requests contain VTTP commands 210 which are processed by the VTTP server 212. A VTTP server 212 may have one or more VTTP Workers 214 to process VTTP requests and execute the VTTP commands 210 sent by VTTP clients 200. VTTP server 212 has blockchain clients 216 for each of the participating blockchain networks 220, 222, 224.

A separate blockchain network 218 may be used for user identity and access management. The identity information of each user may be maintained on a separate blockchain network. An identity verification and certification procedure is performed for securely linking blockchain accounts to real users. The identity (and associated blockchain accounts) of each user may be separately verified through an identity verification process. A system and associated methods for securely linking blockchain accounts to real users, as described in related U.S. patent application Ser. No. 15/863, 128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure is performed that comprises receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 4:
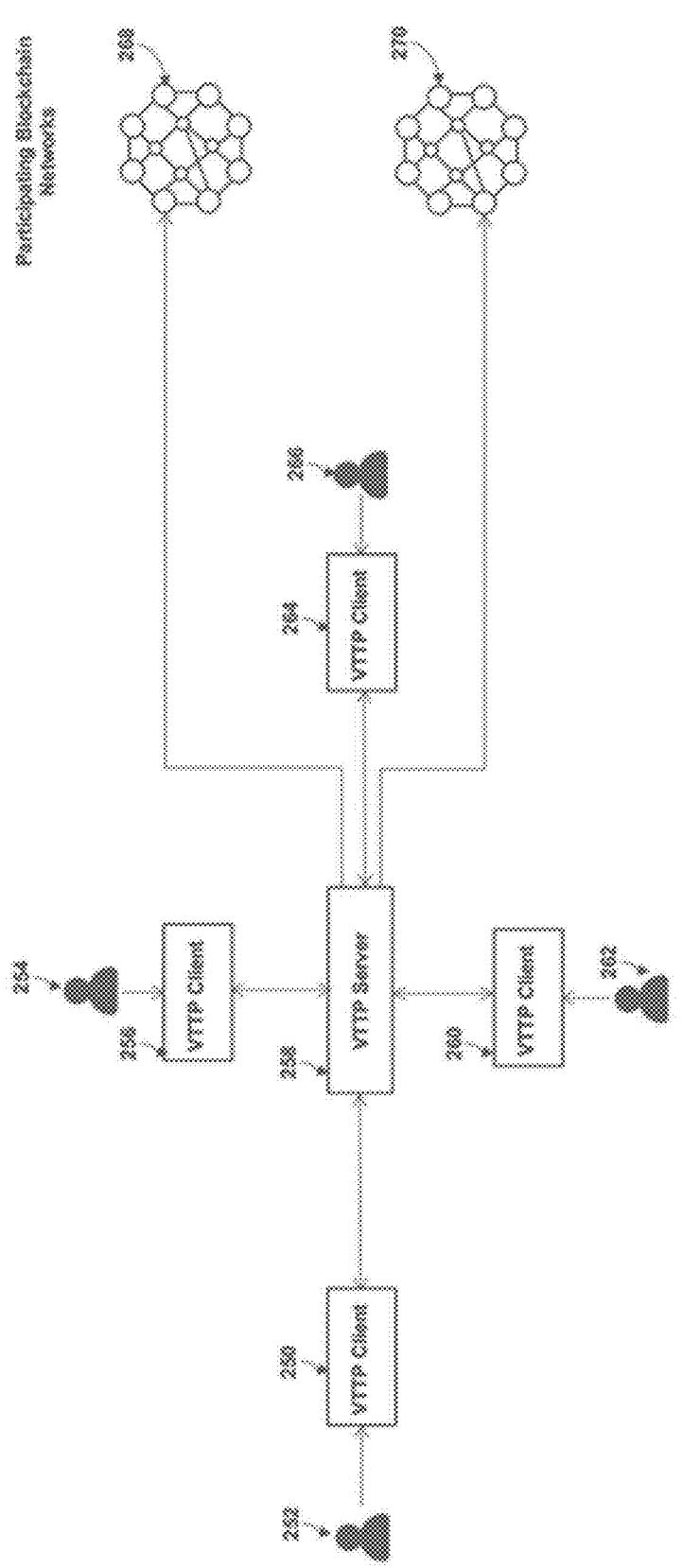
FIG. 4 is an illustration of the VTTP client-server model, according to an embodiment of the invention.

Referring now to FIG. 4, the VTTP client-server model, is described in more detail. In the client-server model, VTTP works as a request-response protocol based on a client-server architecture, where VTTP clients 250, 256, 260, 264 send requests to a VTTP server 258, and the server responds to the requests. The server processes the VTTP requests and generates and sends transactions to the participating blockchain networks 268, 270 to execute a value transfer.

Figure 5:
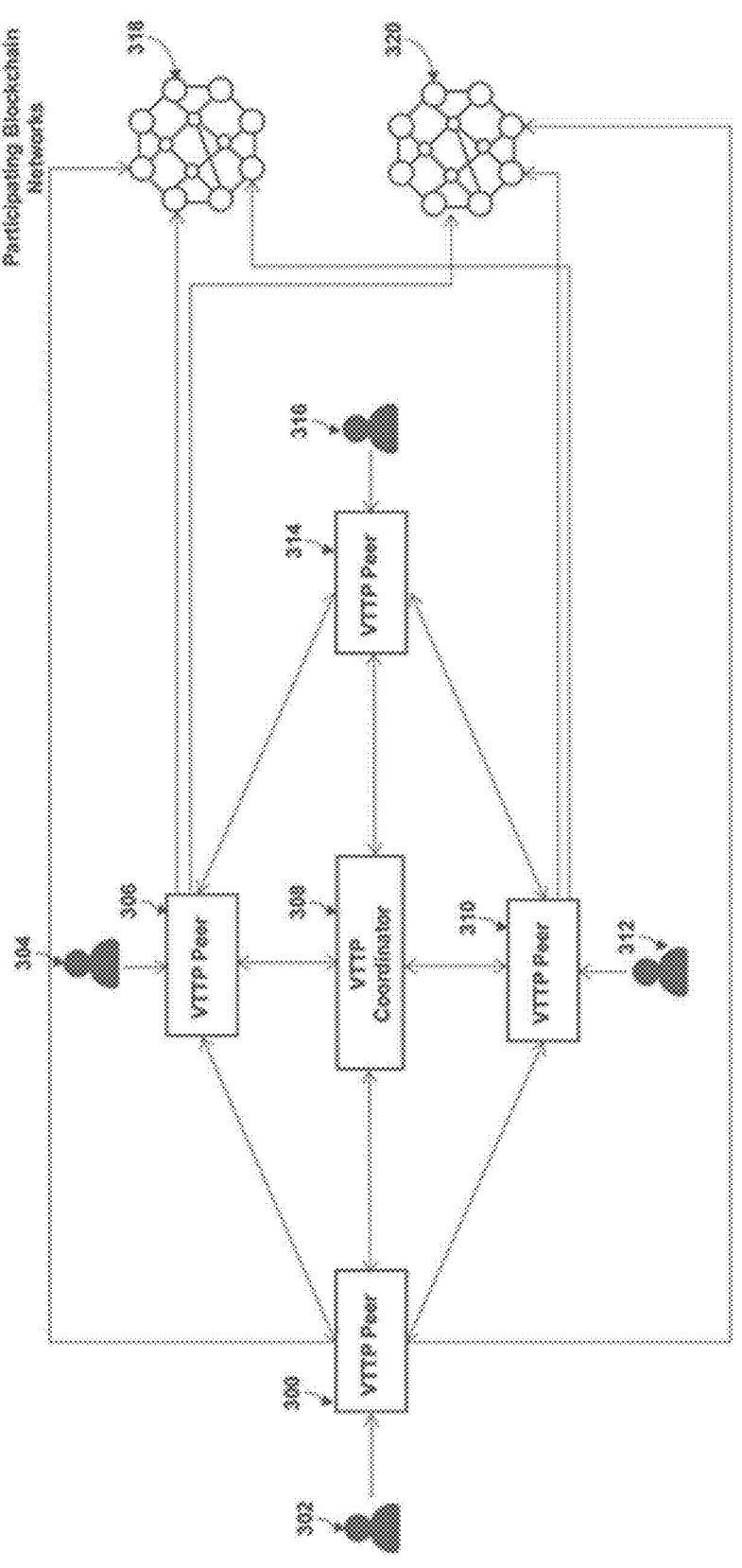
FIG. 5 is an illustration the VTTP peer-to-peer model, according to an embodiment of the invention.

Referring now to FIG. 5, the VTTP peer-to-peer model, is described in more detail. In the peer-to-peer model, VTTP works as a peer-to-peer protocol where VTTP peers 300, 306, 310, 314, operated by respective users 302, 304, 312, 316, communicate directly with their peers and a VTTP coordinator 308 may be used for coordinating the communication between peers. VTTP peers 300, 306, 310, 314 generate and send transactions to the participating blockchain networks 268, 270 to execute a value transfer on blockchain networks 318, 320.

Figure 6:
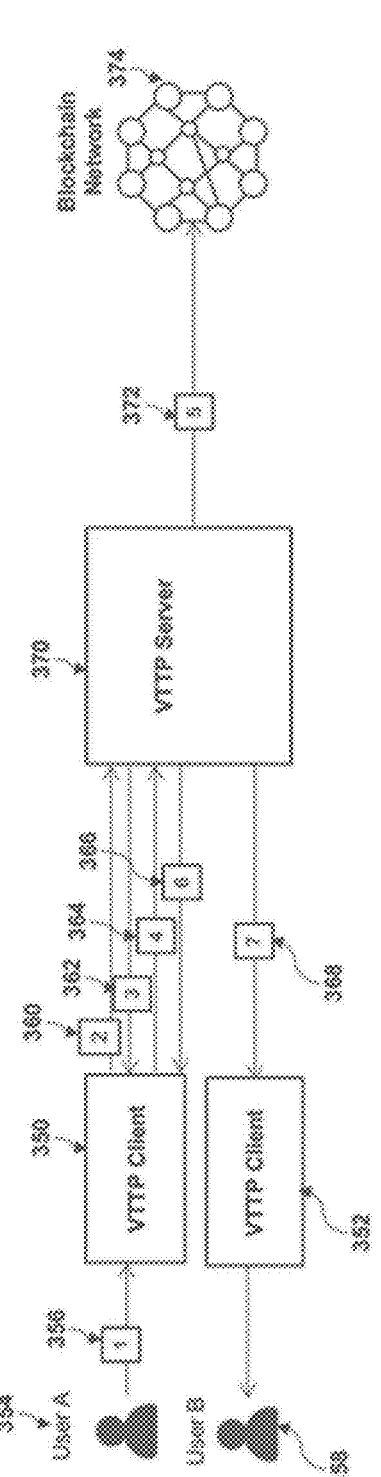
FIG. 6 is an illustration of the VTTP intra-chain value transfer process, according to an embodiment of the invention.

Referring now to FIG. 6, the VTTP intra-chain value transfer process, is described in more detail. The VTTP intra-chain value transfer process enables transfer of cryptocurrency or tokens from one account to another account on the same blockchain network. For example, consider an intra-chain value transfer request where a User A 354 wants to transfer certain units of a cryptocurrency or tokens from an account on a blockchain network 374 to the account of another User B 358 on the same blockchain network. At step 1 356, User A 354 initiates value transfer request to send cryptocurrency or tokens to User B 358 (e.g. to send 1 ETH from user A to user B). At step 2 360, the VTTP client 350 sends a VTTP SEND request to the VTTP server 370. At step 3 362, the VTTP server generates a raw transaction and returns the same in SEND response. At step 4 364, User A signs the raw transaction with the private key and VTTP client 350 sends the VTTP SIGN transaction. At step 5 372, VTTP server 370 verifies the signature and broadcasts the transaction to the blockchain network 374. At step 6 366, User A 354 receives a value transfer notification. At step 7 368, User B 358 receives a value transfer notification via VTTP Client 352.

Figure 7:
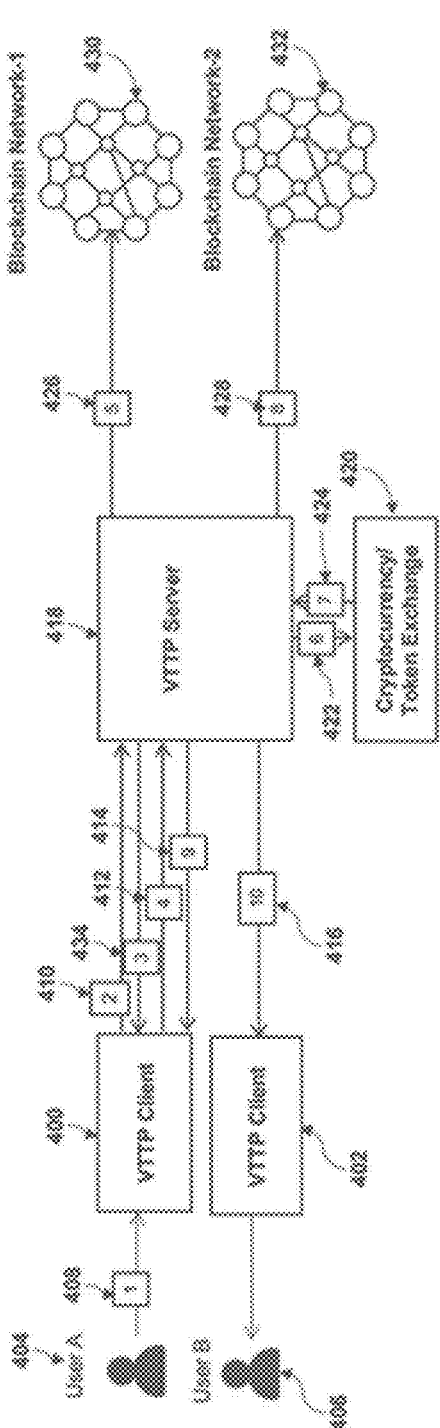
FIG. 7 is an illustration of the VTTP inter-chain value transfer process, according to an embodiment of the invention.

Referring now to FIG. 7, the VTTP inter-chain value transfer process, is described in more detail. The VTTP inter-chain value transfer process enables transfer of cryptocurrency or tokens from an account on a blockchain network to another account on a different blockchain network. At step 1 408, User A 404 initiates a cross chain value transfer request to User B 406 (e.g. to send 1 ETH from user A to user B who receives the value in equivalent number of LTC). At step 2 410, VTTP client 400 sends a VTTP SEND request to the VTTP server 418. At step 3 434, VTTP server generates a raw transaction and returns the same in SEND response. In this raw transaction the 'from' field is user A's account, and 'to' field is a 'Vault Account' on blockchain network-1 430. At step 4 412, User A 404 signs the raw transaction with the private key and VTTP client 400 sends the VTTP SIGN transaction. At step 5 426, VTTP server 418 verifies the signature and broadcasts the transaction to the blockchain network-1 430. At step 6 422, when the value transfer from User A account to Vault account on blockchain network-1 430 is confirmed, the cryptocurrency and tokens are sent to a Cryptocurrency/Token Exchange account 420. At step 7 424, cryptocurrency or tokens are exchanged. At step 8 428, the exchanged cryptocurrency or tokens are sent to User B account on blockchain network-2 432. At step 9

414, User A 404 receives a value transfer notification. At step 10 416, User B 406 receives a value transfer notification via VTTP Client 402.

Referring now to FIG. 8, VTTP commands are described in more detail. The VTTP GET command 452 is used to retrieve information about an account, contract, transaction, and an exchange rate for a token. For example, the VTTP GET command 452 to retrieve balance of an account may look as follows:

GET          vttp://ROOT_URL/ethereum/address/
    0x004E1A8B6d1B65C2497055e65AFC5E5A46Db75
    0D/balance The VTTP SEND command 454 is used to send value from one account to another account in same network. For example, the VTTP SEND command 454 to send ETH from one Ethereum account to another may look as follows:

SEND          vttp://ROOT_URL/
    ethereum?from=0x004E1A8B6d1
    B65C2497055e65AFC5E5A46Db750D
    &to=0x0049b1258Fd75C021d99E2109323Daa0E9ae
    8a6A&value=1

A VTTP SEND command 454 to send ERC20 token ABC from account A and receive ERC20 token XYZ in account B may look as follows:

SEND          vttp://ROOT_URL/
    ethereum?from=0x004E1A8B6d1
    B65C2497055e65AFC5E5A46Db750D
    &to=0x0049b1258Fd75C021d99E2109323Daa0E9ae
    8a6A        &source=ABC&destination=XYZ&
    &sourceContract=0x4891
    B15e2942FD4c176E4f2Ae3faF281E26EE466
&destinationContract=0x2fF2159D77805d489F6347Bb
    Ea3067Efb13d3176&value=1

The VTTP XSEND command 456 is used to send value from one account to another account in another network. For example, the VTTP XSEND command 456 to send ETH from an Ethereum account and receive LTC in a Litecoin account may look as follows:

XSEND        vttp://ROOT_URL/ethereum/litecoin?
    from=0x004E1A8B6d1
    B65C2497055e65AFC5E5A46Db750D
    &to=LWhC2FmafKgDbqT129rB8Yj3dB9FVGhA2E
    &source=ETH&destination=LTCvalue=1

The VTTP REQUEST command 458 is used to request value from an account in the same network. For example, the VTTP REQUEST command 458 to request ETH from an Ethereum account may look as follows:

REQUEST       vttp://ROOT_URL/ethereum?
    from=0x004E1A8B6d1
    B65C2497055e65AFC5E5A46Db750D
    &to=0x0049b1258Fd75C021d99E2109323Daa0E9ae
    8a6A&value=1

The VTTP XREQUEST command 460 is used to request value from an account in another network. For example, the VTTP XREQUEST command 460 to request LTC from a Litecoin account and receive ETH in Ethereum account may look as follows:

XREQUEST      vttp://ROOT_URL/ethereum/litecoin?
    from=0x004E1A8B6d1
    B65C2497055e65AFC5E5A46Db750D
    &to=LWhC2FmafKgDbqT129rB8Yj3dB9FVGhA2E
    &source=LTC&destination=ETH&value=1

The VTTP RESPOND command 462 is used to accept or deny a request received from an account in the same network. For example, the VTTP RESPOND command 462 to accept a value transfer request within Ethereum network may look as follows:

RESPOND       vttp://ROOT_URL/ethereum?reqid=
    132376876 &status=accept

Similarly, the VTTP RESPOND command 462 to deny a value transfer request within Ethereum network may look as follows:

RESPOND       vttp://ROOT_URL/ethereum-
    ?reqid=132376876 &status=deny

The VTTP XRESPOND command 464 is used to accept or deny a request received from an account in another network. For example, the VTTP XRESPOND command 464 to accept a value transfer request from Litecoin to Ethereum network may look as follows:

XRESPOND      vttp://ROOT_URL/ethereum/litecoin?
    reqid=63768237 &status=accept Similarly, the VTTP XRESPOND command 464 to deny a value transfer request from Litecoin to Ethereum network may look as follows:

XRESPOND      vttp://ROOT_URL/ethereum/litecoin?
    reqid=63768237 &status=deny The VTTP SIGN command 466 is used to sign and approve a transaction. For example, the VTTP SIGN command 466 to sign a value transfer request may look as follows:

SIGN          vttp://ROOT_URL/ethereum?
    Id=1827637&signature=0xf86b0184ee6b28008252089
    4187

Figure 9:
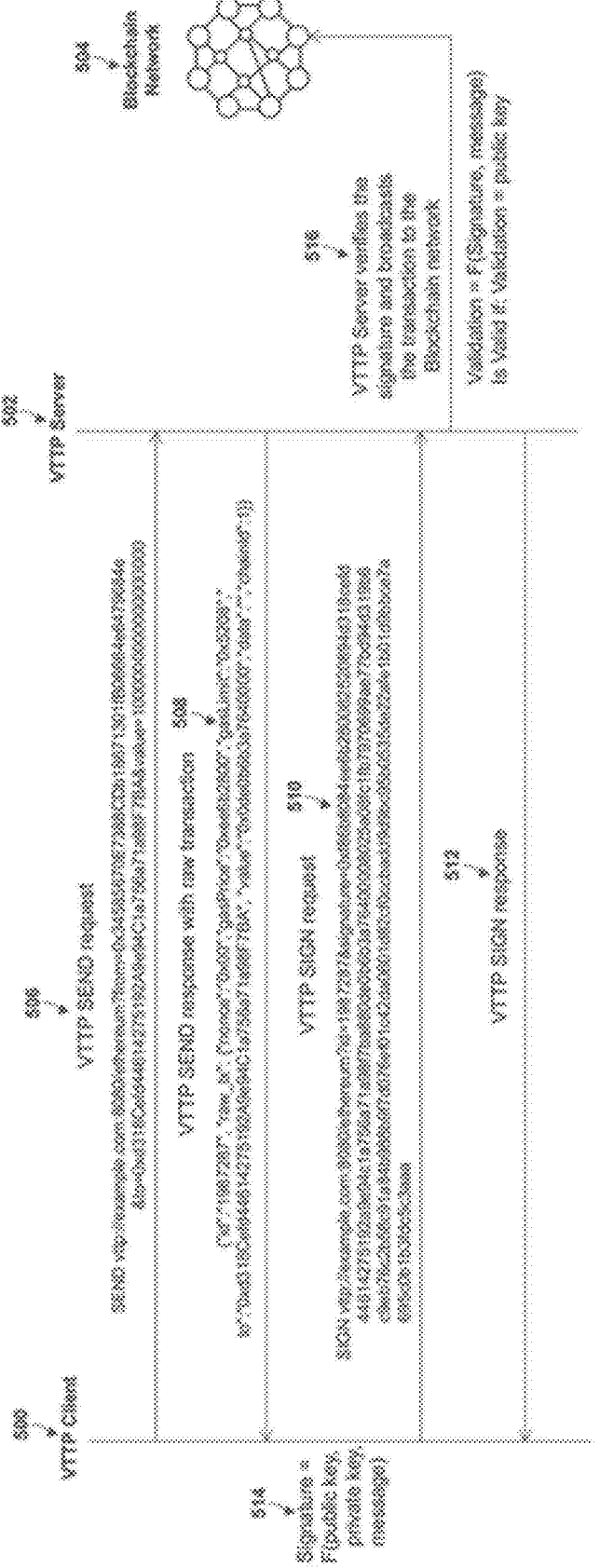
FIG. 9 is an illustration the transaction signing process in VTTP, according to an embodiment of the invention.

Referring now to FIG. 9, the transaction signing process in VTTP, is described in more detail. VTTP transactions that transfer value are signed and approved by the user on the client side. For example, to send value from one account to another account within the same blockchain network 504, the VTTP client 500 sends a VTTP SEND command at step 506. The VTTP server 502 generates the blockchain network 504 specific raw transaction and returns the raw transaction in the response at step 508. The user then signs the raw transaction with the private key 514 and sends the signed transaction with the VTTP SIGN command at step 510. The VTTP server 502 verifies the signature, broadcasts the signed transaction at step 516 to the blockchain network 504, and sends a SIGN response at step 512. With this model of signing transactions on the client side, the user can retain the private keys on the user's local machine and need not share them with the VTTP server.

Figure 10:
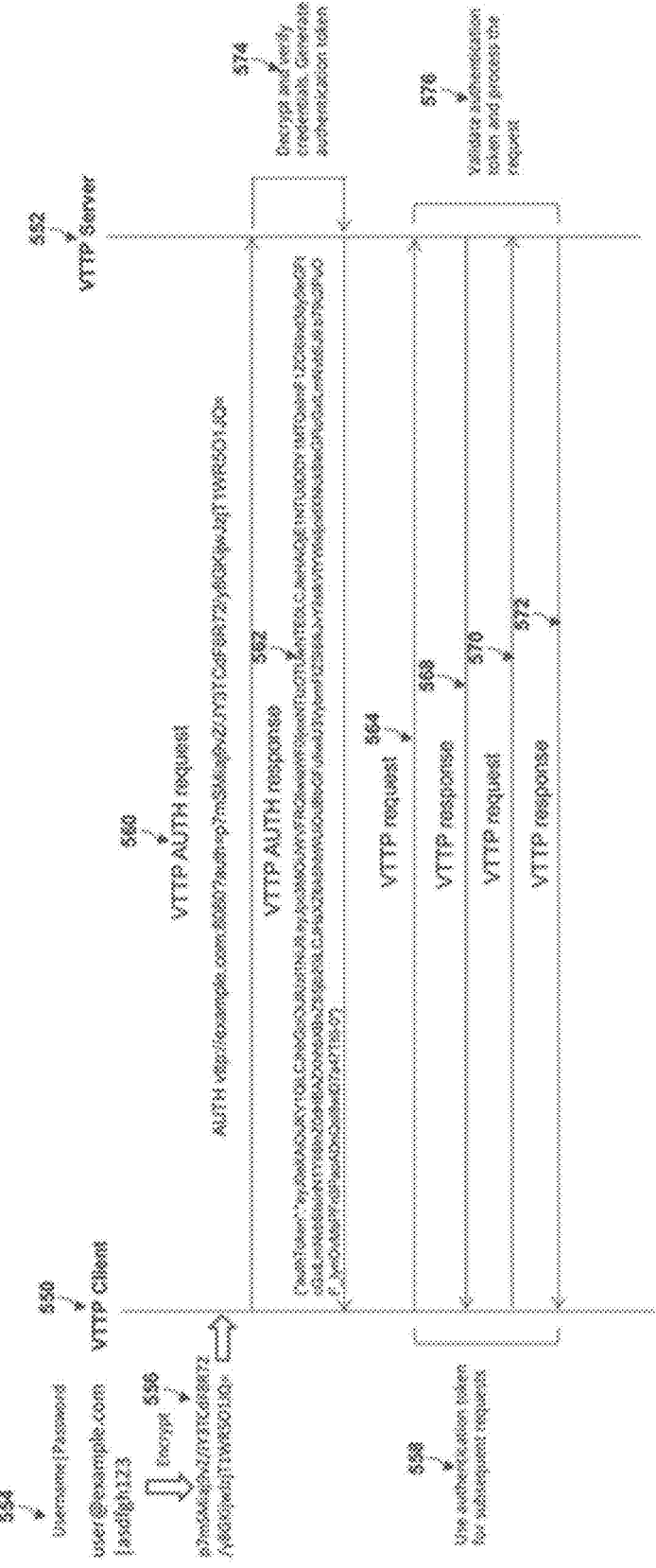
FIG. 10 is an illustration of the token-based authentication process in VTTP, according to an embodiment of the invention.

Referring now to FIG. 10, the token-based authentication process in VTTP, is described in more detail. A VTTP client 550 can authenticate with a VTTP server 552 using an authentication token which is generated by the client and verified by the VTTP server 552. VTTP may use existing authentication token standards such as JSON Web Token (JWT) (described in RFC 7519) for securely transmitting information between a client and server as a JSON object. VTTP may also support other custom token standards. An example of using JSON Web Token standard for authenticating a VTTP client 550 with a VTTP server 552 is shown in FIG. 10. At the client side, the username and password fields 554 are combined and encrypted to generate an encrypted authentication string 556. The VTTP client 550 sends a VTTP AUTH request to the VTTP server 552 containing the encrypted authentication string 556 at step 560. The VTTP server decrypts the encrypted authentication string 556 and verifies the user's credentials, and then generates a JSON Web token at step 574. A JSON Web Token contains header, payload and signature fields. The header field may specify the token type (JWT) and the signing algorithm used (such as HMAC SHA-256 algorithm). The payload field may contain registered, private and public claims. The registered claims defined in JWT include claims such as 'iss' (issuer of the token), 'sub' (subject of the token), 'aud' (audience of the token), 'exp' (token expiration time defined in Unix time), 'nbf' ('not before time' that identifies the time before which the JWT must not be accepted for processing), 'iat' ('issued at' time, in Unix time, at which the token was issued) and 'jti' (JWT ID). To create the signature part of a JSON Web Token the encoded header, the encoded payload, a secret, are signed using the algorithm specified in the header. For example, if the HMAC SHA256 algorithm is used, the signature is created as follows:

```
HMACSHA256(
base64UrlEncode(header) + "." +
base64UrlEncode(payload),
secret)
```

The signature is also used to verify the message wasn't changed along the way. The VTTP server 552 returns a VTTP AUTH response 562 containing the JSON Web Token. The VTTP client 550 uses this token for all subsequent VTTP requests 564, 570, and the VTTP server 552 validates the authentication token and process the VTTP requests 564, 570, then sending respective VTTP response 568, 572. When the JSON Web token expires, the VTTP client 550 sends a new AUTH request.

Figure 11:
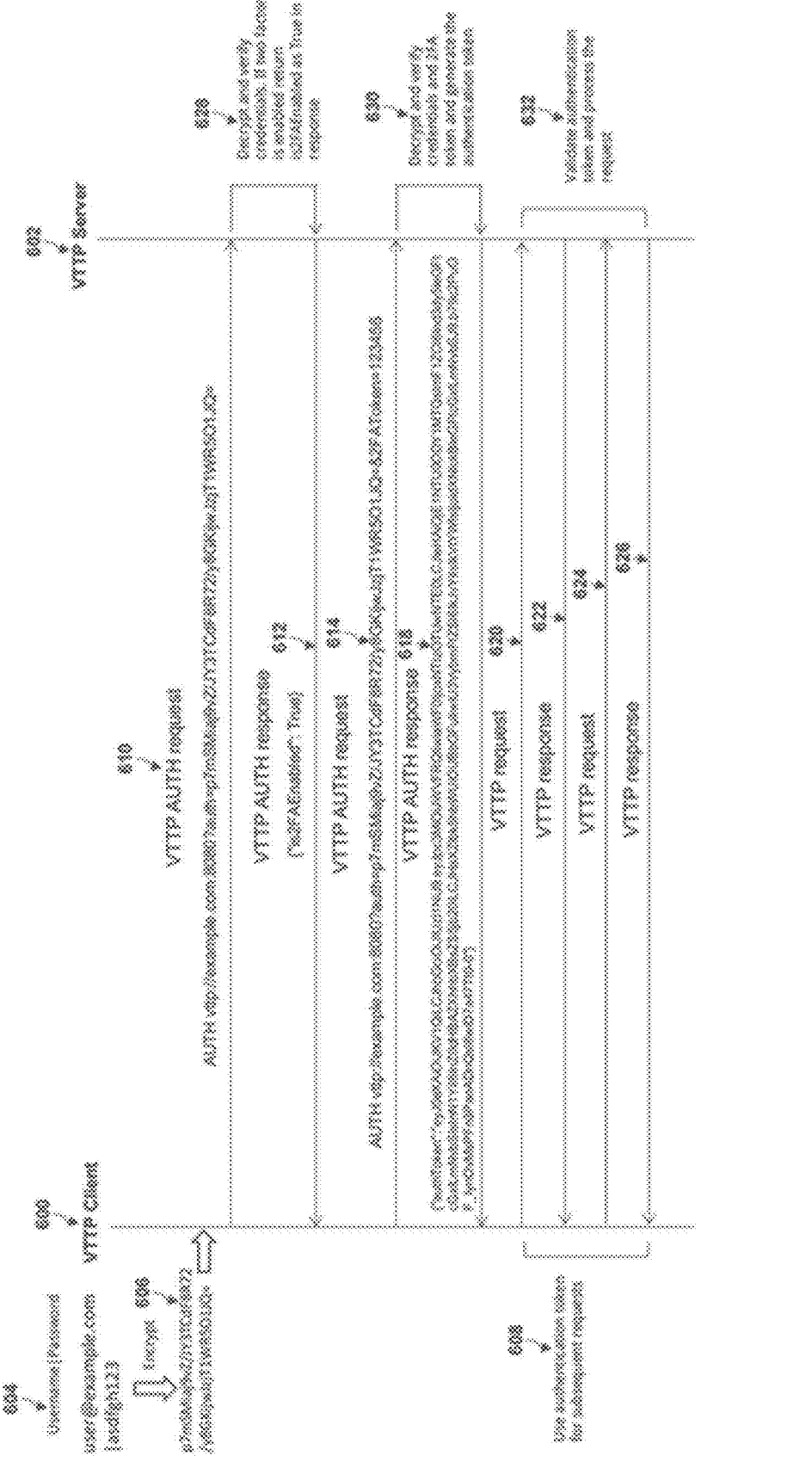
FIG. 11 is an illustration of the two-factor authentication process in VTTP, according to an embodiment of the invention.

Referring now to FIG. 11, the two-factor authentication process in VTTP, is described in more detail. VTTP supports two-factor authentication. To authenticate a VTTP client 600 with a VTTP server 602 when two-factor authentication is enabled for a user's account, the client first sends a VTTP AUTH request 610 containing an encrypted authentication string. The VTTP server 602 decrypts the authentication string and verifies the user's credentials at step 628. If two-factor is enabled for user's account, the VTTP server 602 returns 'is2FAEnabled' as 'True' in the response 612. The VTTP client 600 then sends another AUTH request 614, containing the encrypted authentication string and a two-factor authentication token. The VTTP server 602 decrypts and verifies user's credentials and two-factor authentication token and generates JSON Web Token which is used as an authentication token for all subsequent requests sent by the VTTP client 600 at step 630. The VTTP server 602 returns a VTTP AUTH response containing the JSON Web Token at step 618. The VTTP client 600 uses this token for all subsequent VTTP requests 620, 624, and the VTTP server 602 validates the authentication token and process the VTTP requests 620, 624, then sending respective VTTP response 622, 626.

Figure 12:
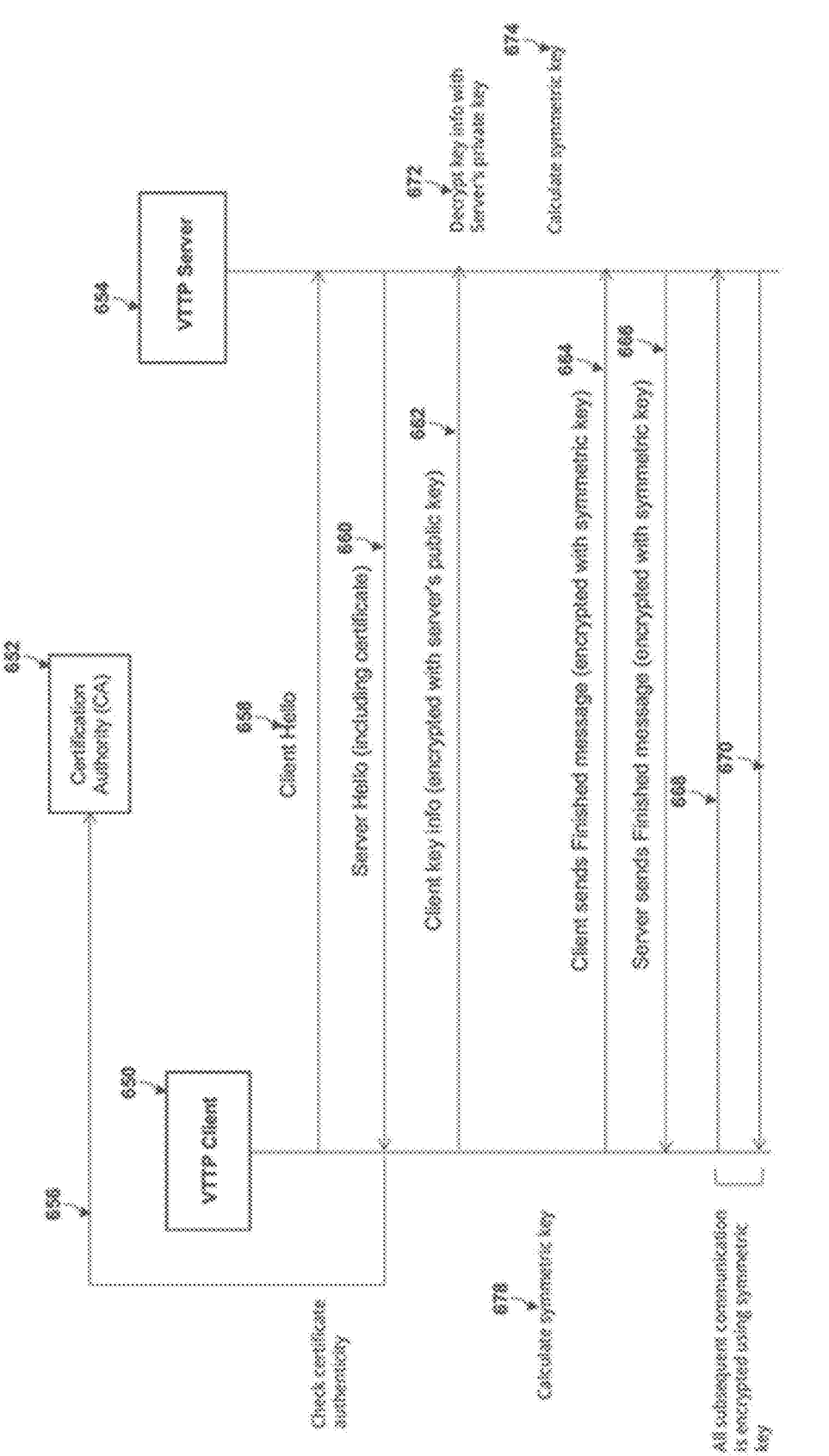
FIG. 12 is an illustration of VTTP Secure (VTTPS), a secure version of VTTP that runs over SSL/TLS, according to an embodiment of the invention.

Referring now to FIG. 12, VTTP Secure (VTTPS), a secure version of VTTP that runs over SSL/TLS, is described in more detail. The use of SSL/TLS allows an encrypted channel of communication between the client and server. A handshake process is done in which the client and server compute a symmetric key which is used to encrypt all communication during their TLS session. At step 658, a VTTP client 650 initiates a handshake by sending a Client Hello message to a VTTP server 654. At step 660, the VTTP server 654 responds with a Server Hello message and the server's certificate. At step 656, the VTTP client 650 authenticates the server's identity by verifying the server certificate with a certificate authority 652. At step 662, the VTTP client 650 sends a key-info containing a random string of data to the server (which is encrypted with the server's public key). After this step the VTTP client 650 and the VTTP server 654 each have the random string of data which is used to calculate (independently) the symmetric key that will be used to encrypt all remaining communication for the duration of that specific TLS session, such calculations being performed at steps 678 and 674, respectively. The VTTP client 650 and the VTTP server 654 then both send respective "Finished' messages that have been encrypted with the symmetric key at the end of the handshake at steps 664 and 666. All subsequent communication 668, 670 between the VTTP client 650 and the VTTP server 654 may be encrypted using the symmetric key.

Figure 13:
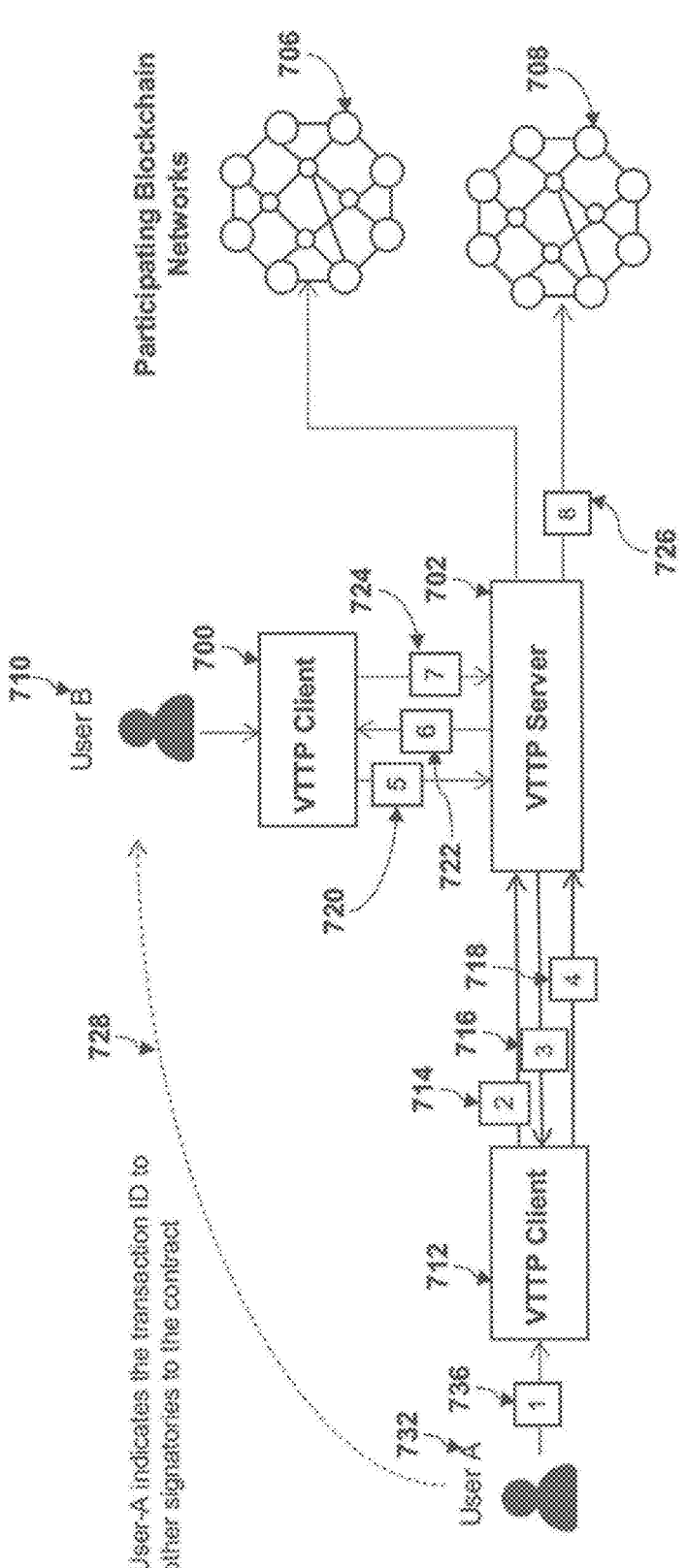
FIG. 13 is an illustration the multi-signature transaction signing process in VTTP, according to an embodiment of the invention.

Referring now to FIG. 13, the multi-signature ("multisig") transaction signing process in VTTP, is described in more detail. The FIG. 13 shows an example of using VTTP for a multisig contract that requires 2 out of 3 signatures to process a transaction. At step 1 736, User A 732 initiates value transfer request to send cryptocurrency or tokens. At step 2 714, VTTP client 712 sends a VTTP SEND request to the VTTP server 702. At step 3 716, VTTP server 702 generates a raw transaction and returns the same in SEND response. At step 4 718, User A 732 signs the raw transaction with the private key and VTTP client 712 sends the VTTP SIGN transaction. At step 728, User A 732 may indicate the transaction ID to other signatories to the contract or other signatories may get a notification from the VTTP server 702. At step 5 720, User B 710 retrieves the transaction using the transaction ID. At step 6 722, VTTP server 702 returns the raw transaction to be signed by User B 710. At step 7 724, User B 710 signs the raw transaction with the private key and VTTP client 700 sends the VTTP SIGN transaction. At step 8 726, VTTP server 702 verifies the signatures of User A 732 and User B 710 and broadcasts the transaction to a blockchain network 708.

Figure 14:
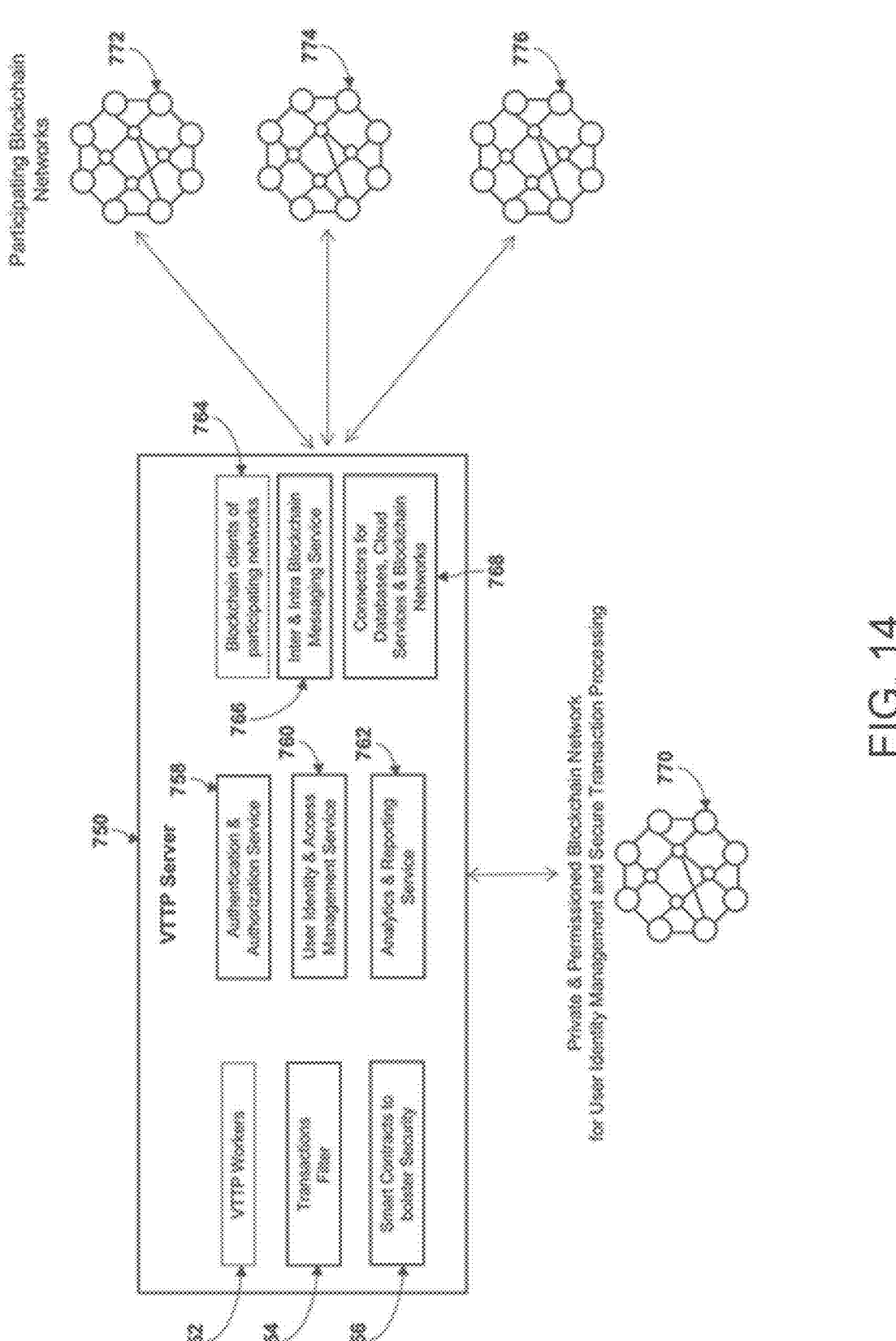
FIG. 14 is an illustration an exemplary VTTP server architecture, according to an embodiment of the invention.

Referring now to FIG. 14, an exemplary VTTP server architecture, is described in more detail. A VTTP server 750 may have one or more VTTP Workers 752 to process VTTP requests and execute the VTTP commands sent by VTTP clients. VTTP server 750 has blockchain clients 764 for each of the participating blockchain networks 772, 774, 776. A separate blockchain network 770 may be used for user identity and access management. The VTTP server 750 may contain additional services, such as User Identity & Access Management Service 760, Authentication & Authorization Service 758, and Analytics & Reporting Service 762. The VTTP server 750 may contain inter- and intra-blockchain messaging services 766 and connectors for databases, cloud services & blockchain networks 768. A transactions filter 754 may be used in the server to filter transactions. The server may use various Smart Contracts 756 to bolster security. These smart contracts may be executed for each VTTP request and perform additional verification (such as verifying sender and receiver's address). The smart contracts may enforce checks such as time limits or quantity restrictions. Some smart contracts may perform functions similar to virus filters, for filtering out suspicious transactions. New smart contracts can be distributed to VTTP servers in a manner similar to virus updates.

Figure 15:
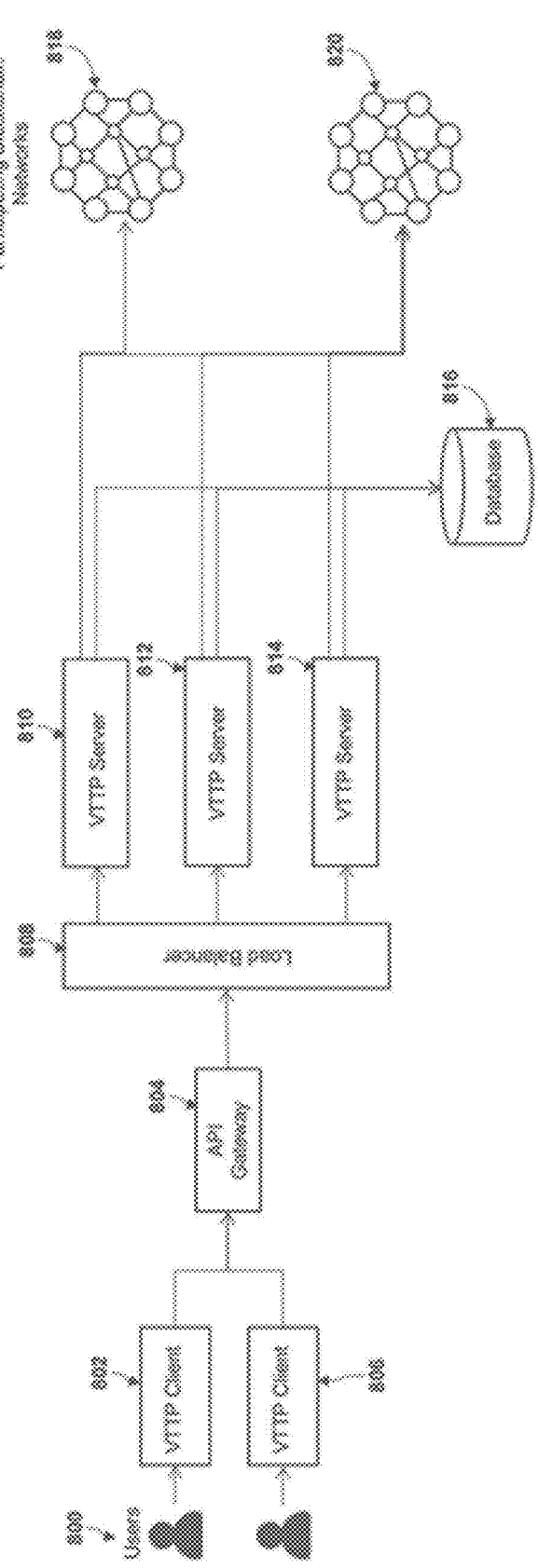
FIG. 15 is an illustration an exemplary VTTP reference architecture, according to an embodiment of the invention.

Referring now to FIG. 15, an exemplary VTTP reference architecture, is described in more detail. Users 800 may use VTTP clients 802, 806 to communicate with VTTP servers 810, 812, 814 through an API gateway 804. The VTTP servers 810, 812, 814 sit under a load balancer 808 and expose a number API endpoints. The API gateway 804 makes these APIs available to the VTTP clients. Each API has an endpoint (for example, vttp://example.com/ethereum) and a set of VTTP methods or commands which are supported for the endpoint (such as GET, SEND, REQUEST, etc.). The API gateway 804 may use an API key to enable authentication for APIs. The API gateway 804 may also perform additional functions such as logging each API request and rate-limiting of requests. A separate relational (SQL) or non-relational (NoSQL) database 816 may be used to store data such as user credentials and application specific data. Each VTTP server is connected to all the participating blockchain networks 818, 820.

Referring now to FIG. 16, VTTP status codes 850 are described in more detail. The status code '1xx' 852 is used to signal that a request has been received. For example, a value transfer request is received and is being processed. The status code '2xx' 854 is used to signal that a requested action has been successfully completed. The status code '3xx' 856 is used to signal that a VTTP command has been accepted, but the requested action is being held in abeyance, pending receipt of further information. The status code '4xx' 858 is used to signal that a VTTP command was not accepted due to a client error and the requested action did not take place. The status code '5xx' 860 is used to signal that a VTTP command was not accepted due to a server error and the requested action did not take place.

Figure 17:
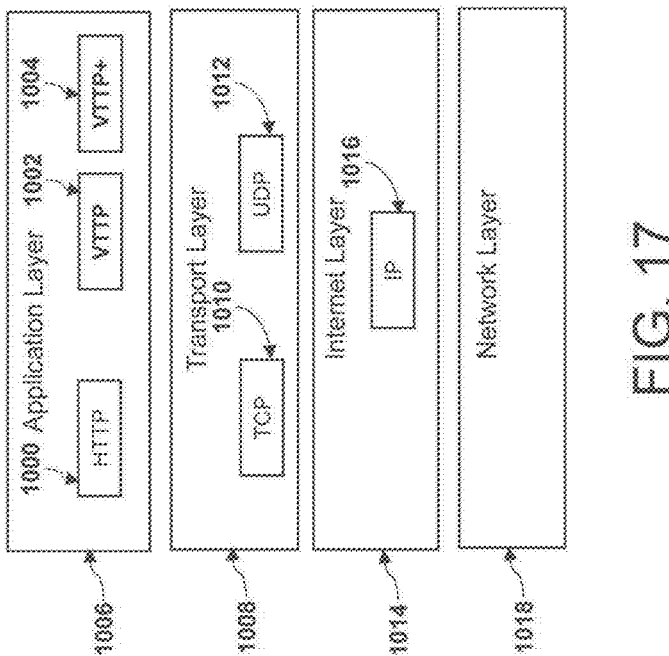
FIG. 17 is an illustration of the TCP/UDP/IP reference model layers with the VTTP+ protocol as part of the application layer, according to an embodiment of the invention.

A further embodiment of the invention may be referred to as a VTTP+ protocol. The VTTP+ protocol may be understood to build upon the VTTP protocol, including facilitating transactions from user devices, such as smart phones. Referring now to FIG. 17, TCP/IP reference model layers comprised by a VTTP+ protocol 1004 as part of an application layer 1006, is described in more detail. VTTP+ 1004 is an application layer protocol and works alongside Hypertext Transfer Protocol (HTTP) 1000 and VTTP protocol 1002 and on top of a transport layer 1008 executing TCP 1010 and UDP 1012 protocols, which are in turn on top of an Internet layer 1014 executing Internet Protocol (IP) 1016. While TCP and UDP are specifically recited, all other transport layer protocols as are known in the art are contemplated and included within the scope of the invention, including, but not limited to, SCTP (Stream Controlled Transfer Protocol), and Quick UDP Internet Connections (QUIC). Additionally, while VTTP+ may operate over the Internet, it is contemplated and included within the scope of the invention that VTTP+ may operate over any Wide Area Network (WAN), Local Area Network (LAN), Personal Area Network (PAN), cellular network, and the like. Additionally, any communication medium is contemplated and included within the scope of the invention, including, but not limited to, Ethernet, fiber optical communication, cable communication, wireless communication (including radio, visible light, microwave, and any other electromagnetic transmission) such as IEEE 802.xx standards, and any other telecommunication standard, method, or medium. Moreover VTTP+ may be implemented on devices operating configured to communicate with other devices, i.e., the Internet of Things (IoT).

Figure 18:
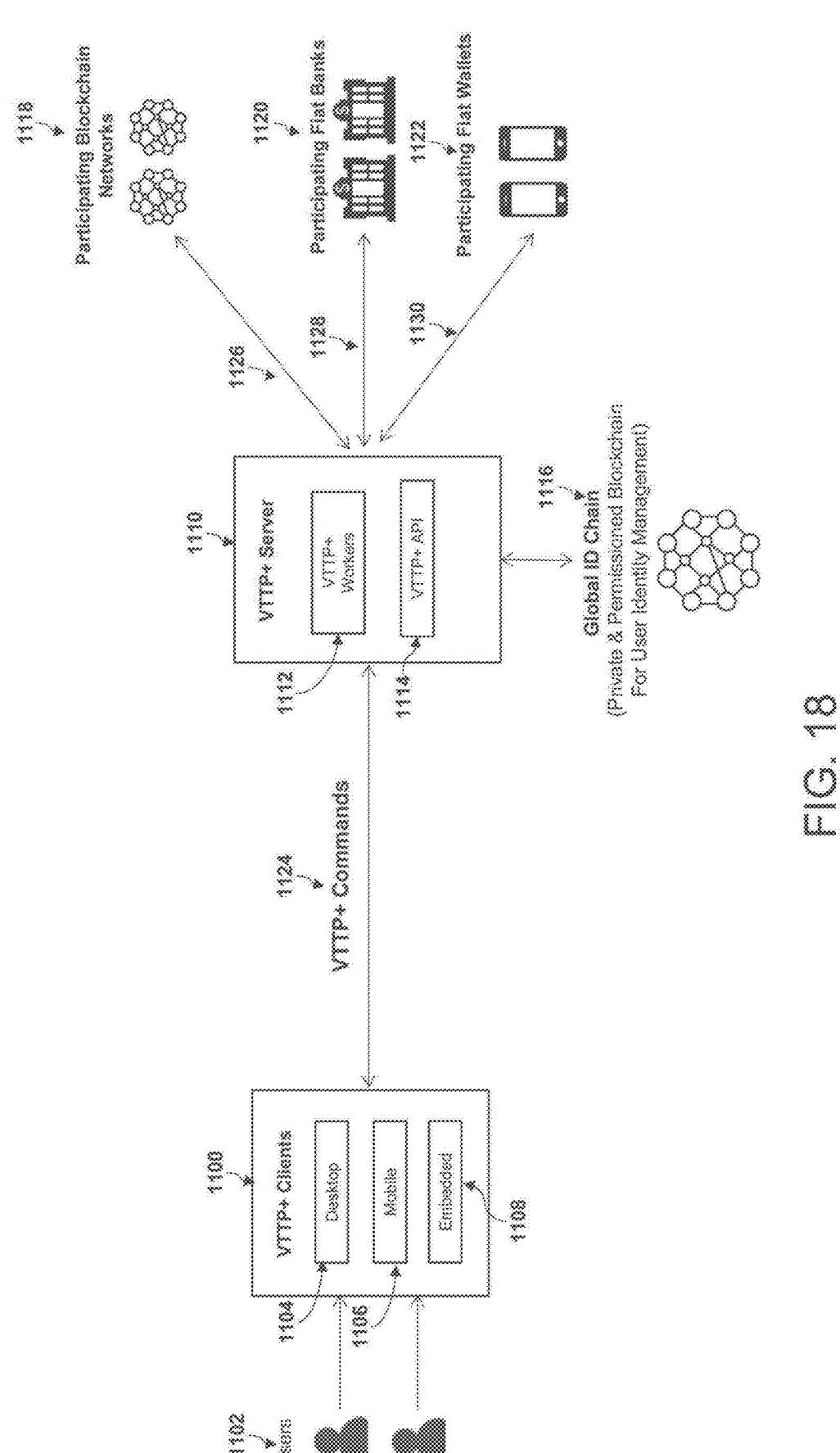
FIG. 18 is an illustration of the VTTP+ components, according to an embodiment of the invention.

Referring now to FIG. 18, components of the VTTP+ protocol are described in more detail. In the current embodiment, VTTP+ works as a request-response protocol based on a client-server architecture, where a VTTP+ client 1100 sends requests to a VTTP+ Server 1110, and the server 1110 responds to the requests. The VTTP+ clients 1100 may be available for different platforms and devices such as a desktop client 1104, a mobile client 1106 or an embedded client 1108. Users 1102 send VTTP+ requests to the VTTP+ server 1110 using VTTP+ clients 1100. VTTP+ requests contain VTTP+ commands 1124 which are processed by the VTTP+ server 1110. A VTTP+ server 1110 may have one or more VTTP+ Workers 1112 to process VTTP+ requests and execute the VTTP+ commands 1124 sent by VTTP+ clients 1100. The VTTP+ server 1110 may provide a VTTP+ API 1114 that allows the participating blockchain networks 1118, participating fiat banks 1120 and participating fiat wallets

1122 to use VTTP+ protocol for exchange of value 1126, 1128, 1130. The VTTP+ protocol supports the following types of transactions:

VTTP+ supports exchange of fiat currency (in fiat bank accounts and fiat wallet apps) with tokens on blockchain networks;

Fiat value transfer between fiat accounts of participating fiat banks;

Fiat value transfer between wallet accounts of participating fiat wallets;

Fiat value transfer between fiat accounts of participating fiat banks and accounts of participating fiat wallets;

VTTP+ allows retrieving information on accounts, balances, and transactions for all participating fiat bank accounts and fiat wallets; and VTTP+ allows retrieving information on accounts, balances, contracts, transactions for all participating blockchain networks.

A separate blockchain network 1116 may be used for user identity and access management. The identity information of each user may be maintained on a separate blockchain network. An identity verification and certification procedure is performed for securely linking blockchain accounts to real users. The identity (and associated blockchain accounts) of each user may be separately verified through an identity verification process. A system and associated methods for securely linking blockchain accounts to real users, as described in related U.S. patent application Ser. No. 15/863, 128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure may be performed, comprising receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 19:
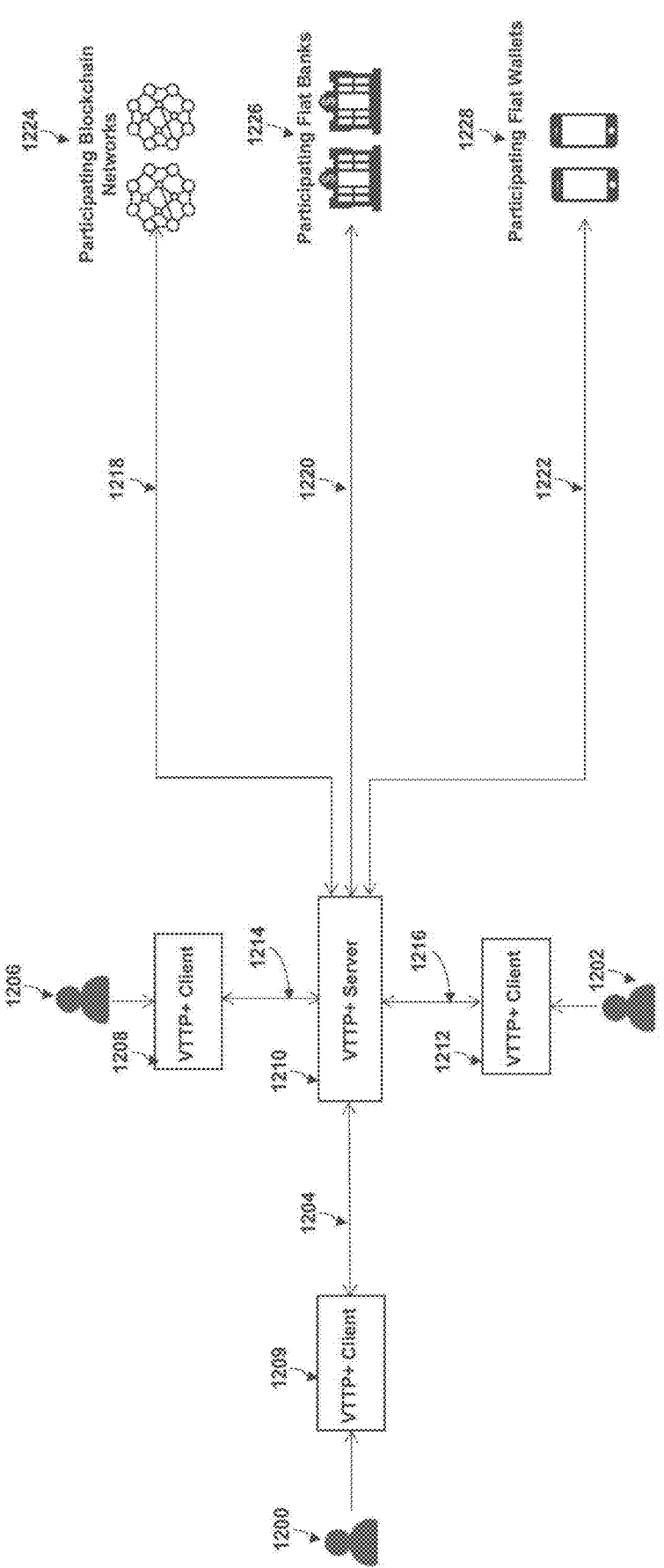
FIG. 19 is an illustration of a VTTP+ client-server model, according to an embodiment of the invention.

Referring now to FIG. 19, a VTTP+ client-server model is described in more detail. In the client-server model, VTTP+ works as a request-response protocol based on a client-server architecture, where users 1206, 1200, 1202 use VTTP+ clients 1208, 1209, 1212 to send requests 1214, 1204, 1216 to a VTTP+ server 1210, and the server 1210 responds to the requests. The server 1210 processes the VTTP+ requests 1214, 1204, 1216 and generates and sends transactions 1218, 1220, 1222 to participating blockchain networks 1224, participating fiat banks 1226 and participating fiat wallets 1228, to execute a value transfer.

Figure 20:
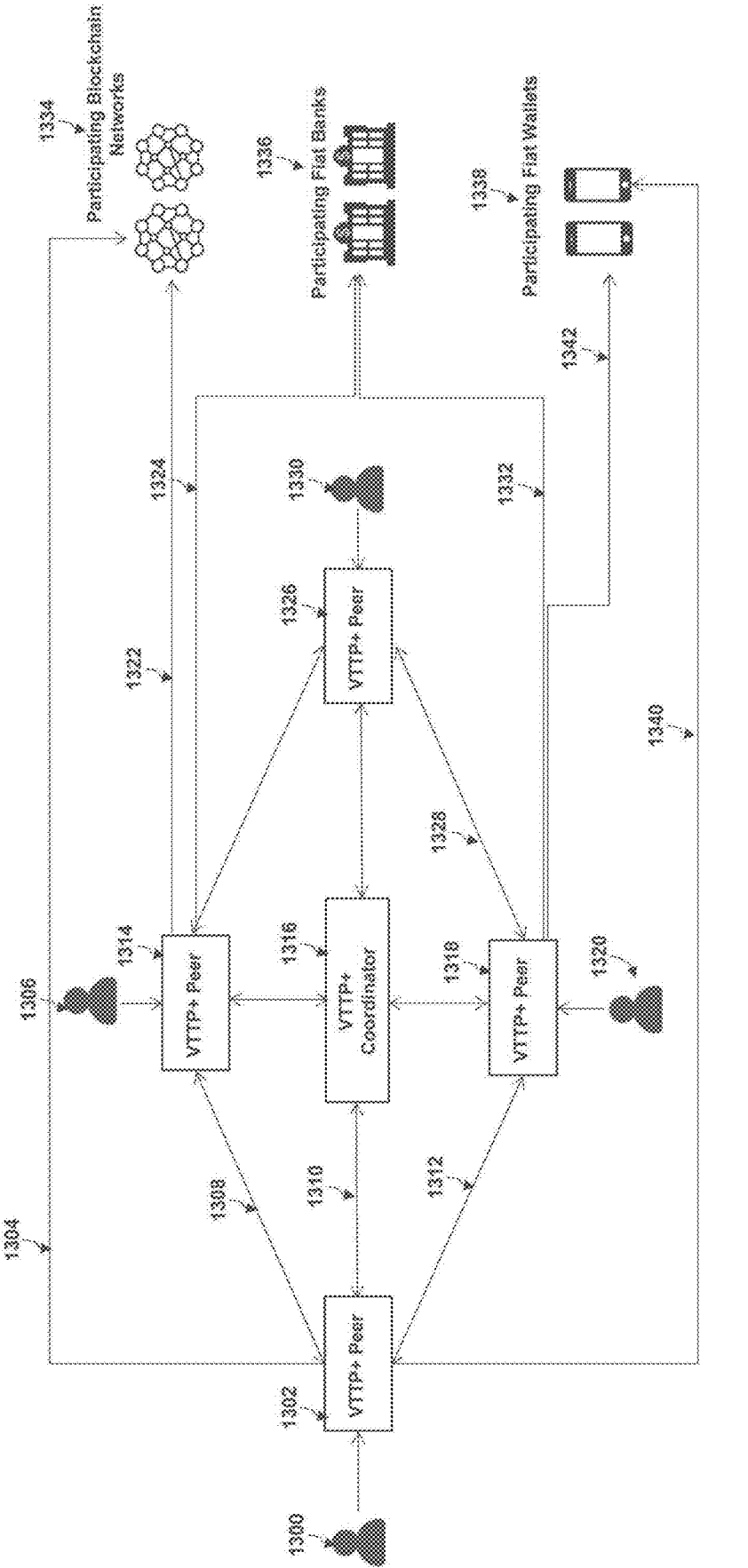
FIG. 20 is an illustration a VTTP+ peer-to-peer model, according to an embodiment of the invention.

Referring now to FIG. 20, a VTTP+ peer-to-peer model is described in more detail. In the peer-to-peer model, VTTP+ works as a peer-to-peer protocol where VTTP+ peers 1302, 1314, 1318, 1326 operated by respective users 1300, 1306, 1320, 1330 communicate 1308, 1312, 1328 directly with their peers. A VTTP+ coordinator 1316 may be used for coordinating 1310 the communication between peers. VTTP+ peers 1302, 1314, 1318, 1326 generate and send transactions 1304, 1322, 1324, 1332, 1340, 1342 to participating blockchain networks 1334, participating fiat banks 1336 and participating fiat wallets 1338, to execute a value transfer.

Referring now to FIG. 21, a VTTP+ intra-entity value transfer process is described in more detail. The VTTP+ intra-entity value transfer process enables transfer of cryptocurrency, tokens or fiat currency from one account to another account on the same entity (such as a participating blockchain network, participating fiat bank or participating fiat wallet). In the present embodiment, an intra-chain value transfer request may comprise a User A 1400 wanting to transfer certain units of a cryptocurrency, tokens or fiat currency from an account on an entity 1424 (participating blockchain network, participating fiat bank or participating fiat wallet) to the account of another User B 1402 on the same entity 1424. At step 1 1404, User A 1400 initiates value transfer request to send cryptocurrency, tokens or fiat currency to User B 1402 (e.g. to send 1 ETH from User A to User B, or $1 from user A to user B). At step 2 1410, a VTTP+ client 1406 associated with User A 1400 sends a VTTP+ SEND request to the VTTP+ server 1420. At step 3 1412, the VTTP+ server 1420 generates a raw transaction and returns the same in a SEND response to the VTTP+ client 1406 for User A 1400. At step 4 1414, User A 1400 signs the raw transaction with a private key comprised by the VTTP+ client 1406 and the VTTP+ client 1406 sends the VTTP+ SIGN transaction to the VTTP+ server 1420. At step 5 1422, the VTTP+ server 1420 verifies the signature and broadcasts the transaction to the entity 1424. At step 6 1416, User A 1400 receives a value transfer notification via the VTTP+ client 1406. At step 7 1418, User B 1402 receives a value transfer notification via a VTTP+ client 1408 associated with User B 1402.

Referring now to FIG. 22, a VTTP+ inter-entity value transfer process is described in more detail. The VTTP+ inter-entity value transfer process enables transfer of cryptocurrency, tokens or fiat currency from an account on an entity (such as a participating blockchain network, participating fiat bank or participating fiat wallet) to another account on a different entity. At step 1 1502, a User A 1500 initiates an inter-entity value transfer request to a User B 1504 (e.g. to send 1 ETH from user A to user B who receives the value in equivalent number of USD). At step 2 1510, a VTTP+ client 1506 associated with User A 1500 sends a VTTP+ SEND request to a VTTP+ server 1520. At step 3 1512, the VTTP+ server 1520 generates a raw transaction and returns the same in a SEND response to the VTTP+ client 1506. At step 4 1514, User A 1500 signs the raw transaction with a private key comprised by the CTTP+ client 1506 and the VTTP+ client 1506 sends the VTTP+ SIGN transaction to the VTTP+ server 1520. At step 5 1528, the VTTP+ server 1520 verifies the signature and broadcasts the transaction to the entity-1 1532. At step 6 1522, when the value transfer from an account associated with User A 1500 on entity-1 1532 to a Vault account on entity-1 1532 is confirmed, the cryptocurrency, tokens or fiat currency are sent to a Cryptocurrency/Token/Fiat Exchange account 1526. At step 7 1524, cryptocurrency, tokens or fiat currency are exchanged. At step 8 1530, the exchanged cryptocurrency, tokens or fiat currency are sent to an account associated with User B 1504 on entity-2 1534. At step 9 1516, User A 1500 receives a value transfer notification via the VTTP+ client 1506. At step 10 1518, User B 1504 receives a value transfer notification via a VTTP+ client 1508 associated with User B 1504.

Figure 23:
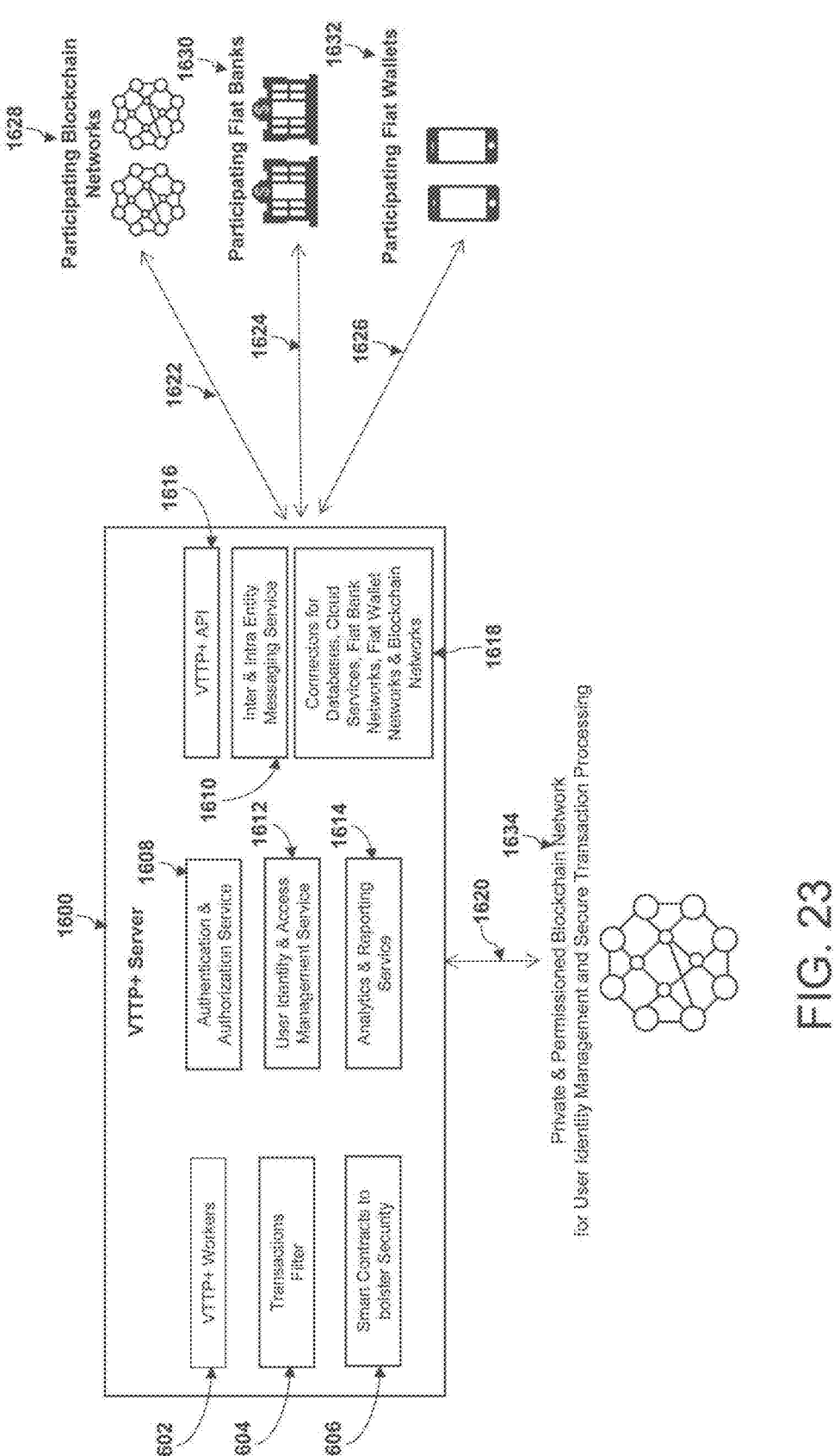
FIG. 23 is an illustration of an exemplary VTTP+ server architecture, according to an embodiment of the invention.

Referring now to FIG. 23, an exemplary VTTP+ server architecture, is described in more detail. A VTTP+ server 1600 may have one or more VTTP+ Workers 1602 that are individual services to process VTTP+ requests and execute the VTTP+ commands sent by VTTP+ clients. The VTTP+ server 1600 may further comprise a VTTP+ API 1616 that allows the participating blockchain networks 1628, participating fiat banks 1630 and participating fiat wallets 1632 to use VTTP+ protocol for exchange of value. A separate blockchain network 1634 may be positioned in communication 1620 with the VTTP+ server 1600 and used for user identity and access management. The VTTP+ server 1600 may further comprise additional services, such as a User Identity & Access Management Service 1612, an Authentication & Authorization Service 1608, and an Analytics & Reporting Service 1614. The VTTP+ server 750 may further comprise inter- and intra-entity messaging services 1610 and connectors for databases, cloud services, fiat bank networks, fiat wallet networks & blockchain networks 1618. A transactions filter 1604 may be comprised by the server 1600 for filtering transactions. The server 1600 may use various Smart Contracts 1606 to bolster security. These smart contracts 1606 may be executed for each VTTP+ request and perform additional verification (such as verifying sender and receiver's address). The smart contracts may enforce checks such as time limits or quantity restrictions. Some smart contracts may perform functions similar to virus filters, for filtering out suspicious transactions. New smart contracts can be distributed to VTTP+ servers in a manner similar to virus updates.

Figure 24:
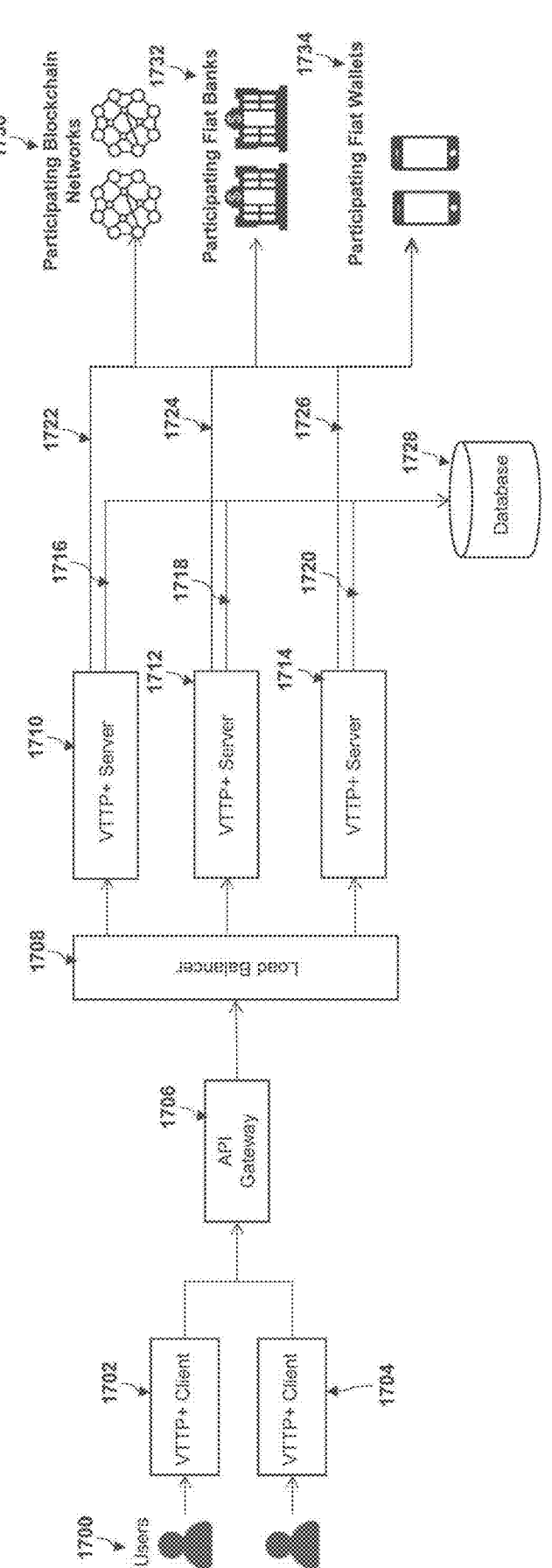
FIG. 24 is an illustration of an exemplary VTTP+ reference architecture, according to an embodiment of the invention.

Referring now to FIG. 24, an exemplary VTTP+ reference architecture is described in more detail. Users 1700 may use VTTP+ clients 1702, 1704 to communicate with VTTP+ servers 1710, 1712, 1714 through an API gateway 1706. The VTTP+ servers 1710, 1712, 1714 sit under a load balancer 1708 and expose a number API endpoints. The API gateway 1706 makes these APIs available to the VTTP+ clients 1702, 1704. Each API has an endpoint (for example, vttps://example.com/ethereum) and a set of VTTP+ methods or commands which are supported for the endpoint (such as GET, SEND, REQUEST, etc.). The API gateway 1706 may use an API key to enable authentication for APIs. The API gateway 1706 may also perform additional functions such as logging each API request and rate-limiting of requests. A separate relational (SQL) or non-relational (NoSQL) database 1728 may be used to store data such as user credentials and application specific data. Each VTTP+ server 1710, 1712, 1714 is connected to all participating blockchain networks 1730, participating fiat banks 1732 and participating fiat wallets 1734.

Figure 25:
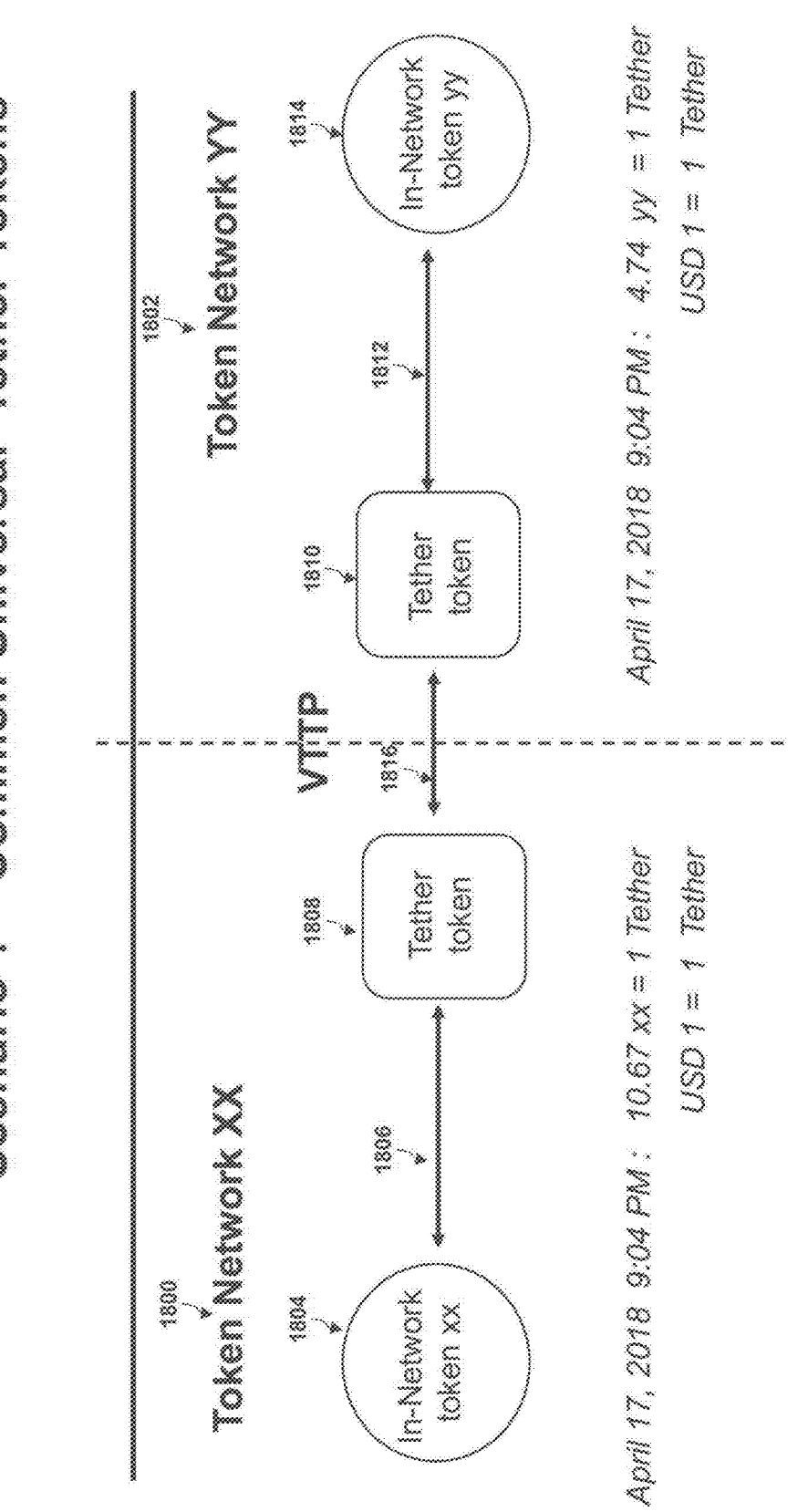
FIG. 25 is an illustration of an exemplary scenario of value transfer between two networks which use common universal tether tokens, according to an embodiment of the invention.

Referring now to FIG. 25, an illustration of an exemplary scenario of value transfer between two networks which use common universal tether tokens is described in more detail. A first blockchain network XX 1800 uses an in-network token xx 1804 and a tether token 1808, where the in-network token xx 1804 can be exchanged 1806 for the tether token 1808. A second blockchain network YY 1802 uses an in-network token yy 1814 and a tether token 1810, where the in-network token yy 1814 can be exchanged 1812 for the tether token 1810. The tether tokens 1808 and 1810 used in the two networks 1800 and 1802 is the same. The common tether token 1808, 1810 may be tethered to a stable fiat currency like USD which is external to blockchain networks XX and YY 1800, 1802. Current cryptocurrency exchanges use a tether token such as USD Tether (USDT) and a user can sell any cryptocurrency/token and convert to USDT and then use it to get any other cryptocurrency/token on the same exchange. However, current cryptocurrency exchanges don't allow transfer of the tether token (such as USDT) from one exchange to another. A user can sell a cryptocurrency/ token (such as BTC) on a first exchange to get USDT but the user cannot transfer USDT to a second exchange to buy another cryptocurrency/token (such as ETH). The use of a common tether token and VTTP/VTTP+ enables exchange of tokens 1816 between different token networks. The cost per in-network token transaction is very low (near zero), and conversion of tether to fiat is only done infrequently based on a time period or a certain number of transactions.

Figure 26:
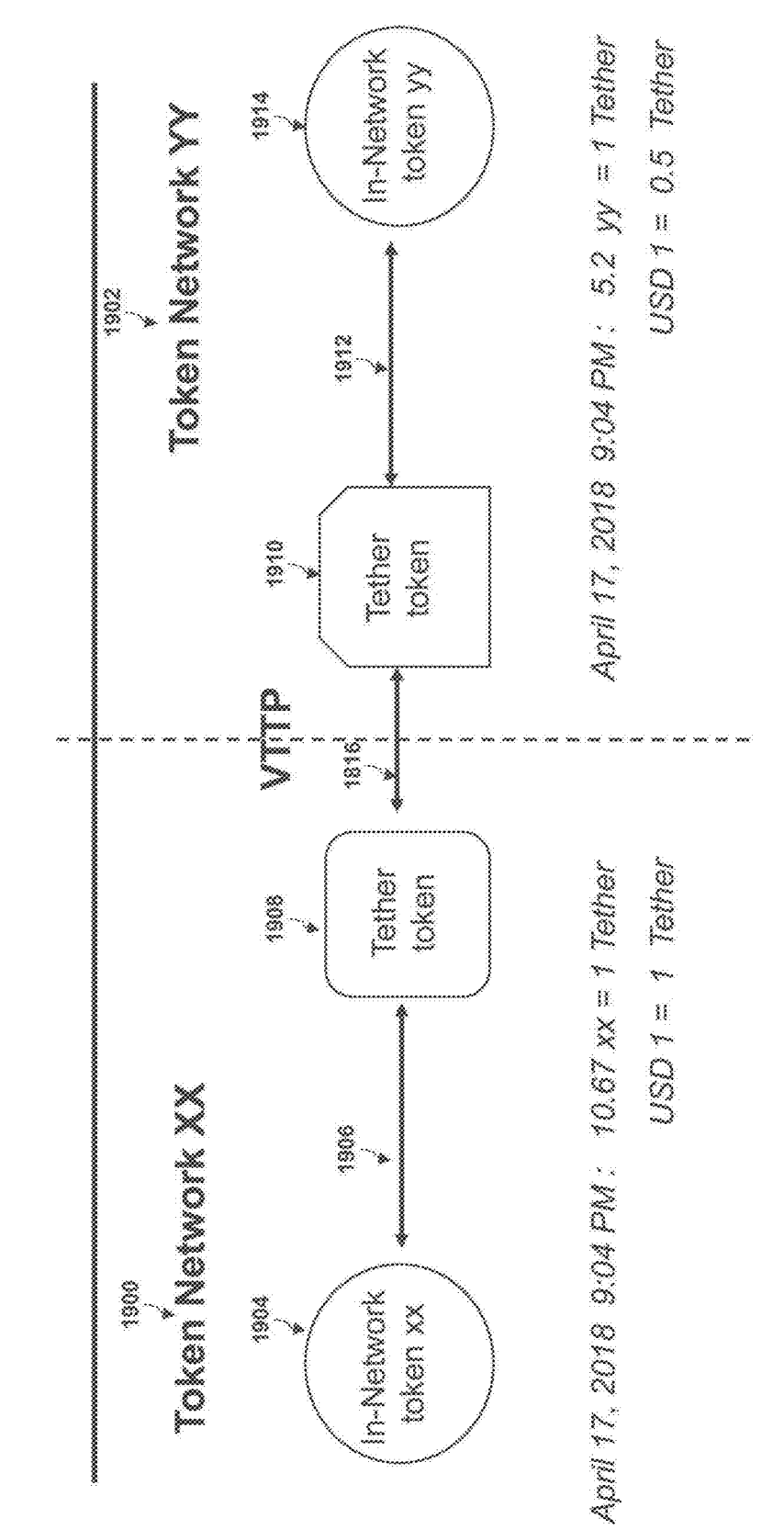
FIG. 26 is an illustration of an exemplary scenario of value transfer between two networks which use different tether tokens, according to an embodiment of the invention.

Referring now to FIG. 26, an illustration of an exemplary scenario of value transfer between two networks which use different tether tokens, is described in more detail. A first blockchain network XX 1900 uses an in-network token xx 1904 and a tether token 1908, where the in-network token xx 1904 can be exchanged 1906 for the tether token 1908. A second blockchain network YY 1902 uses an in-network token yy 1914 and a tether token 1910, where the in-network token yy 1914 can be exchanged 1912 for the tether token 1910. The tether tokens 1908 and 1910 used in the two networks 1900 and 1902 are different. The use of different tether tokens and VTTP/VTTP+ enables exchange of tokens between different token networks. This different tether token approach may be beneficial where the blockchain networks XX and YY 1900, 1902 operate in different countries and national governments require local tether tokens so that money can't leave the borders to provide local guarantees for safety of consumers. Accordingly, in some embodiments, tether token 1908 may be tethered to a first fiat currency and tether token 1910 may be tethered to a second fiat currency different from the first fiat currency. Moreover, as a result of tether token 1910 being tethered to a second fiat currency, the value of the tether token 1910 may be expressed in terms of the first fiat currency that is proportionate to the conversion ratio between the first and second fiat currencies. In the present example, the tether token 1910 has a conversion ratio of 0.5 per 1 USD. The cost per in-network token transaction is very low (near zero), and conversion of tether to fiat is only done infrequently based on a time period or a certain number of transactions.

Figure 27:
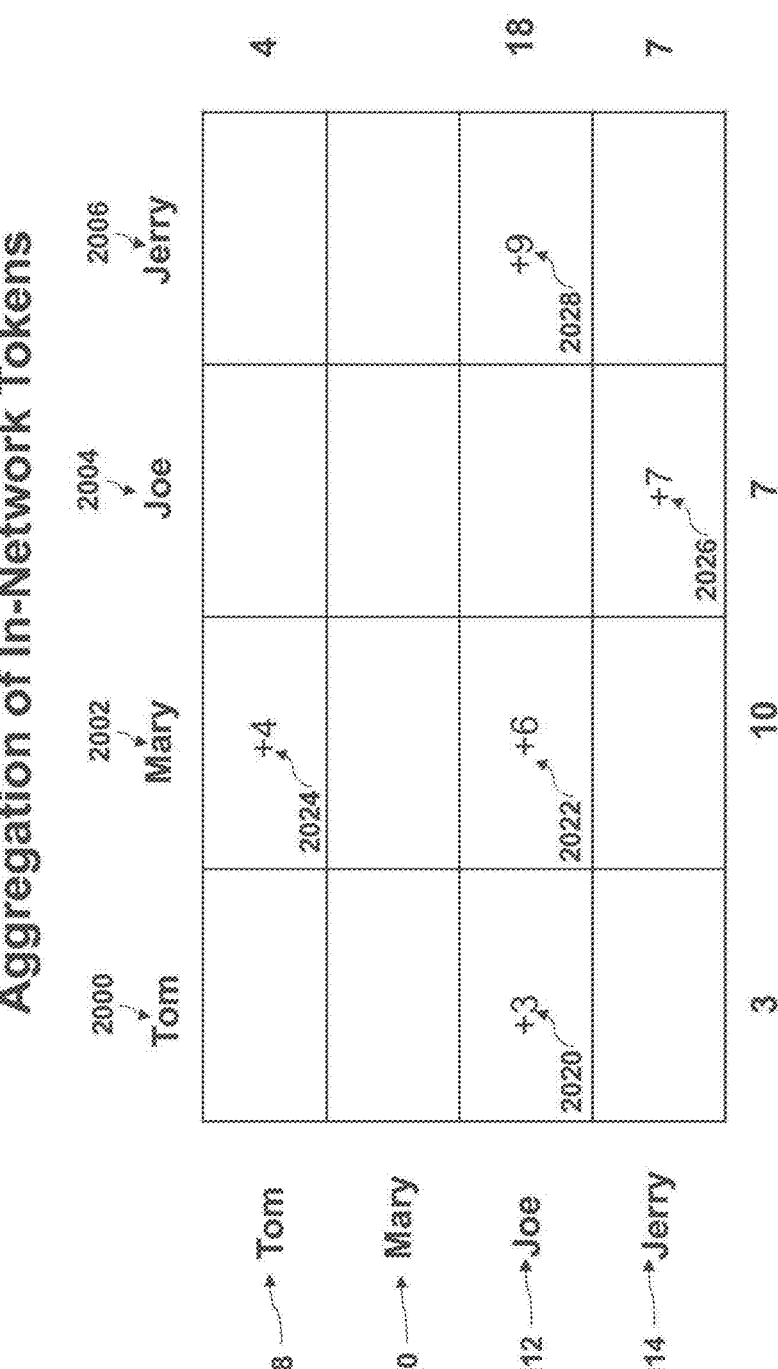
FIG. 27 is an illustration of an exemplary scenario of aggregation transactions of in-network tokens, according to an embodiment of the invention.

Referring now to FIG. 27, an illustration of an exemplary scenario of aggregation of in-network tokens is described in more detail. In the embodiment shown in FIG. 27, there are four users. The present embodiment describes individual in-network transactions between users. The users Tom, Mary, Joe, and Jerry may each have user account addresses on a blockchain network that uses the in-network tokens. A plurality of transaction requests may be received, with each transaction action comprising a sending user account address, a receiving user account address, and a transaction value expressed in terms of a quantity of in-network tokens. The transactions may each have an associated transaction request smart contract recorded to the blockchain network, defining a plurality of transaction request smart contracts. FIG. 27 depicts the transactions with receiving user account addresses 2000, 2002, 2004, 2006 and sending user account addresses 2008, 2010, 2012, 2014 for the users. A first transaction request 2020 may comprise Joe 2012 as the sending user account address, Tom 2000 as the receiving user account address, and a transaction amount of three in-network. A second transaction request 2022 may comprise Joe 2012 as the sending user account address, Mary 2002 as the receiving user account address, and a transaction amount of 6 in-network tokens. A third transaction request 2024 may comprise Tom 2008 as the sending user account address, Mary 2002 as the receiving user account address, and a transaction amount of four in-network tokens. A fourth transaction request 2026 may comprise Jerry 2014 as the sending user account address, Joe 2004 as the receiving user account address, and a transaction amount of 7 in-network tokens. A fifth transaction request 2028 may comprise Joe 2012 as the sending user account address, Jerry 2006 as the receiving user account address, and a transaction amount of 9 in-network tokens. Each user's aggregation account values are calculated in tethered tokens as shown, for instance, with Joe having a net debit of 11 in-network tokens that is converted to a value of 5.5 negative (or debited) tethered tokens, based on a conversion ratio of 2 in-network tokens for one tethered token). Determination of aggregation account value results in some user account addresses having a net credit, defining a credit user account address, and other user account addresses having a net debit, defining debit user account addresses. The aggregation of transactions may be recorded to an aggregate transaction record. Such a record may be recorded in a smart contract on the blockchain network. In some embodiments, the aggregate transaction record smart contract may comprise an address for each smart contract associated with the plurality of transaction requests. Prior to processing each transaction request, a balance check procedure may be performed do determine if each user account has a present permitted transaction amount that is sufficient to cover a debit of tokens as indicated in the transaction request. If there is a present permitted transaction amount of 15 in-network tokens for Joe, he is still allowed to "spend" 18 in-network tokens since he is credited 7 tokens from Jerry, bringing his update permitted transaction amount to 11 at the time the entire set of in-network tokens is synchronized into tethered tokens as an aggregated batch. The execution of the net transaction amount may occur upon reaching an aggregation threshold, that may be based on time, such a predefined length of time since a previous net transaction execution, value periods, a gross transaction amount (i.e. the total value of each transaction), or a risk tolerance based upon at least one of the conversion ratio, the net transactions, the present permitted transaction amount of one, some, or all of the user account addresses, or combinations thereof. The net transaction may be recorded to a net transaction smart contract on the blockchain network. Further, should there be tax or other implications for certain individual in-network transactions, or transaction costs, smart contracts will calculate taxes and/or transaction costs for individual in-network transactions and store them on the blockchain for retrieval and analysis. The VTTP services can monitor dynamic behavior of the users and the transactions and collection statistical data that may be used to adjust the period over which aggregation may take place, or its frequency based on the volume of the transactions and their relative amounts in a manner to minimize transaction costs (primarily through conversions to fiat currency, if any). Further transaction limits in terms of amounts of tokens permitted for each user may also be based on the statistics collected to ensure that risk is minimized. These analytics functionalities may assist the operators of the exchanges and VTTP services to maximize throughput and efficiency while minimizing risk and improving their cost and revenues.

In some embodiments, where a sending user account address is determined to not have a present permitted transaction amount greater than a transaction amount of a transaction request, the transaction request may be re-processed, including a redetermination of if the transaction value is greater than the present permitted transaction amount of the sending user account address after at least one of a first time interval and an intervening transaction including the sending user account address. Such re-processing may be defined as a transaction retry. There may be one or more transaction retry attempts. In some embodiments, there may be a limit to transaction retry attempts based on a fixed number of attempts or a second time interval measured from the original transaction request or the first transaction retry attempt.

Figure 28:
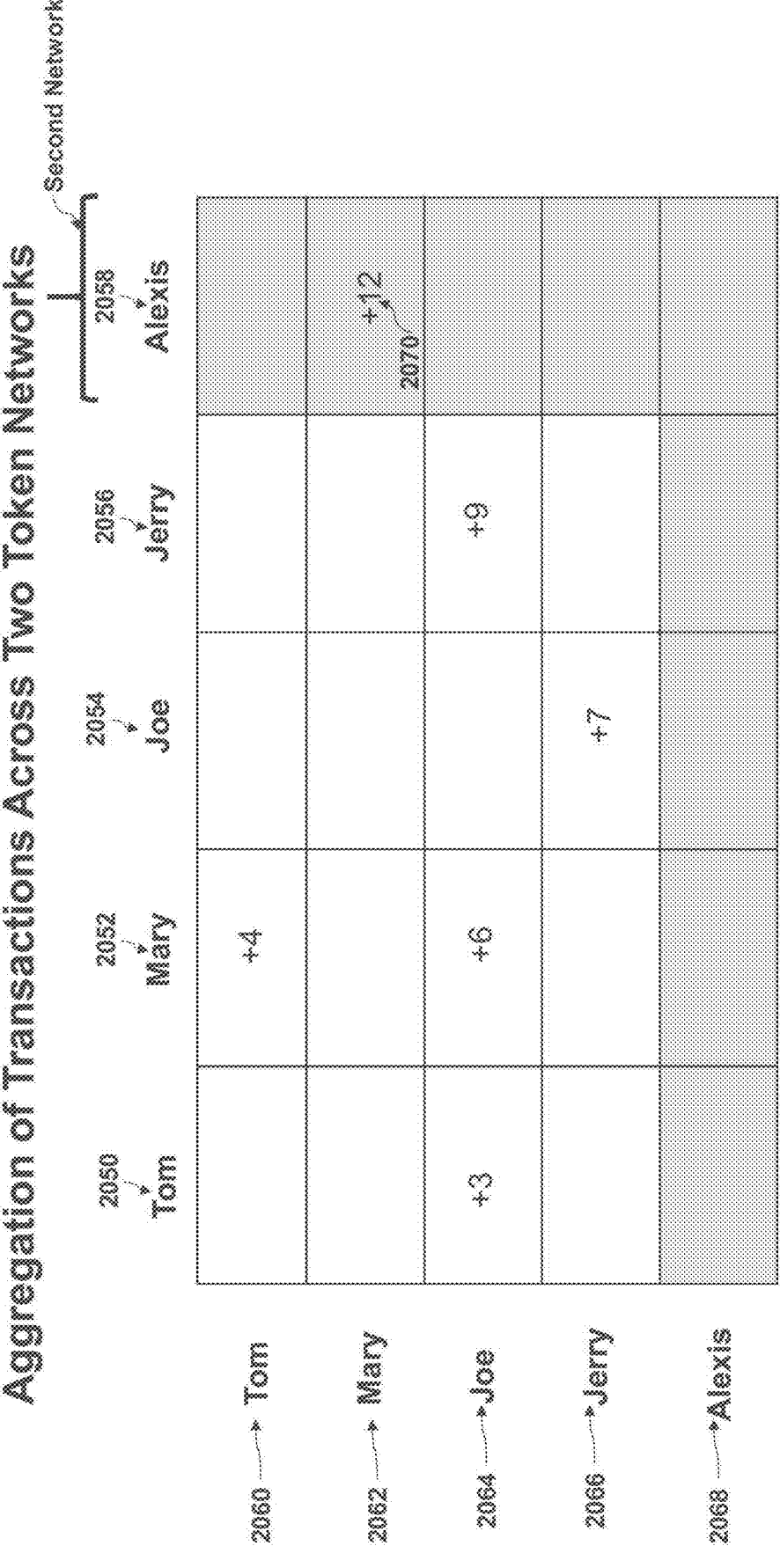
FIG. 28 is an illustration of an exemplary scenario of aggregation of transactions across two blockchain networks utilizing respective first and second in-network tokens, according to an embodiment of the invention.

Referring now to FIG. 28, an illustration of an exemplary scenario of aggregation of transactions across two token networks, is described in more detail. As noted in FIG. 28, in this embodiment there are five users, where the fifth user belongs to a second and different blockchain network that has a different second tethered token. A transaction request 2070 comprising Mary 2062 as the sending user account address and user Alexis 2058 as the receiving user account address on the second blockchain ratio, and a transaction amount of 12 first in-network tokens. An amount of first in-network tokens equal in value to the net credit to Alexis 2058, defining a net credit value, may be exchanged for an amount of first tethered tokens having a value equal to the net credit value. The first tethered tokens resulting from this exchange may be comprised by a first tethered token transfer record that may be recorded to the first blockchain network. A transaction of sending the tokens comprised by the first tethered token transfer record to a tethered token exchange may be recorded to the first blockchain network, similar to the procedure shown in FIG. 22. The first tethered tokens may be exchanged for an amount of second tethered tokens having a value equal to the net credit value. The second tethered coins resulting from the exchange may be comprised by a second tethered token transfer record. A transaction of receiving the tokens comprised by the second tethered token transfer record at the second blockchain network from the tethered token exchange may be recorded to the second blockchain network. Subsequently, the tokens comprised by the second tethered token transfer record may be exchanged on the second blockchain network for an amount of second in-network tokens having a value equal to the net credit value. The second in-network tokens resulting from this exchange may be defined as a second blockchain network deposit. The tokens of the second blockchain network deposit may then be deposited to the user account address on the second blockchain network associated with Alexis. The conversion ratio of the first tethered token in the first blockchain network to a second tethered token in a second blockchain network in the present embodiment is two to one. As noted, for user Alexis 2058 on the second blockchain network, there is a credit to her account of 3 second tethered tokens. assuming a ratio of 2 first tethered tokens of the first blockchain network being exchanged for one second tethered token on the second blockchain network. Accordingly, the first in-network token may have a first exchange rate with the first tethered token, the second in-network token may have a second exchange rate with the second tethered token, and the first tethered token may have a third exchange rate with the second tethered token.

In some embodiments, where a transaction request requires a conversion between two tethered tokens that are tethered to different fiat currencies, the present permitted transaction amount may be updated to reflect additional risk in the transaction resulting from the multiple exchange rates involved.

Figure 29:
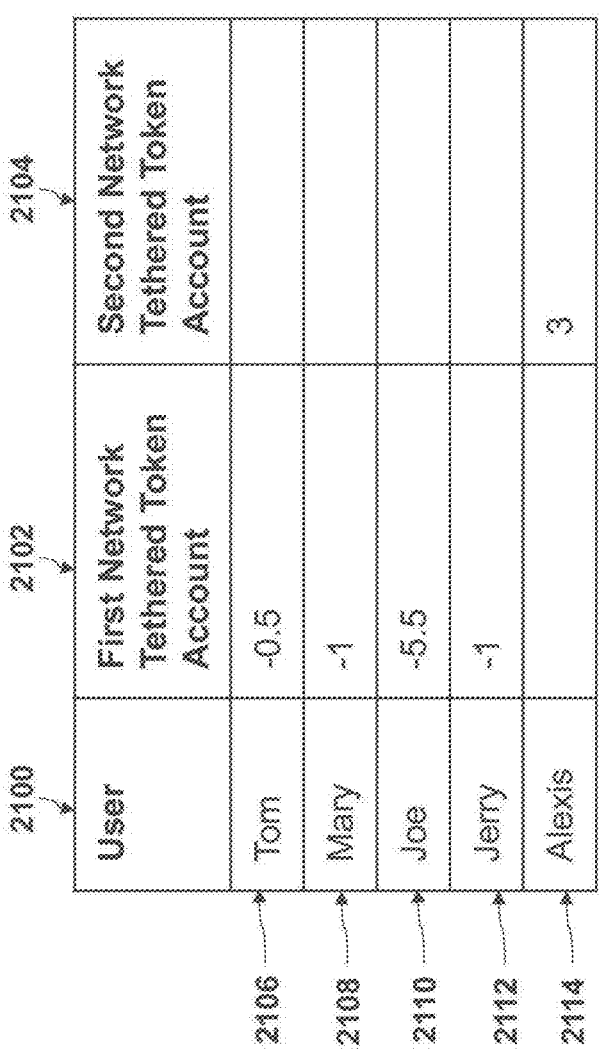
FIG. 29 is an illustration of the result of an exemplary scenario of aggregation of transactions across two token networks, according to an embodiment of the invention.

FIG. 29 shows an illustration of the result of an exemplary scenario of aggregation of transactions across two token networks in terms of the tethered tokens after suitable conversions. One may also consider embodiments that may modify the way the aggregation is done within the network and across the network, for instance, by operating on in-network tokens themselves, as opposed to converting to tethered tokens, should the business context be suitable for elimination of tethered tokens. The claims will determine the scope of our inventions, which may cover one or more of the embodiments discussed.

Figures 30, 31:
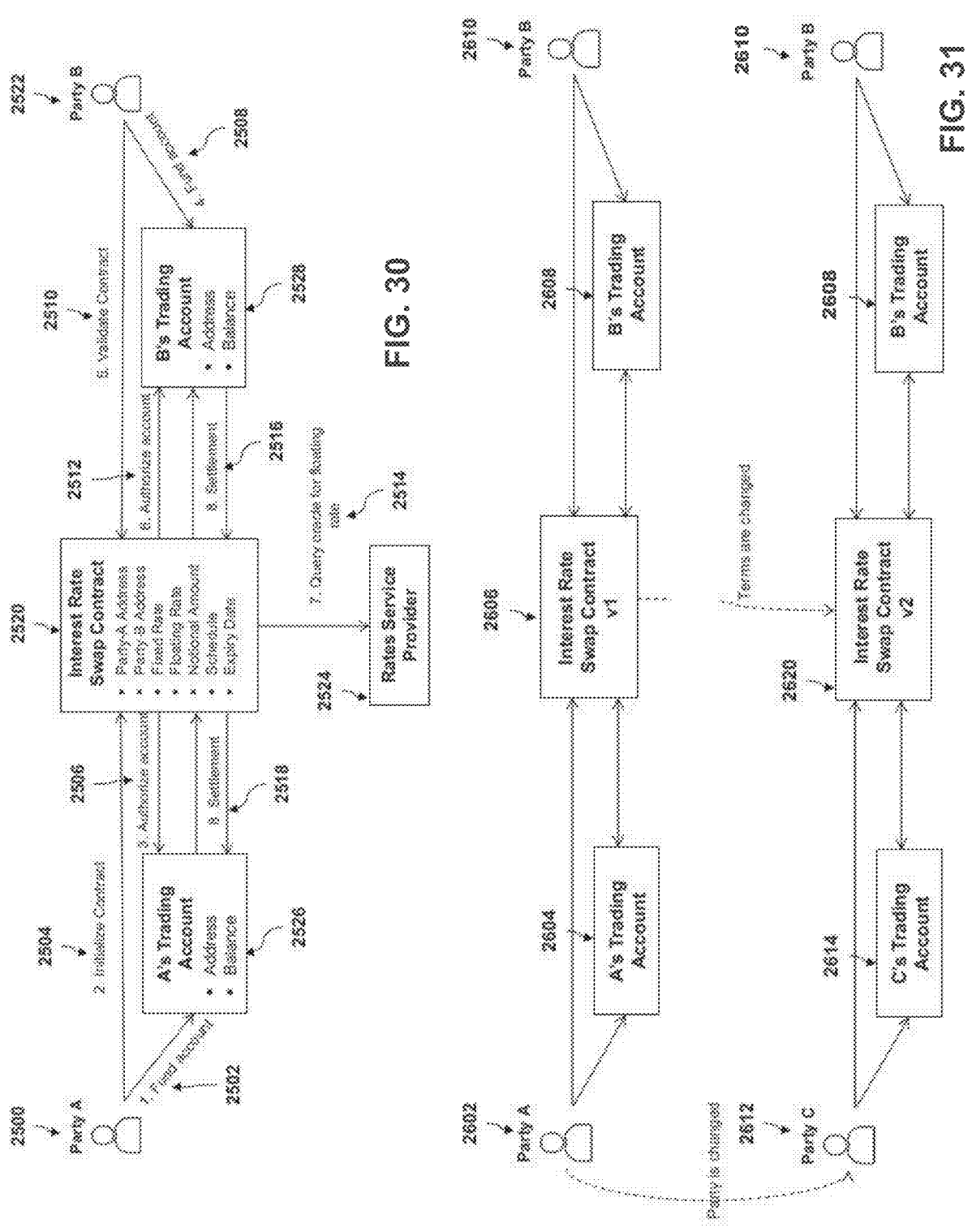
FIG. 30 an illustration of the structure of an interest rate swap (IRS) contract, according to an embodiment of the invention.
FIG. 31 an illustration of an embodiment of an IRS contract where one party is replaced by another, according to an embodiment of the invention.

Referring now to FIG. 30 the structure of an interest rate swap contract, is described in more detail. An Interest Rate Swap is a financial derivative instrument in which two parties agree to exchange interest rate cash flows based on a notional amount. The swap can either be from a fixed rate to a floating rate or from one floating rate to another floating rate.

The interest rate swap (IRS) contract includes the following elements:

Party A: Party A agrees to make payments to Party B based on a fixed interest rate;

Party B: Party B agrees to make payments to Party A based on a floating interest rate.

Fixed Rate: Fixed Rate paid by Party A to Party B.

Floating Rate: Floating Rate paid by Party B to Party A.

Reference Rate: The floating rate is indexed to a reference rate such as the London Inter-Bank Offered Rate (LIBOR).

Notional: Notional is the amount by which the fixed and floating rates are multiplied, to determine the amount each party needs to pay to the other. When both the fixed and floating legs of the IRS contract are in the same currency, only the net amount due (difference of the amounts each party owes to the other) is paid to the party.

Schedule: The schedule for exercising the swap, for example monthly, quarterly, or yearly.

Expiration Date: Date on which the IRS contract expires.

An exemplary embodiment may be an interest rate swap contract with 100000 notional, a monthly schedule and 10-year maturity. The fixed leg require payment by Party A to Party B of 1.5% monthly, and the floating leg may require payment by Party B to Party A of (LIBOR+1%) monthly. The contract may require that if the LIBOR rate is 0.30% at the end of a particular month, Party A will be required to pay (1.5%*100000) to Party B, and, Party B will be required to pay (1.3%*100000) to Party A. The net amount due in this case is 20000 to be paid by Party A to Party B. Should the LIBOR rate increase to 0.60% at the end of a particular month, Party A would be required to pay (1.5%*100000) to Party B and Party B would be required to pay (1.6%*100000) to Party A. The net amount due in this instance is 10000 to be paid by Party B to Party A.

Figure FIG. 30 shows the structure of the interest rate swap contract 2500, a smart contract for the trading account of Party A 2526, smart contract for the trading account of Party B 2528, and a smart contract for the rate provider 2514 which provides the current reference rate. With the IRS contract 2520, the contract owner (either of two parties) can initialize a contract by providing details such as the addresses of the trading accounts of the two parties, fixed rate, floating rate margin, schedule and time to expiry. The other party can then validate the contract. After the two parties enter into the contract, the contract is exercised as per the schedule (e.g. every month) till it expires. The steps of an exemplary method for setting up the IRS contract 2520 are as follows. At step 2502, Party A 2500 funds its trading account 2526. At step 2504, Party A 2500 initializes the IRS smart contract 2520 by providing details such as the addresses of the trading accounts of the two parties, fixed rate, floating rate margin, schedule and time to expiry. At step 2506, Party A 2500 authorizes the IRS contract 2520 to spend from the trading account 2526. At step 2508, Party B 2522 funds its trading account 2528. At step 2510, Party B 2522 validates the IRS contract 2520. At step 2512, Party B 2522 authorizes the IRS contract 2520 to spend from the trading account 2528. At 2514, the IRS contract 2520 queries the rate service provider contract 2524 for getting the floating rate. At step 2518, settlement is done between the IRS contract 2520 and the Party A's trading account 2626. At step 2516, settlement is done between the IRS contract 2520 and the Party B's trading account 2628.

Referring now to FIG. 31 an illustration of an exemplary embodiment where one party is replaced by another, is described in detail. Part A 2602 has a trading account 2604 and Party B 2610 has a trading account 26042608. The trading accounts interact with the IRS contract 2606. An update can be done in the terms of the IRS contract 2606 resulting in an updated contract 2620 such that Party A 2602 is replaced by another Party C 2612 with trading account 2614.

Figure 32:
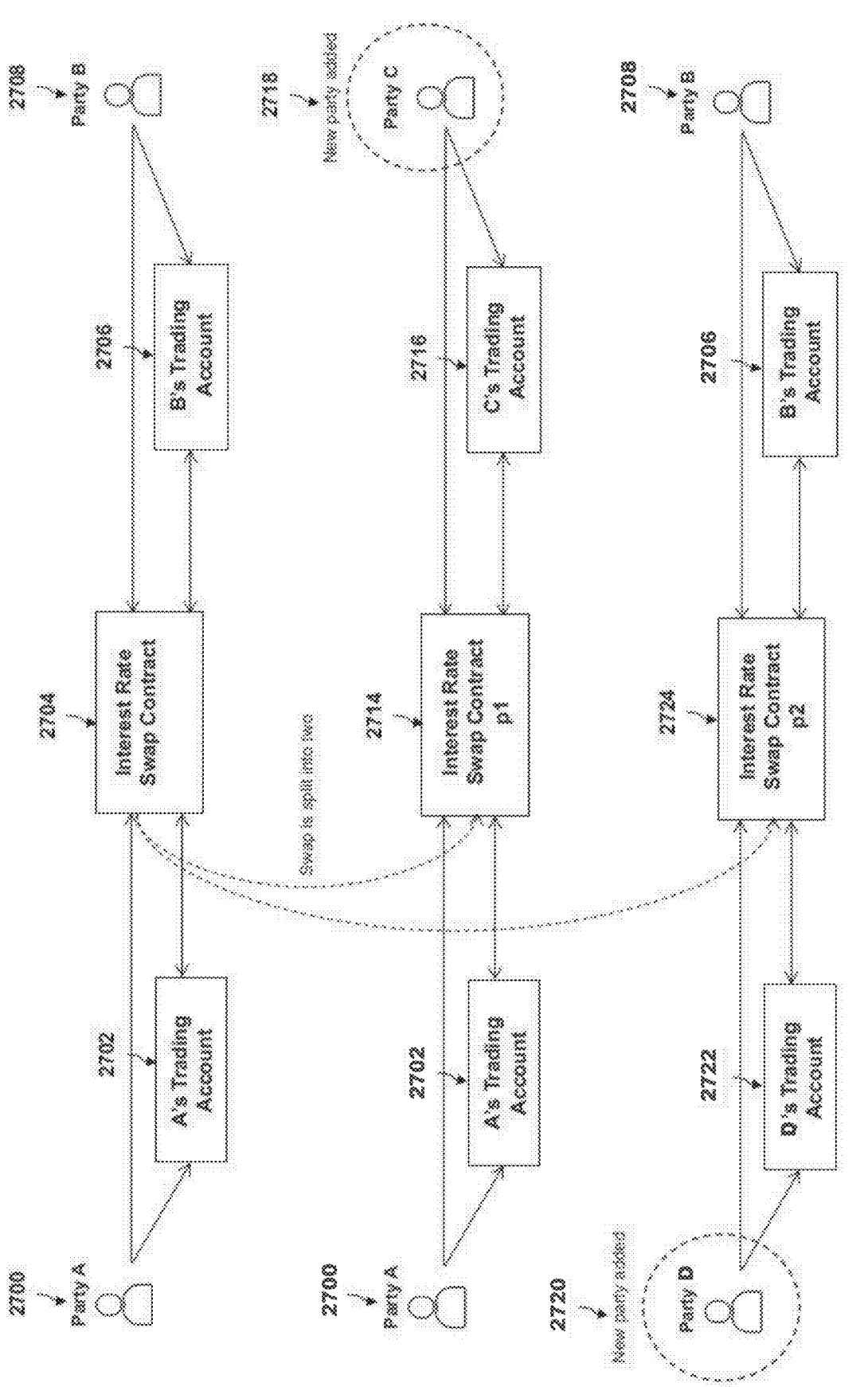
FIG. 32 an illustration of an embodiment where one IRS contract is split into two IRS contracts and a new party is added, according to an embodiment of the invention.

Referring now to FIG. 32 an illustration of a scenario where a single IRS contract is split into two IRS contracts and a new party is added, is described in detail. Part A 2700 has a trading account 2702 and Party B 2708 has a trading account 2706. The trading accounts interact with the IRS contract 2704. The IRS contract 2704 can be split into two contracts 2714 and 2724. In the updated IRS contract 2714 a new Party C 2714 with trading account 2716 is added replacing Part B 2708 and in the updated IRS contract 2724 a new Party DC 2720 with trading account 2022 is added replacing Party A 2710. In some embodiments, Parties C and D 2718, 2720 may be the same party.

There can be other scenarios such as changes in contract terms or changes in balances.

Figure 33:
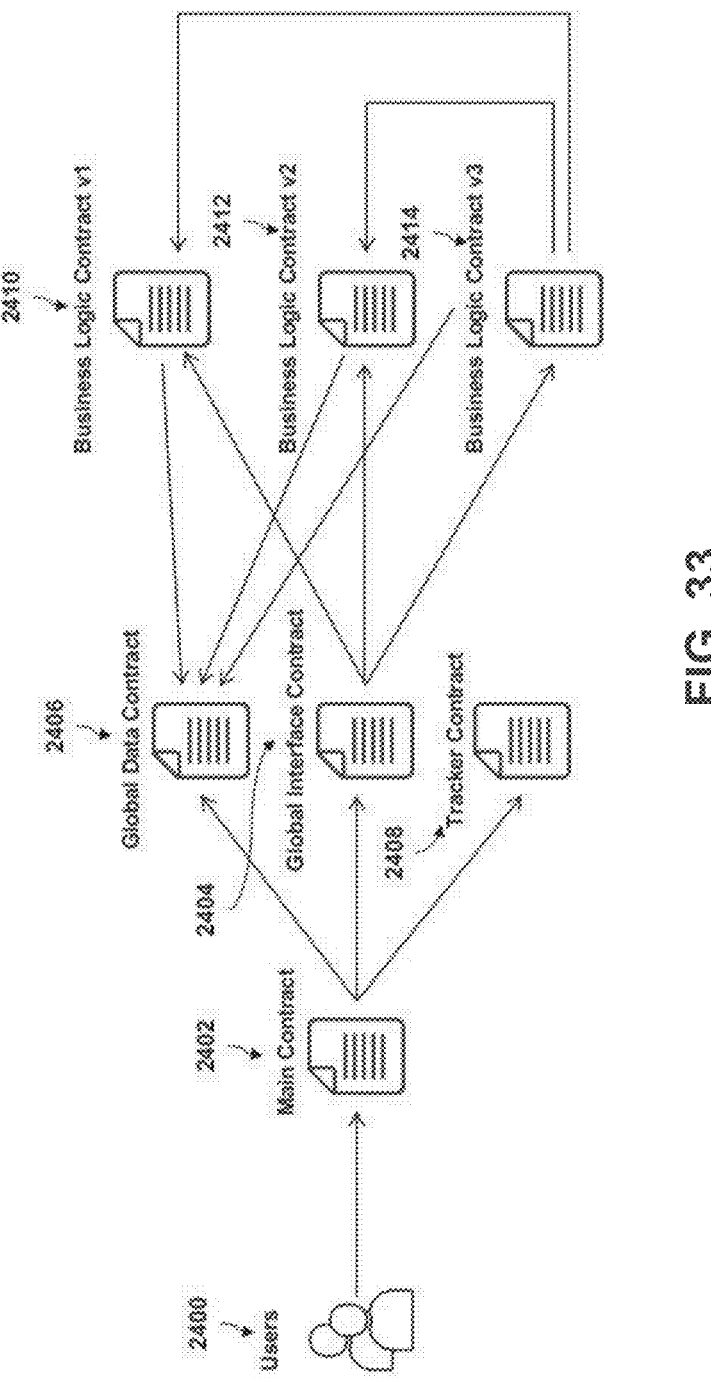
FIG. 33 an illustration of an approach for tracking updates in multi-party linked smart contracts, according to an embodiment of the invention.

Referring now to FIG. 33 an illustration of an approach for tracking updates in multi-party linked smart contracts, is described in more detail. In this approach the contract Data, Interface and Logic is separated into different contracts which are tracked through a Tracker contract and glued together by a main contract 2402. The main contract 2402 may serve as a central point of data, interface, logic, and tracker contracts for the multi-party linked smart contracts, as will be discussed below. The main contract 2402 may comprise addresses on blockchain networks upon which the multi-party linked smart contracts are deployed. Furthermore, the main contract 2402 may be the smart contract that interfaces with users 2400. The multi-party linked smart contracts may further comprise a global data contract 2406. All data is stored in the global data contract 2406. The multi-party linked smart contracts may further comprise a global interface contract 2404. The global interface contract 2404 may provide an interface to the business logic which is implemented by one or more business logic contracts. The multi-party linked smart contracts may further comprise a tracker contract 2408. The tracker contract 2408 tracks updates to contracts of the multi-party linked smart contracts. The multi-party linked smart contracts may further comprise one or more business logic contracts 2410, 2412, 2414, which may implement the business logic. There can be one or more such contracts which can reference each other. The business logic may be understood as the transactional requirements and obligations agreed upon by the multiple parties and the underlying functions to enforce and perform such agreed-upon requirements and obligations.

The architecture in Figure FIG. 33 can be simplified by combining the main contract 2402 with the global interface contract 2404, or main contract 2402 with the global data contract 2406, or main contract 2402 with the tracker contract 2408 in different embodiments. A user interface may be provided that is linked to the system to display various user view and edit options. Any types of user views and editing options as are known in the art are contemplated and included within the scope of the invention.

Figure 34:
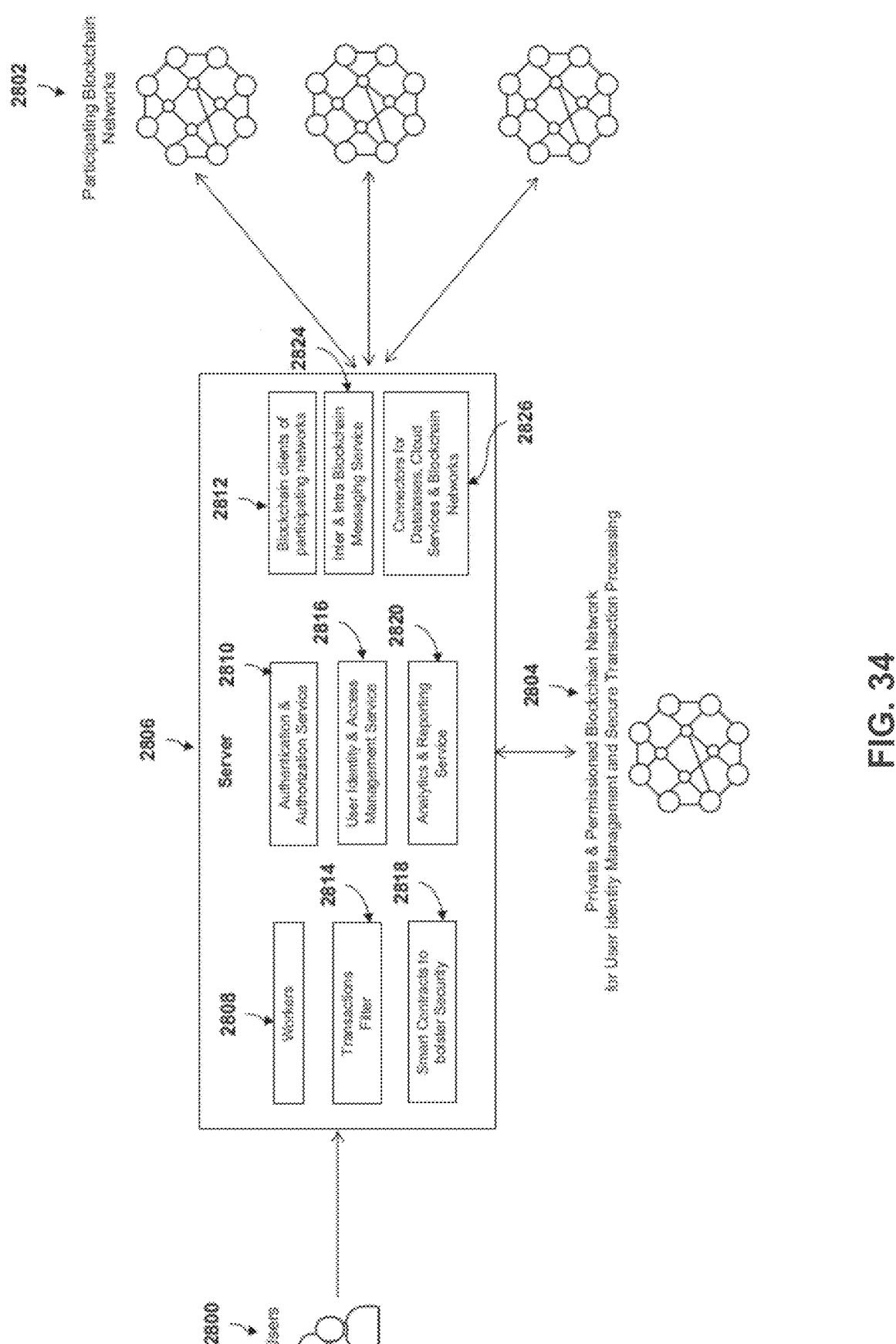
FIG. 34 an illustration of an approach for securing multi-party linked smart contracts where transaction filters are deployed on a server, according to an embodiment of the invention.

Referring now to FIG. 34 an illustration of an approach for securing multi-party linked smart contracts where transaction filters are deployed on a server, is described in more detail. A transactions filter 2814 may be used to filter transactions and block fraudulent and suspicious ones. The transactions filter is software module that is deployed on a server 2806. The server 2806 may contain additional services, such as User Identity & Access Management Service 2816, Authentication & Authorization Service 2810, and Analytics & Reporting Service 2820. The server 2806 may contain further comprise inter- and intra-blockchain messaging services 2824 and connectors for databases, cloud services & blockchain networks 2826. The server 2806 may further comprise Workers 2808 for processing requests and a list of blockchain clients 2812 of participating networks 2802. The server 2806 may further be positioned in communication with private and/or permissioned blockchain network for user identity management and secure transaction processing 2804. The server 2806 may use various smart contracts 2818 to bolster security. These smart contracts may be executed for each request from users 2800 and perform additional verification (such as verifying sender and receiver's address). The smart contracts may enforce checks such as time limits or quantity restrictions. Some smart contracts may perform functions similar to virus filters, for filtering out suspicious transactions. Smart contracts may comprise one or more smart contract functions operable to perform the above-described functions. Some smart contracts may comprise multiple smart contract functions operable to perform functions of varying characteristics, including security functions, filtering functions, analytics functions, and the like. Other smart contracts may comprise a single smart contract function or a plurality of smart contract functions operable to perform a single function. New smart contracts can be distributed to servers in a manner similar to virus updates.

Figure 35:
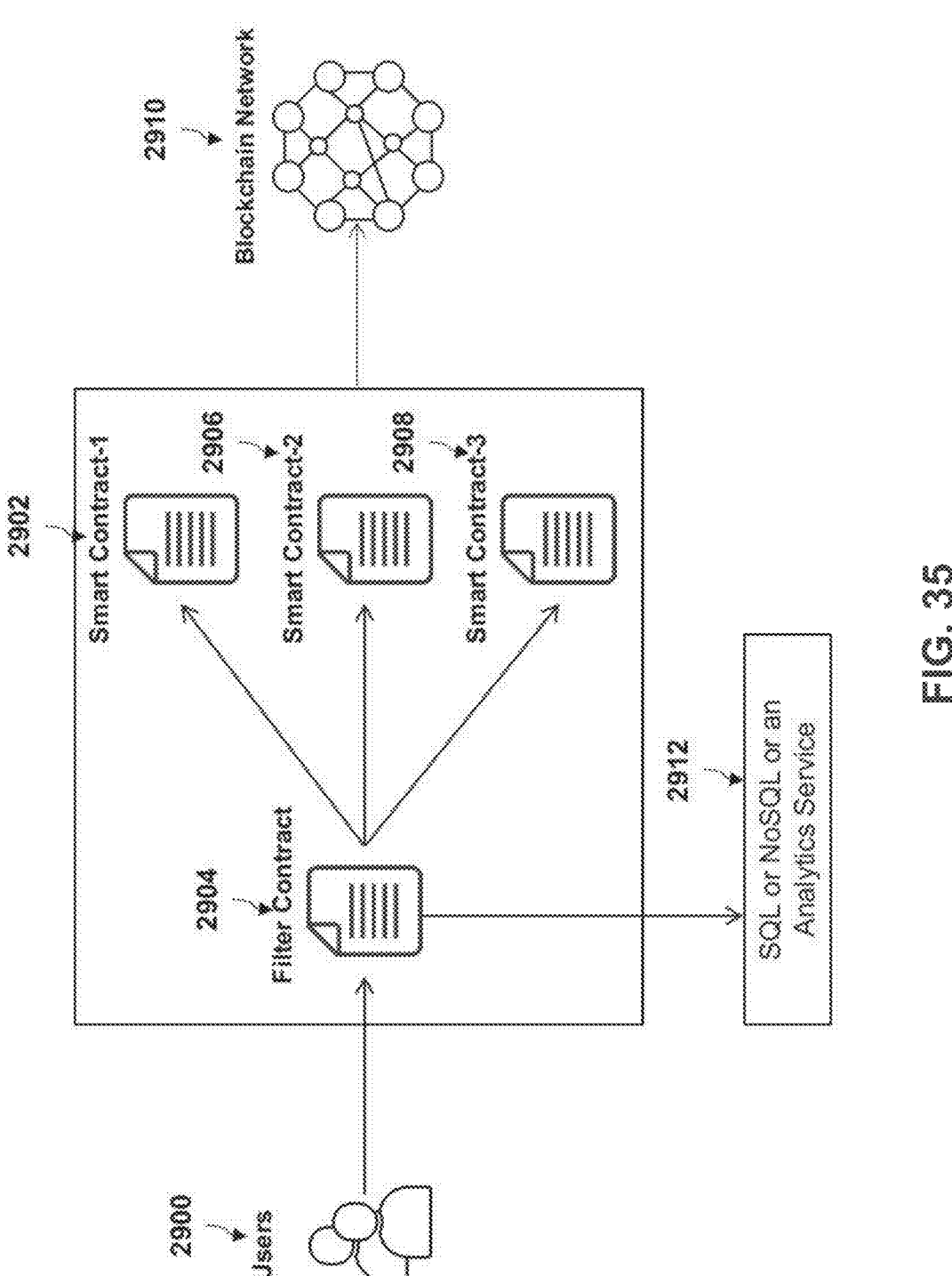
FIG. 35 an illustration of an approach for securing multi-party linked smart contracts where transaction filters are part of a smart contract, according to an embodiment of the invention.

Referring now to FIG. 35 an illustration of an approach for securing multi-party linked smart contracts where transaction filters are part of a smart contract, is described in more detail. A filter smart contract 2904 may receive transfer requests from users 2900 for transfers on a blockchain network 2910 and check the transfer requests for suspicious activities using a filter and report identified suspicious transfer requests them to the SQL or NoSQL or an Analytics Service 2912. Filters can be updated with new smart contracts. Some filters can be used to identify updates and some filters to flag security issues. Filters can block suspicious transactions, freeze funds stolen from smart contracts and even reverse the stolen funds back to the legitimate owners. The filtering approach may be offered as a service to different DeFi applications and smart contracts which can pay per filtered transaction in the form of "Filter Token". The filter contract can be split into different contracts 2902, 2906, 2908 as described in the updates approach in Figure FIG. 33 to ease the process of releasing updated to filters.

In another embodiment, the filtering code can be embedded into the DeFi application smart contract itself (such as a swap contract). The embedded filters can block suspicious transactions, freeze funds of hacker and reverse stolen funds. An external Artificial Intelligence (AI) and Machine Learning (ML) based component can be used for development of filters by learning patterns in transactions. The learned patterns can then be packaged into filters and released as filter updates.

For swaps, a filtering approach can be used to identify the swaps to mark certain swaps as updates of previous ones. A smart contract (the main contract, for example) monitors/ filters new smart contracts that are linked and related to previously recorded smart contracts and reports then to an SQL or NoSQL database.

Figure 36:
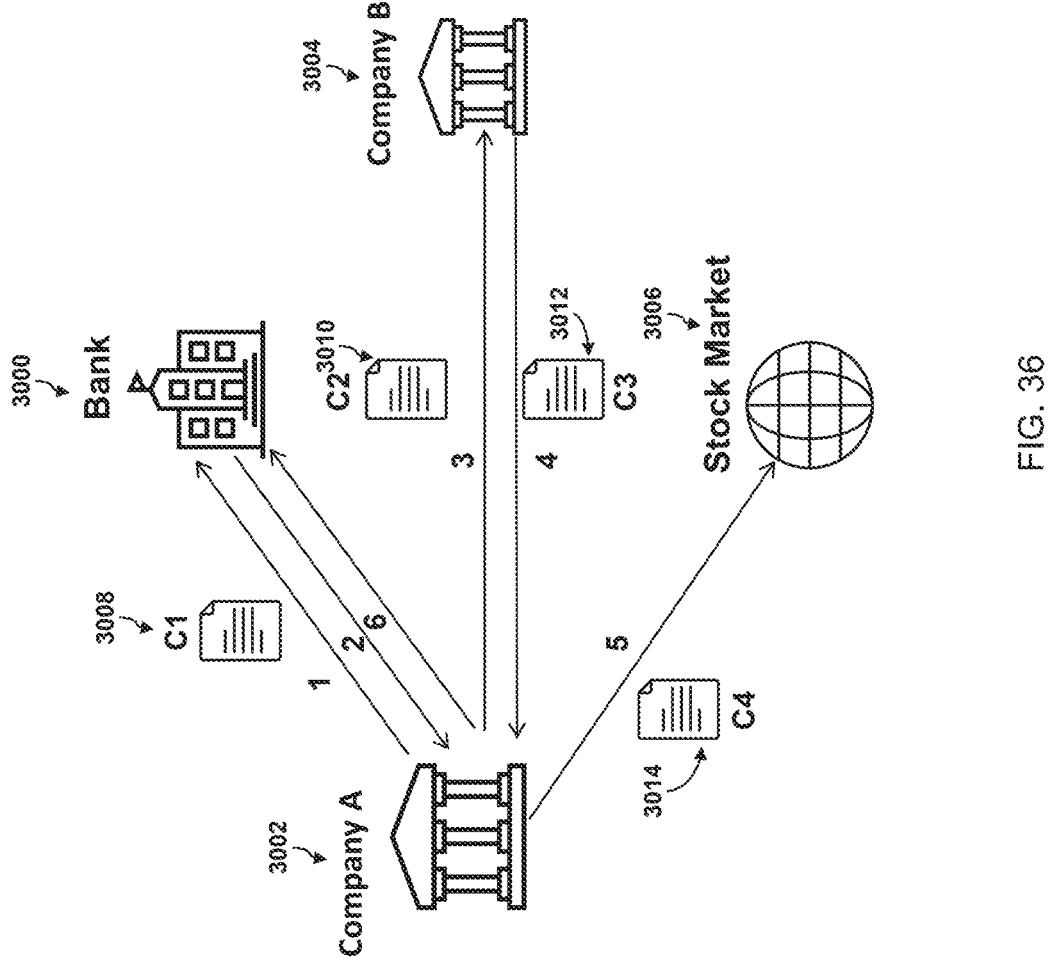
FIG. 36 is an example of how a fraud can be orchestrated through a network of smart contracts, according to an embodiment of the invention.

Referring now to FIG. 36, an illustration of how a fraud can be orchestrated through a network of smart contracts is presented. Companies A and B 3002, 3004 are owned by the same entity but registered separately. Their goal is to artificially inflate the stock price of Company A by "circular trading" or "round-tripping," when identical buy and sell orders are entered at the same time with the same number of shares and the same price. As a result, there is no change in ownership of shares, but there is the appearance of an increased trade volume. At step 1 Company A 3002 creates a smart contract (C1) 3008 to receive a large loan from Bank 3000, using its assets as collateral. At step 2, Company A creates a smart contract (C2) 3010 to provide a line of credit to Company B 3004, which appears unrelated. At step 3, Company B uses the line of credit to purchase Company A's stock as allowed in C2. At step 4, Company B creates a contract (C3) 3012 to purchase a large amount of Company A stock using the line of credit. At step 5, the stock purchase drives up the share price of Company A. At step 6, Company A creates a contract (C4) 3014 to sell its shares, now at an inflated price, to pay back the original loan from the Bank.

Figure 37:
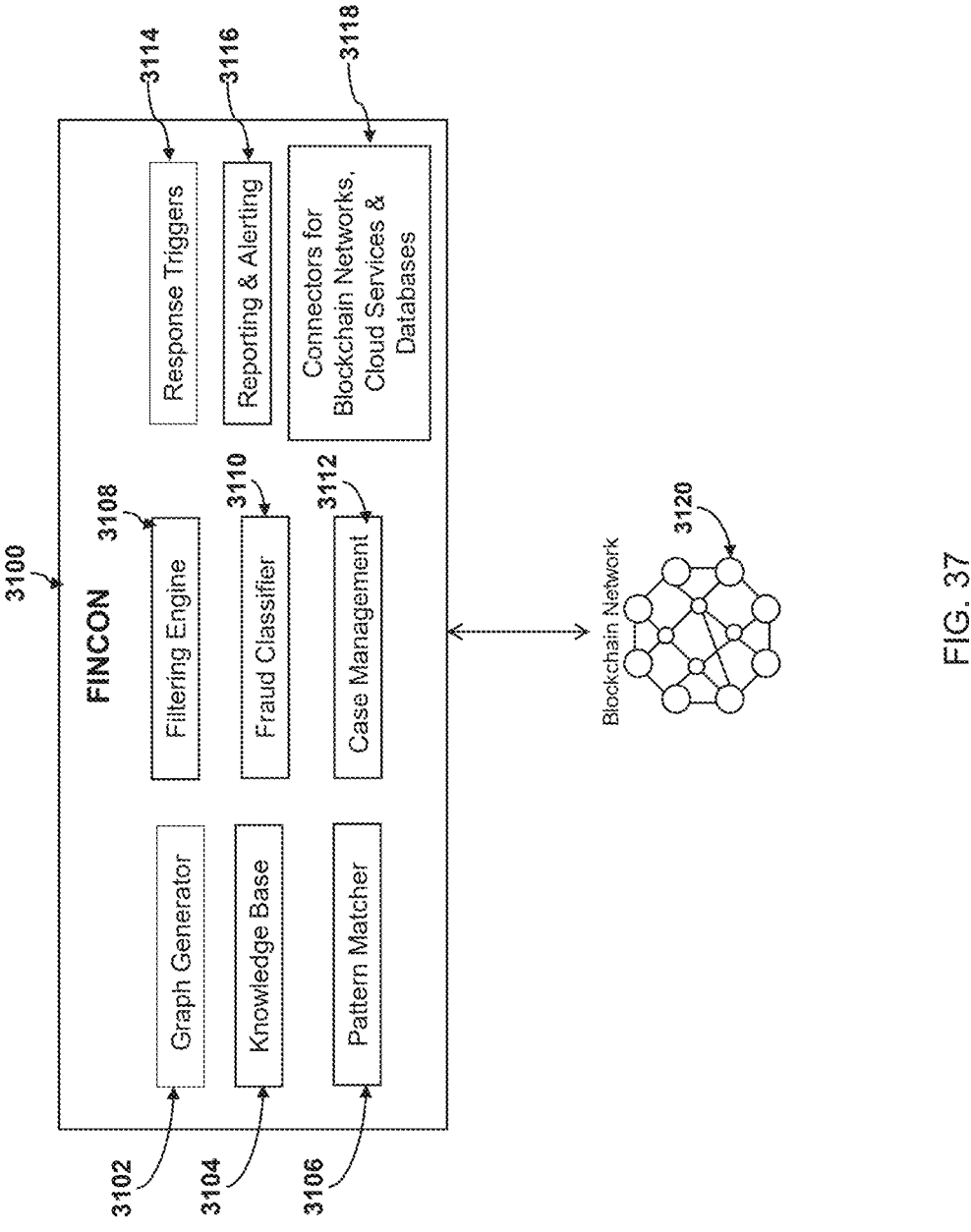
FIG. 37 is an illustration of the architecture of a system for forensic investigations in contract networks, according to an embodiment of the invention.

Referring now to FIG. 37, an illustration of the architecture of a system for forensic investigations in contract networks according to an embodiment of the invention is presented. The figure shows the components of FINCON (Forensic Investigation in Contract Networks), a system 3100 for fraud detection, auditing, and pattern recognition across networks of blockchain smart contracts. The system 3100 comprises the following components:

Graph Generator Module 3102: The graph generator module 3102 is configured to continuously construct a relationship graph between smart contracts (and/or the variables used within them) deployed on a blockchain network 3120 by ingesting new blocks and transactions from the blockchain 3120 and adding contracts as nodes with transactional flows as edges.

Knowledge Base 3104: The knowledge base 3104 stores fraud detection patterns, schemas of known deceptive contract topologies, regulatory policies, and other similar information governing transactions to guide anomaly detection.

Pattern Matcher Module 3106: The pattern matcher module 3106 is configured to execute graph pattern matching functions, search for sub-graphs, and utilize AI/ML models to surface subsets of the contract graph with topologies and activities resembling potential fraud schemes.

Filtering Engine Module 3108: The filtering engine module 3108 comprises targeted smart contracts that scrutinize transactions within sub-graphs flagged as suspicious to gather detailed forensic evidence on the collective activities across contracts. The filtering engine module 3108 if further configured to analyze the data collected by the targeted smart contracts and quantifies a fraud probability for the flagged sub-graphs.

Fraud Classifier Module 3110: The fraud classifier module 3110 is configured to evaluate the filtering results using rule-based scoring, supervised models, and Large Language Models (LLMs) to determine a fraud likelihood, a severity level for each sub-graph, and a type categorization to guide responses to the identified fraud.

Case Management Module 3112: The case management module 3112 is configured to track detected fraud instances, risk levels, affected assets, response actions, data extracts, and evidence packets to enable investigations, data analysis, auditing and reporting.

Response Triggers Module 3114: The response triggers module 3114 comprises scripts that trigger automated on-chain actions to limit detected fraud. Such actions are implemented by transactions on the blockchain network 3120. Types of actions include asset freezes, contract blocking, and transaction reversal based on severity thresholds and platform policies.

Reporting and Alerting Module 3116: The reporting and alerting module 3116 is configured to provide notice about the activities of the system 3100. The module 3116 comprises integration hooks to pass data to external systems for alerts, investigations, preventative screening, and regulatory reporting requirements.

Connectors Module 3118: The connectors module 3118 comprises connectors for blockchain networks, cloud services and databases. It may further include connectors for communicating with bulletin board servers and a GVNS as described in greater detail below.

The system 3100 builds a graph database using the graph generator module 3102, representing the network of relationships between smart contracts on a blockchain. Each smart contract, and in some embodiments the variables comprised thereby, is modeled as a node. Edges are added between nodes if the corresponding contracts interact (for example, by operating on updating variables corresponding to a contracting party), such as transferring funds or assets through fiat or crypto or other means. This converts the set of contracts into a network graph. Transaction activity is continuously monitored to identify new smart contracts as they are added to the blockchain. Each new contract is inserted as a node. Edges are added to reflect transactions with existing contracts. Over time, this builds a comprehensive relationship graph. The knowledge base 3104 maintains fraud patterns, scenarios, and detection rules. These patterns, scenarios, and rules capture known techniques like circular trading, round-tripping, inflated collateral, and hidden beneficial ownership that may be implemented across multiple contracts, as well as any other fraud schemes as may be known in the art. Rules may also encode regulatory policies that cannot be violated. Analytics algorithms within the pattern matcher module 3106 perform pattern matching on the contract graph to detect sub-graphs with topologies and activities that match fraud patterns from the knowledge base. For example, cycles between nodes of certain types may indicate circular trading to artificially boost asset values. Clustering algorithms can also identify closely connected sub-graphs suggestive of coordinated entities. When a high-risk sub-graph is detected, detailed filters within the filtering engine module 3108 are executed to gather forensic evidence by analyzing the transactions and contract logic. For example, tracing asset flows and checking consistency across contracts. Analysis results are recorded to a case management module 3112 data store. Based on the forensic analysis, configurable responses can be activated through blockchain transactions through response triggers module 3114. These may freeze suspicious funds, reverse fraudulent transactions where possible, or deny service. Finally, new fraud patterns identified are fed back into the knowledge base, allowing the system to evolve and improve at detecting emerging techniques. The accumulated forensic evidence provides an audit trail for investigations and regulatory actions.

Figure 38:
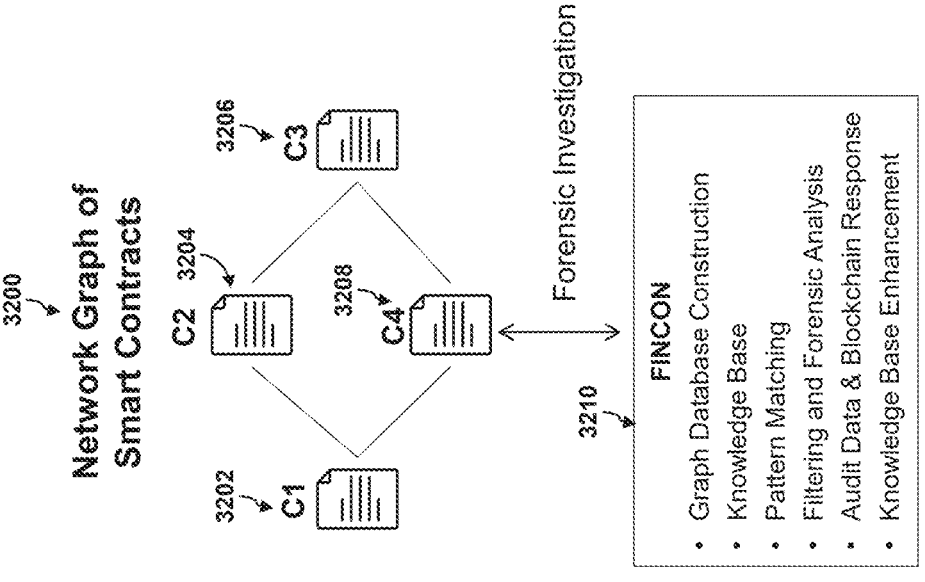
FIG. 38 is an illustration of how FINCON system detects fraud in network of contracts, according to an embodiment of the invention.

Referring now to FIG. 38, an illustration of how FINCON system 3210 detects fraud in network of contracts 3200 is presented. In FIG. 36, an example of how a fraud can be orchestrated through a network of smart contracts, was described. The system 3210 is able to detect such a fraud by the following steps:

Graph Database Construction: As each of the four smart contracts C1 3202, C2 3204, C3 3206 and C4 3208 are added to the blockchain, a node representing the contract is inserted into the graph database. Edges are added based on the flows of assets and funds (referencing by data structures and functions used within the smart contracts), for the credit line transaction. Over time, this creates the cyclic sub-graph pattern.

Knowledge Base: The knowledge base within the system 3210 contains templates and rules encoding fraud scenarios and regulatory policies. In this case, it includes a cyclic trading pattern rule specifying transactions between entities to artificially inflate asset values. It also encompasses rules about market manipulation and policies banning hidden beneficial ownership.

Pattern Matching: Analyzing the sub-graph containing the four contracts matches the cyclic trading pattern rule. The sequence of loans, credit lines, and stock purchases forms a cycle indicative of inflated activity referenced by usage of variables, functions, and other data structures within the smart contracts. Clustering identifies Companies A and B as highly interrelated entities.

Filtering and Forensic Analysis: Targeted filtering contracts are executed to scrutinize the transactions and contract logic in detail. Checking the assets in the transactions reveals collateral discrepancies.

Audit Data and Blockchain Response: The forensic analysis provides evidence that Companies A and B are linked and coordinating improper trades. These details are recorded to the case management data store. Additionally, corrective actions can be taken such as reversing the transactions to unwind the fraud and freezing the assets to prevent further illicit activity.

Knowledge Base Enhancement: The discovered pattern of using loan and credit line contracts to enable circular trading for price manipulation is added to the knowledge base. This allows similar future frauds to be detected faster.

Following the above steps, the system 3210 identifies the relationships between contracts revealed by the graph. The system exposes suspicious patterns of activity that warranted closer inspection. Pattern recognition combined with targeted filtering and transaction reversal enable an automated fraud response. Forensic evidence is recorded for investigation of beneficial owners. The detected pattern of using a second company to inflate share price is added to the knowledge base to improve future detection.

Figure 39:
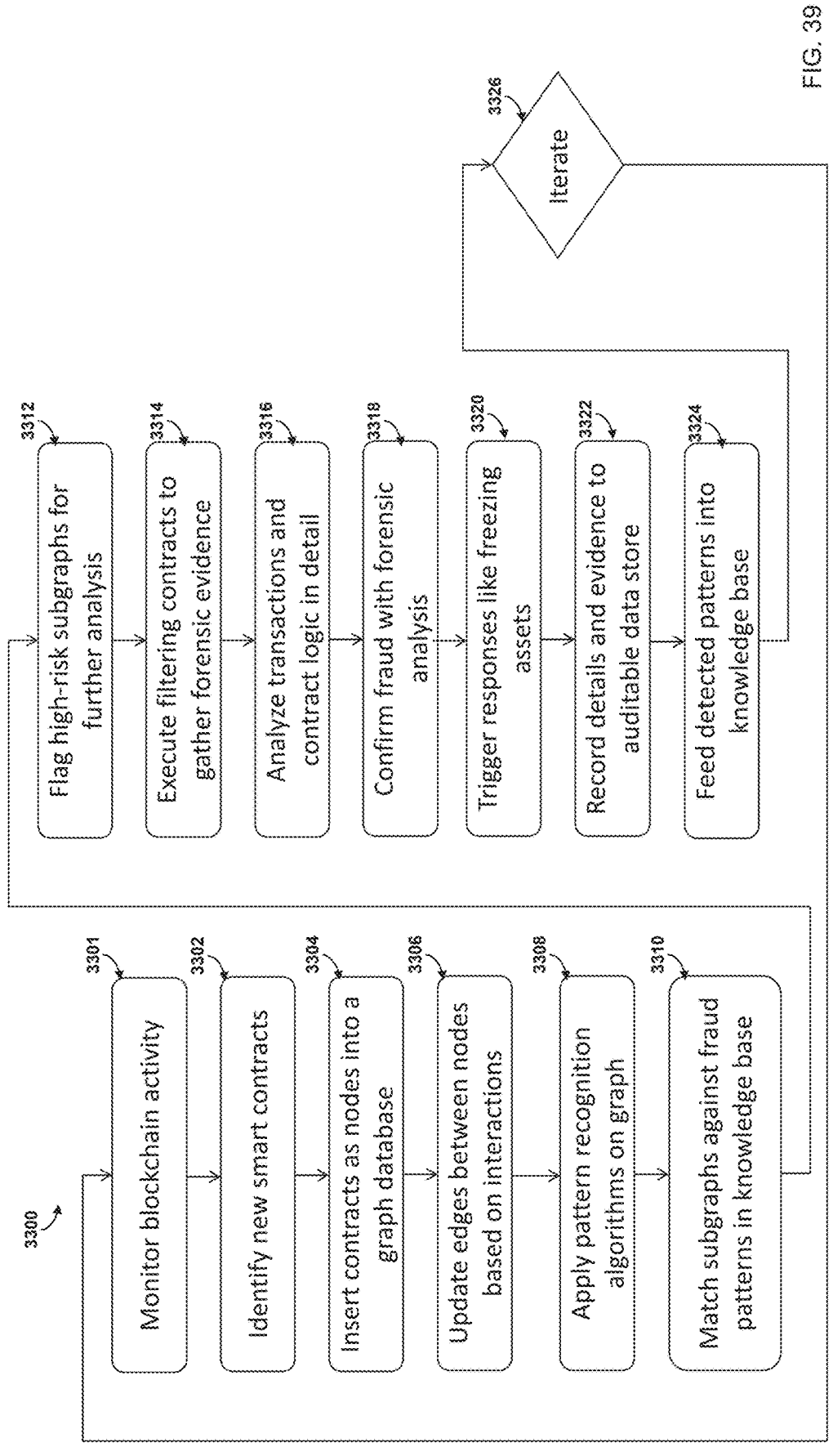
FIG. 39 is an illustration of a flow chart of the FINCON system that detects fraud in network of contracts, according to an embodiment of the invention.

Referring now to FIG. 39, a flow chart illustrating a method 3300 of an embodiments of the invention that detects fraud in networks of contracts is presented. The method 3300 includes the following steps:

Monitor blockchain activity 3301: Continuously observe new blocks added to the blockchain network and scan transactions, smart contracts, state changes, events.

Identify new smart contracts 3302: Recognize smart contracts recently added to the blockchain that are not yet represented in the analysis graph.

Insert contracts as nodes into a graph database 3304: Programmatically extract key structural, data structure, and functional details from the code of each new smart contract and instantiate a corresponding node profile in the contract graph database.

Update edges between nodes based on interactions 3306: Logically link contract nodes if blockchain data indicates transactional flows or informational dependencies between them, modeling ongoing relationships over time.

Apply pattern recognition algorithms on graph 3308: Execute graph pattern matching, clustering, statistical, AI/ML models and Large Language Models (LLMs) against the contract graph to recognize sub-graphs whose relationship structure resembles historical fraud schemes.

Match sub-graphs against fraud patterns in knowledge base 3310: Assess similarity levels between potentially risky sub-graphs and codified knowledge base entries detailing templates, signatures, features of confirmed deceptive contract topologies and ecosystems from past detections.

Flag high-risk sub-graphs for further analysis 3312: Designate sub-graphs returned by pattern recognition engines that exceed configured matching thresholds against known fraud profiles for additional investigation.

Execute filtering contracts to gather forensic evidence 3314: Dispatch targeted inspection contracts to selectively extract details of transactions, data consistency, contract logic flows, and user behavior within suspect sub-graph components necessary to quantify fraud probabilities.

Analyze transactions and contract logic in detail 3316: Scrutinize filtered outputs to catalog discrepancy types, deception indicators, suspicious behaviors, regulatory violations, and fraud harms instantiated across the sub-graph contracts.

Confirm fraud with forensic analysis 3318: Combine results of multi-level analyses to determine a consolidated fraud risk score across relevant severity dimensions, accompanied by supporting evidence chains.

Trigger responses like freezing assets 3320: If the fraud risk score exceeds a threshold value, programmatically dispatch blockchain transactions to enact smart-contract mediated actions that protect users and mitigate losses.

Record details and evidence to auditable data store 3322: Archive forensic confirmation packages detailing detected fraud patterns, affected assets, investigative outputs, and corrective actions.

Feed detected patterns into knowledge base 3324: Continually expand the knowledge base of deceptive contract graph templates with new fraud patterns identified by the system, lowering costs to recognize future variant schemes.

Iterate the above steps for continual detection and improvement 3326: Autonomously repeat detection sequences in ongoing background threads, integrating new contracts and relationships to systematically expand scrutiny over time.

Figure 40:
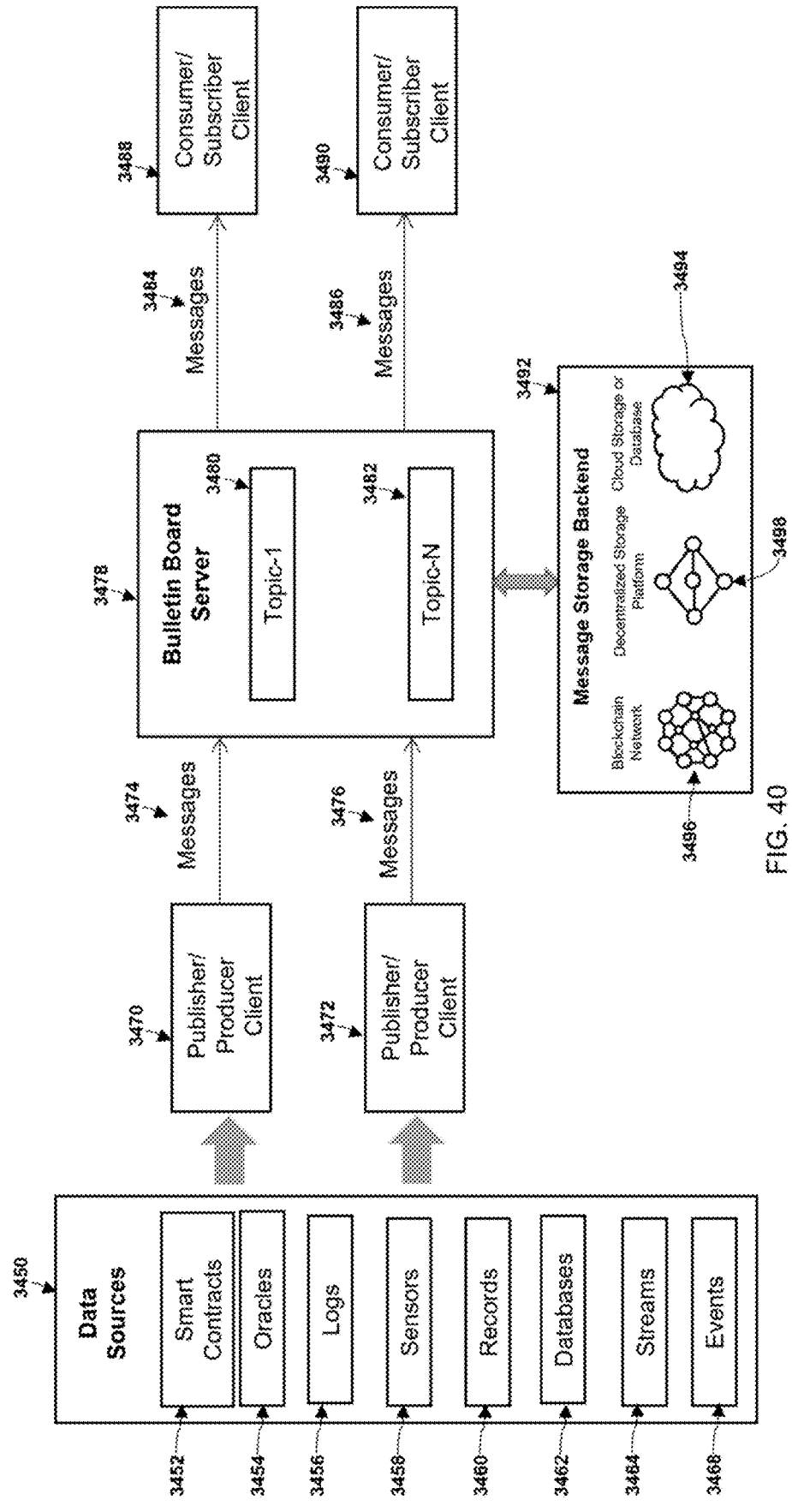
FIG. 40 is an illustration of a distributed messaging framework, according to an embodiment of the invention.

Referring now to FIG. 40 an illustration of a distributed messaging framework according to an embodiment of the invention is presented. The distributed publish-subscribe messaging framework described here is referred to as Bulleting Board Messaging Framework (BBMF) or "Bulletin Board". BBMF is referenced from U.S. Pat. No. 10,460, 283B2 (titled Smart contract optimization for multiparty service or product ordering system) by the same inventors which is incorporated as reference in their entirety. The Bulletin Board Server 3478 manages Topics 3480, 3482. Bulletin Board Clients can be Publisher/Producer Clients 3470, 3472 or Consumer/Subscriber Clients 3488, 3490. The Publisher/Producer Clients 3470, 3472 publish data or messages 3470, 3476 to Topics 3480, 3482. Data pushed to the topics 3480, 3482 from the Publisher/Producer Clients 3470, 3472 may originate from data sources 3450, which may comprise smart contracts 3452, oracles 3454, logs 3456, sensors 3458, records 3460, databases 3462, streams 3464, and events 3468. Consumer/Subscriber Clients 3488, 3490 consume data from the Topics 3480, 3482, receiving messages 3484, 3486 from the Bulletin Board Server 3478. Bulletin Board Server 3478 supports a plug-in Message Storage Backend 3492 to store and replay messages. The Message Storage Backend 3492 persists the messages using two options: (1) a Cloud Database or Cloud Storage 3494, (2) Decentralized Storage Platform (such as IPFS or Swarm) 3498 with regular checkpointing of message hashes to a Blockchain 3496. Messages in the Bulletin Board can be either Ephemeral or Persistent. Ephemeral messages are not stored by the Message Storage Backend. For Persistent messages Time-to-Live (TTL) can be specified. The Producers and Consumers support both Cloud and Blockchain protocols such as HTTP-REST or Web3 for Ethereum. This allows existing Smart Contracts (such as Solidity smart contracts) to publish and consume data to/from the Bulletin board, and existing Oracles to feed-in data from the web to the smart contracts through the Bulletin board. A smart contract implemented in the Solidity language, for example, is a data source which generates notifications in the form of Solidity events which are published to the Bulletin Board server by a Publisher Client. Solidity smart contracts require an external Publisher Client to publish messages to the Bulletin board. Extensions to smart contract languages such as Solidity may be implemented to support Bulletin board APIs to publish data without the need for an external publisher client. These extensions and/or stubs can be through use of pragma directives that may be pre-processed by pre-processors to generate suitable code for implementing the interfaces to the bulletin board, or they could involve extensions to the language itself to support global variable names. Topics are managed in-memory with regular snapshots on the disk which are later stored in the Message Storage Backend 3492. A compaction process is defined for moving the messages in the snapshots to the Message Storage Backend 3492 (Cloud and/or Blockchain). The Bulletin Board itself may be implemented in part through use of a cloud-based service and/or a blockchain and may also include hardware accelerators (such as ASICs or FPGAs) and graphical processing units (GPUs) to provide this high throughput low latency service. Additional redundancy, authorization, and encryption layers may also be provided in hardware and software using known techniques for cloud and internet networks to secure the messages and values stored from system failures or hacking attacks. The BBMF is designed for high throughput and low latency messaging. The Bulletin Board server 3478 can be deployed in a cloud computing environment and scaled either vertically or horizontally based on demand. In vertical scaling larger virtual machine instance size (in terms of compute capacity, memory and storage) is used for the Bulletin Board server. In horizontal scaling multiple instances of the Bulletin Board server are launched with each instance managing a subset of the topics managed by the Bulletin Board. BBMF supports both push/pull and publish/subscribe data ingestion models and data delivery models. Furthermore, the data delivery may be either at least once delivery or exactly once delivery. BBMF can be implemented in hardware and software, using a combination of servers, ASICs/FPGAs and GPUs as part of a cloud-based or a locally configured computing system. As Bulletin Board is a distributed messaging framework, a trade-off exists between consistency and availability. This trade-off is explained with the CAP Theorem, which states that under partitioning, a distributed data system can either be consistent or available but not both at the same time. Bulletin Board adopts an eventually consistent model. In an eventually consistent system, after an update operation is performed by a writer, it is eventually seen by all the readers. When a read operation is performed by a consumer, the response might not reflect the results of a recently completed write operation. The Bulletin Board messaging framework supports prioritized processing of messages. The priority can be set in the message header field. Various priority classes for messages can be defined and specified in the priority header field. This priority classification of messages is crucial for the Peer-to-Pool-Peer (P2P2P) lending system when a large number of updates have to be propagated to linked smart contracts in the lending system.

Figure 41:
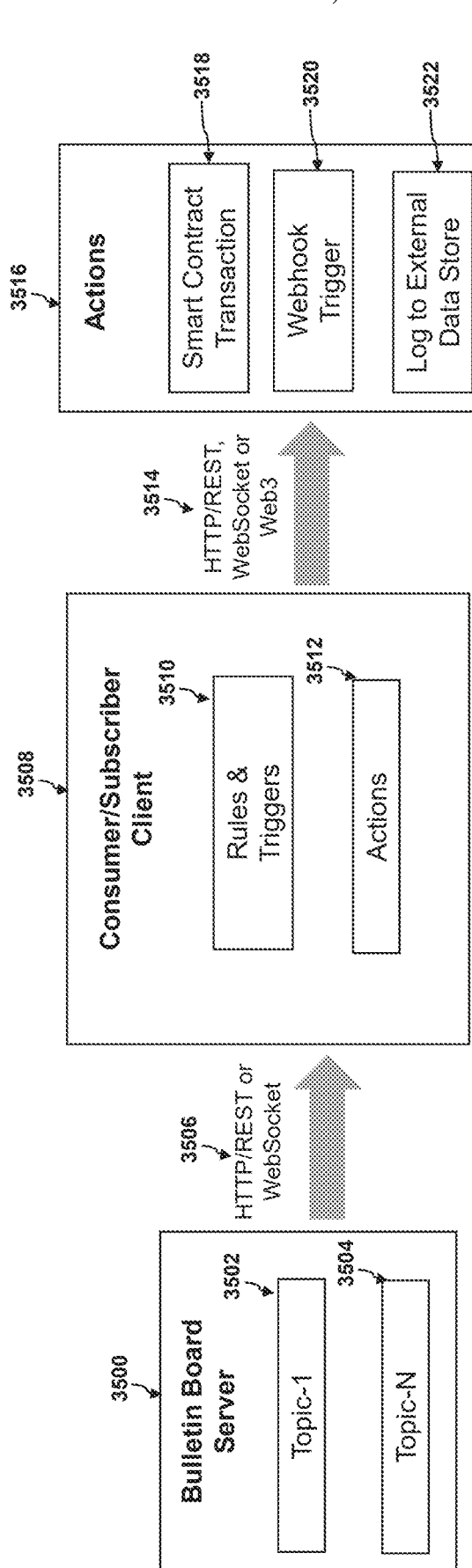
FIG. 41 is an illustration of the consumer/subscriber actions supported in the publish-subscribe messaging framework are described in more detail.

Referring now to FIG. 41 an illustration of the consumer/subscriber actions supported in the publish-subscribe messaging framework are described in more detail. For Consumers or Subscribers 3508 various actions Rules & Triggers 3510 and Actions 3512 can be defined. Rules & Triggers 3512 specify how to filer and select data and trigger actions. The supported actions 3516 include Smart Contract Transaction 3536, Webhook Trigger 3520, Log to External Data Store 3522, Email Notification 3524, SMS Notification 3526, and Mobile Push Notification 3528. An action is performed when a message 3506 matching a rule is received (for example temperature>60 or ETH price<$500) from the Bulletin Board Server 3500, being related to one of the Topics 3502, 3504 managed by the Bulletin Board Server 3500. The message 3514 may be transmitted to the Consumer or Subscriber Client 3508 by any means or method known in the art, including, but not limited to, HTTP/REST applications and WebSocket. Types of actions include, but are not limited to, smart contract transactions 3518, webhook triggers 3520, logging to an external data store 3522, email notification 3524, SMS notification 3526, and push notification 3528. The smart contract transaction action is particularly useful for the P2P2P lending system described above where a large number of linked smart contracts (such as smart contracts in a lending pool) can be executed when a message notifying a change in the lending conditions is received.

Figure 42:
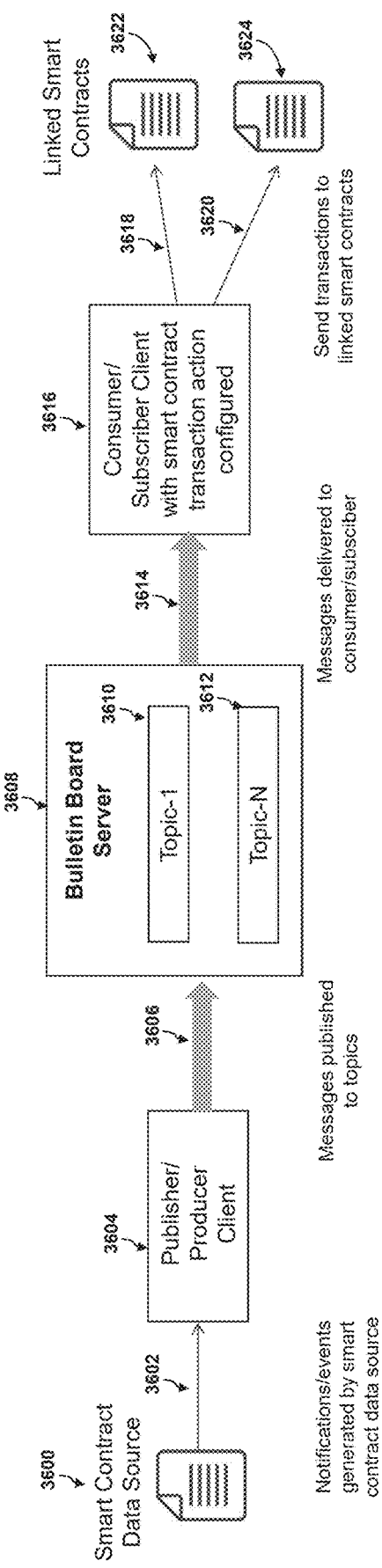
FIG. 42 is an illustration of a smart contract data source that uses an external publisher client to publish messages to the publish-subscribe messaging framework according to an embodiment of the invention.

Referring now to FIG. 42 an illustration of a smart contract data source that uses an external publisher client to publish messages to the publish-subscribe messaging framework is described in more detail. A smart contract data source 3600 such as a Solidity smart contract generates notifications or events 3602. A publisher/producer client 3604 watches for the notifications or events generated by the smart contract 3600. When a notification or event is generated, the messages are published 3606 to the topics 3610, 3612 managed by the Bulletin Board 3608. These messages are delivered 3614 to the consumer/subscriber client 3616 which has subscribed to the topics 3610, 3612. The consumer/subscriber client 3616 has a smart contract transaction action configured which sends transactions 3618, 3620 to the linked smart contracts 3622, 3624 on receiving the messages.

Figure 43:
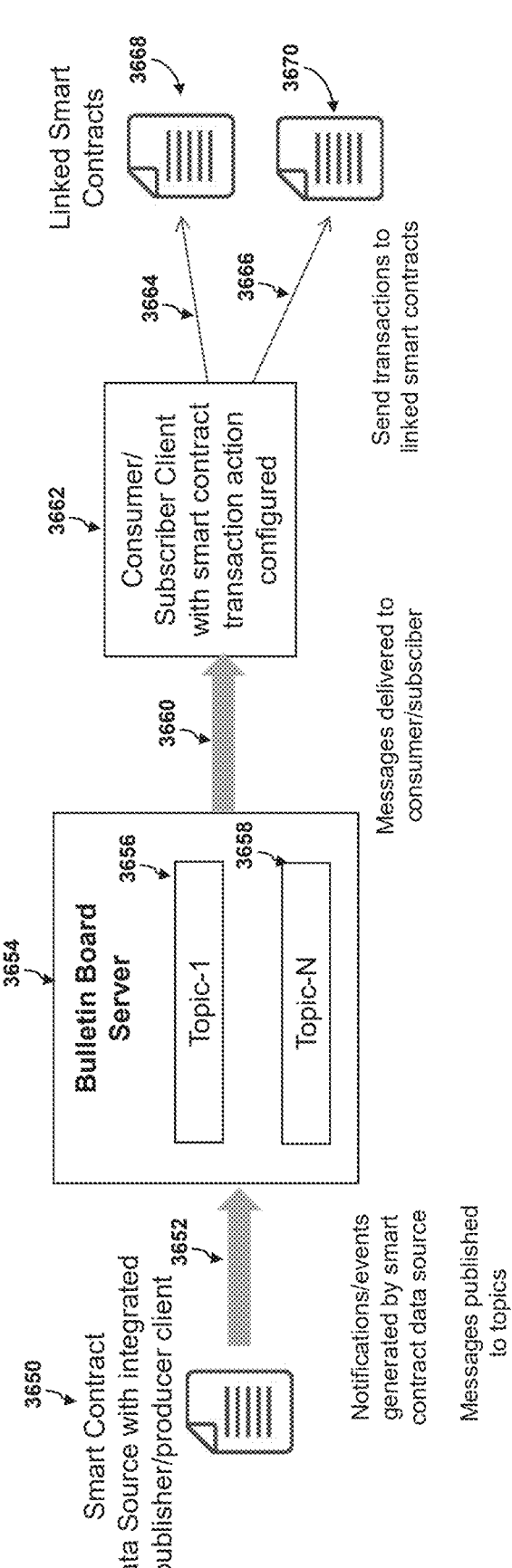
FIG. 43 is an illustration of a smart contract data source that uses an integrated publisher client to publish messages to the publish-subscribe messaging framework, according to an embodiment of the invention.

Referring now to FIG. 43 an illustration of a smart contract data source that uses an integrated publisher client to publish messages to the publish-subscribe messaging framework is presented. A smart contract data source with integrated publisher/producer client 3650 generates notifications or events. The notifications or events are published as messages 3652 to the topics 3656, 3658 managed by the Bulletin Board 3654. These messages are delivered 3660 to the consumer/subscriber client 3662 which has subscribed to the topics 3656, 3658. The consumer/subscriber client 3662 has a smart contract transaction action configured which sends transactions 3664, 3666 to the linked smart contracts 3668, 3670 on receiving the messages.

Figure 44:
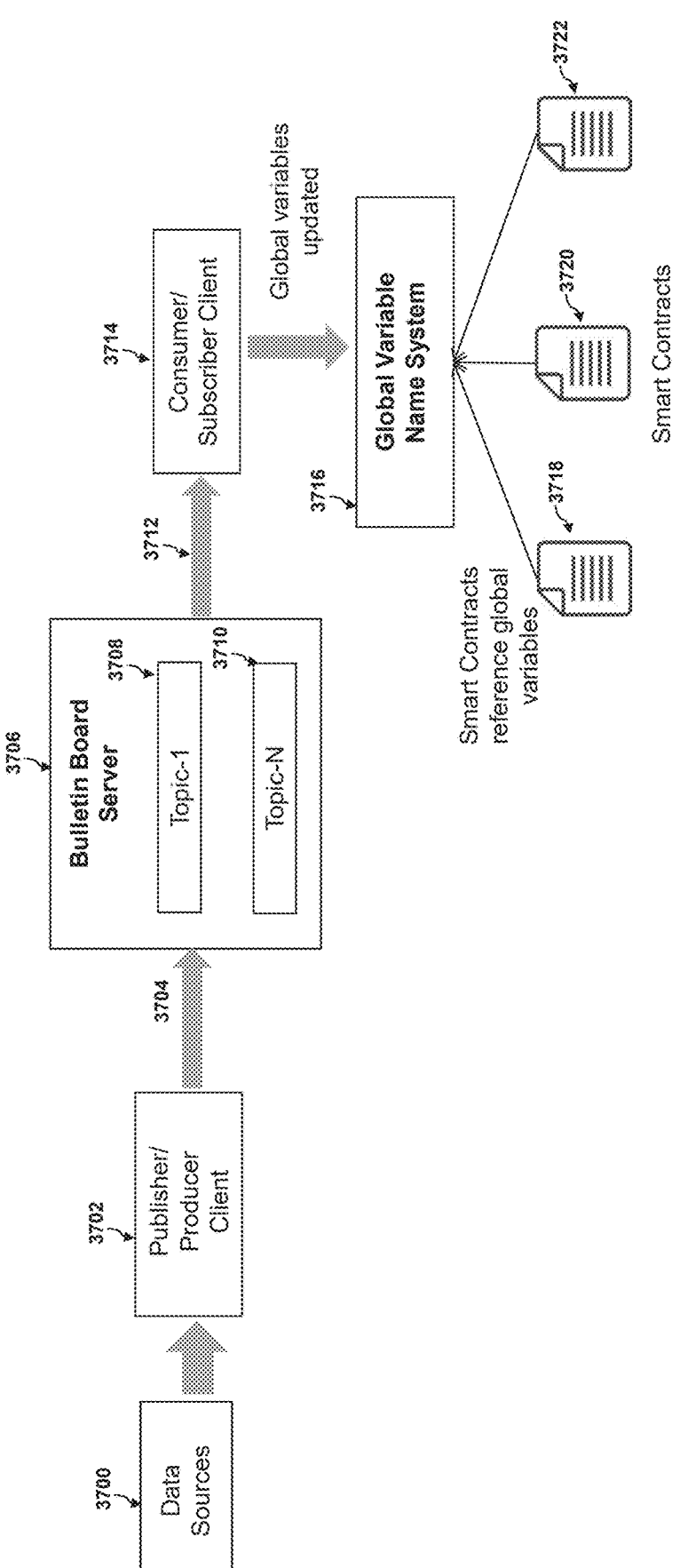
FIG. 44 is an illustration of a global variable name system (GVNS) being updated by a consumer of the publish-subscribe messaging framework, according to an embodiment of the invention.

Referring now to FIG. 44 an illustration of a global variable name system being updated by a consumer of the publish-subscribe messaging framework is presented. A global variable name system referenced from U.S. Pat. No. 10,460,283 (titled Smart contract optimization for multiparty service or product ordering system) by the same inventors which is incorporated as reference in their entirety. The Global Variable Name System (GVNS) 3716 maintains records of global variables and the owners and resolvers for the global variables, in this case over a single blockchain, or across multiple blockchains, as needed. Data sources 3700 such as a smart contract, oracle, log, sensor, record, database, stream or event, produce data or notifications which are sent to a publisher/producer client 3702. The publisher/producer client 3702 publishes the data or notification as a message 3704 to one or more topics 3708, 3710 managed by the Bulletin Board server 3706. The consumer/subscriber client 3714 receives the messages 3712 and updates the value of global variables registered in the GVNS 3716. Smart contracts 3718, 3720, 3722 reference the global variable registered in the GVNS 3716.

Figure 45:
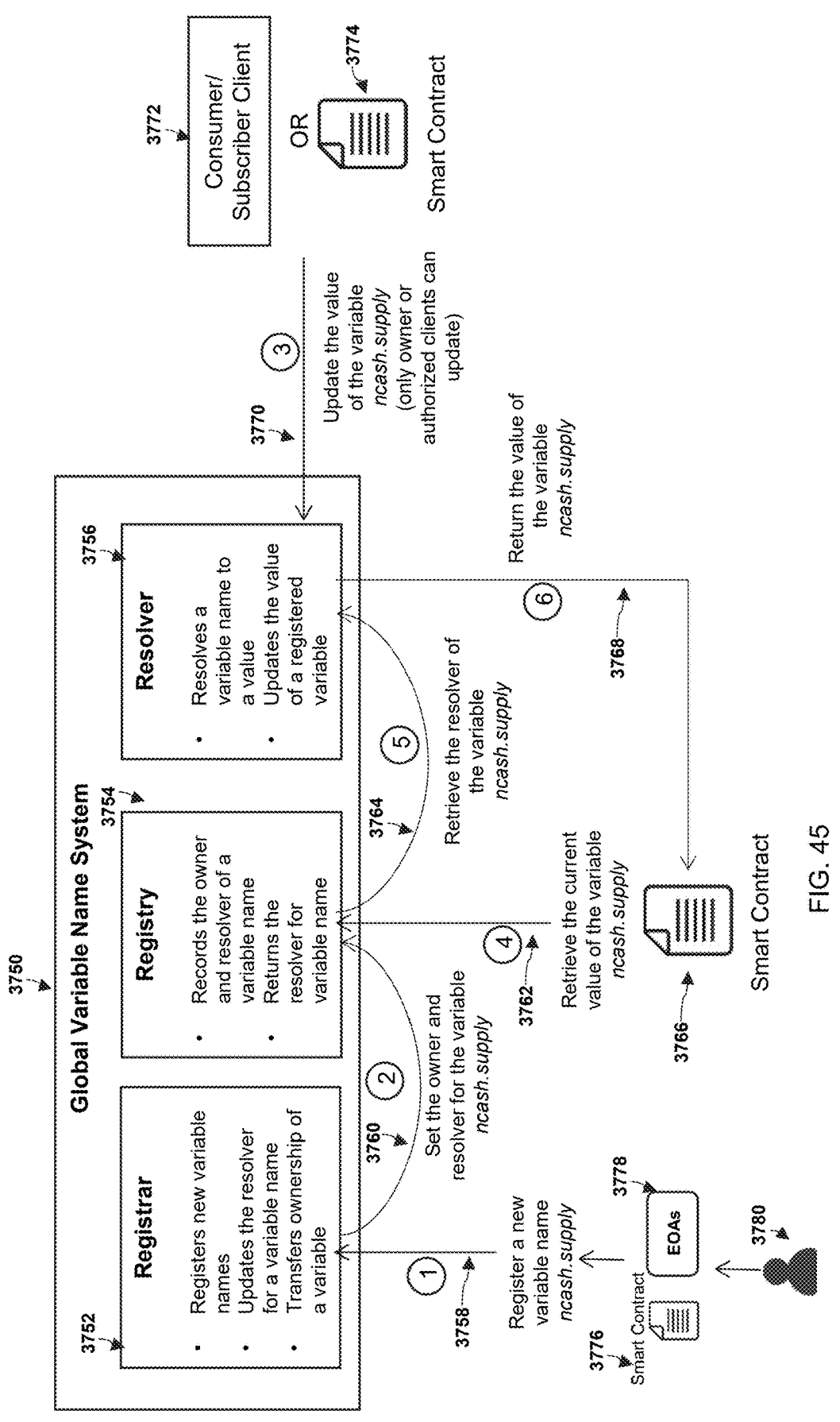
FIG. 45 is an illustration of the architecture of a GVNS, according to an embodiment of the invention.

Referring now to FIG. 45 an illustration of the architecture of a global variable name system, is described in more detail. The GVNS 3750 comprises Registrar 3752, Registry 3754 and Resolver 3756 components. The Registrar 3752 is responsible for registering new variable names, updating the resolver for a variable name, and transferring the ownership of a variable. The Registry 3754 is responsible for recording the owner and resolver of a variable name and returning the resolver for a variable name. The Resolver 3756 is responsible for resolving a variable name to a value and updating the value of a registered variable. The steps involved in registering a global variable in the GVNS 3750, updating the variable and retrieving the current value of the variable are explained as follows. At step 1 3758, a user 3780 sends a request (through an externally owned account 3778 or a smart contract 3776) to register a new global variable name (for example, nCash.supply) to the Registrar 3752. At step 2 3760, the Registrar 3752 sets the owner and resolver for the variable in the Registry 3754. At step 3 3770, a consumer/subscriber client 3772 or a smart contract 3774 sends a request to update the value of the global variable to the Resolver 3756. At step 4 3762, a smart contract 3766 requests the value of the global variable from the Registry 3754. At step 5 3764, the Registry 3754 retrieves the Resolver 3756 for the variable. At step 6 3768, the Resolver 3756 returns the value of the global variable to the smart contract 3766. This operation can span a single blockchain or across multiple blockchains.

Figure 46:
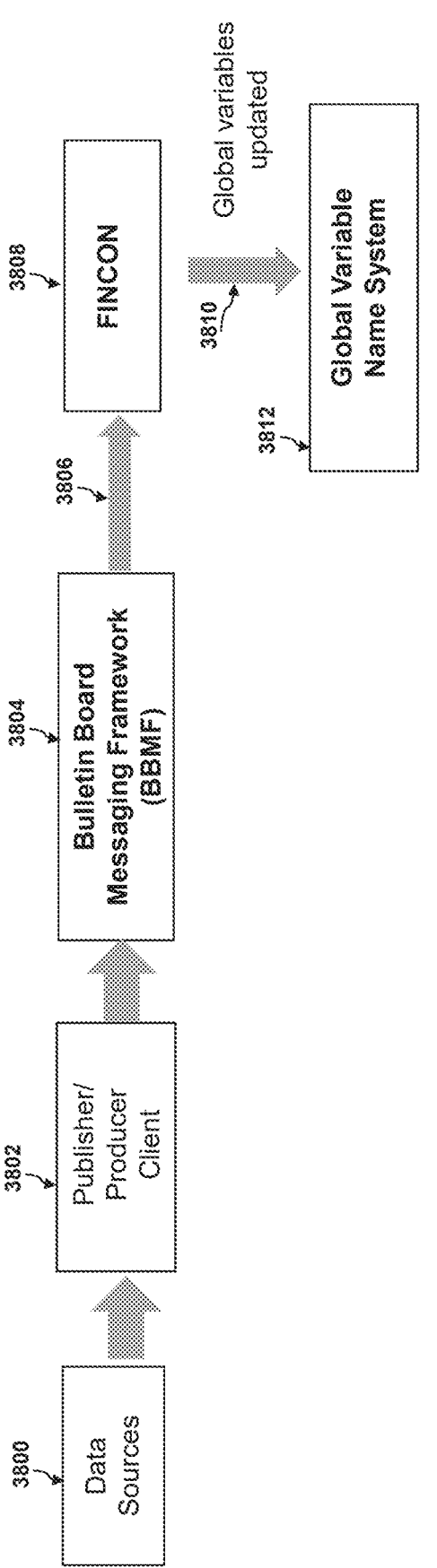
FIG. 46 is an illustration of combining BBMF, GVNS with FINCON, according to an embodiment of the invention.

Referring now to FIG. 46 an illustration of combining BBMF, GVNS with FINCON according to an embodiment of the invention is presented. The figure illustrates how BBMF 3804, GVNS 3812, FINCON 3808 are combined for forensic investigation of contract networks and detecting frauds in a network of smart contracts. FINCON sets up BBMF topics for new smart contracts that are added to the blockchain, or a network of blockchains. As a new smart contract is deployed on a blockchain, a publisher client 3802 sends a message with contract details like code, functions, owner address and other details to this topic. At least one of FINCON graph generator module and the connector module subscribes to this topic. It receives the new contract messages, extracts details, and adds a corresponding node to the contract relationship graph. Similarly, a BBMF topic is created for new transactions occurring between contracts. Publisher clients send messages to this topic with relevant transaction data like sender, receiver, amount transferred whenever transactions happen. The FINCON graph generator subscribes to this topic to get transaction messages 3806. It uses these messages to update the graph with new edges representing the transaction flows between contract nodes. The FINCON pattern matcher subscribes to the transaction topic to initiate analysis on updated contract interactions. BBMF's publish-subscribe model allows easy ingestion of contract and transaction data from multiple sources through a common messaging fabric to keep the relationship graph up-to-date. FINCON components like graph generator and pattern matcher simply need to subscribe to relevant BBMF topics to start receiving live data feeds in a scalable event-driven architecture. In this way, BBMF provides an efficient data ingestion pipeline for the core contract graph components to stay synchronized with blockchain activity through organized message streams rather than having to implement multiple custom interfaces.

The global variables registered in GVNS are used to track key metrics and risk scores associated with smart contracts in the network graph. For example, a "fraud_score" variable could be maintained for each contract. Pattern matcher and filtering engines update these variables in GVNS as fraud likelihoods are calculated for different parts of the graph. Smart contracts are configured to read the GVNS variables, allowing them to check associated fraud scores and react accordingly, like freezing transfers or triggering alerts if their score exceeds a threshold. GVNS provides a standardized interface for contracts to access these shared fraud data variables.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A blockchain value transfer method utilizing a smart contract system on a server for netting transactions comprising:

processing a plurality of transaction requests, each transaction request comprising an intra-chain token value transfer that comprises:
        a sending account address on a blockchain network;
        a receiving account address on the blockchain network; and
        a transaction value based on a quantity of in-network tokens;

performing a balance check procedure on each transaction request based on an aggregation of credits and debits comprising:
        identifying a present permitted transaction amount in in-network tokens for the sending account address;
        determining if the transaction value in in-network tokens is greater than the present permitted transaction amount of the sending account address;
        refusing the transaction request responsive to determining the transaction value exceeds the present permitted transaction amount;
        adding the transaction request to an aggregate transaction record responsive to determining the transaction value does not exceed the present permitted transaction amount;
        updating the present permitted transaction amount of the sending account address reflecting a debit of the transaction value; and
        updating the present permitted transaction amount of the receiving account address reflecting a credit of the transaction value;
    executing smart contract code deployed on the blockchain network to determine, by the smart contract system a net transaction amount for each account address comprised by the aggregate transaction record by aggregating debits and credits across the plurality of transaction requests within a single smart contract execution, with transaction values treated as debits for sending account addresses and credits for receiving account addresses; and
    executing the net transaction amount for each account address by transacting tokens to and from the sending account addresses and receiving account addresses comprised by the plurality of transaction requests, defined as a plurality of account addresses, upon reaching an execution condition, comprising:
        withdrawing an amount of tokens from a first subset of account addresses of the plurality of account addresses having a net transaction amount reflecting a net debit based on a value of the net transaction amount for the account address; and
        depositing an amount of tokens to a second subset of account addresses of the plurality of account addresses having a net transaction amount reflecting a net credit based on a value of the net transaction amount for the account address.

2. The method of claim 1 wherein the execution condition is defined as at least one of transaction completion, a time threshold, a gross transaction amount threshold, a risk tolerance threshold, or a custom condition based on at least one of a transaction volume threshold, a transaction frequency threshold, or a time-based scheduling parameter.

3. The method of claim 2 wherein the execution condition is a custom condition based on at least one of a transaction volume threshold, a transaction frequency threshold, or a time-based scheduling parameter.

4. The method of claim 1 wherein at least one of the sending account or the receiving account is authenticated.

5. The method of claim 1 wherein the smart contract system is operable to add a transaction fee to each token transaction for the account addresses.

6. The method of claim 1 wherein executing the net transaction amount comprises recording a net transaction smart contract to the blockchain network, the net transaction smart contract comprising the account addresses of the plurality of account addresses and the tokens transacted with each account address of the plurality of account addresses.

7. The method of claim 1 wherein:

each transaction request of the plurality of transaction requests is operable to have an associated transaction request smart contract recorded on the blockchain network, defining a plurality of transaction request smart contracts; and each transaction request smart contract is operable to comprise a transaction tax added to the transaction value.

8. The method of claim 1 further comprising, for each refused transaction, re-determining if the transaction value in first in-network tokens is greater than the present permitted transaction amount of the sending account address after at least one of a first time interval and an intervening transaction involving the sending account address, defining a transaction retry, for one or more of a predetermined number of transaction retry attempts or after a second time interval.

9. The method of claim 1 wherein the smart contract system comprises one or more of:

a server comprising one or more workers operable to process value transfer transaction requests and execute commands;

a smart contract recorded to the blockchain network comprising:

each account address of the plurality of account addresses; and the tokens transacted with each of account address of the plurality of account addresses;

a plurality of transaction request smart contracts recorded on the blockchain network, each transaction request smart contract of the plurality of transaction request smart contracts being associated with a transaction request of the plurality of transaction requests; or one or more smart contracts operable to perform additional verification and enforce checks on the plurality of transaction requests.

10. A blockchain value transfer system comprising:

a processor;

a network communication device positioned in communication with the processor and being operable to transmit and receive digital transmissions across a network; and a non-transitory computer-readable storage medium positioned in communication with the processor and having software stored thereon that, when executed by the processor, is operable to:

process a plurality of transaction requests, each transaction request comprising an intra-chain token value transfer that comprises:

a sending account address on a blockchain network;

a receiving account address on the blockchain network; and a transaction value based on a quantity of in-network tokens;

perform a balance check procedure on each transaction request based on an aggregation of credits and debits comprising:

identifying a present permitted transaction amount in in-network tokens for the sending account address;

determining if the transaction value in in-network tokens is greater than the present permitted transaction amount of the sending account address;

refusing the transaction request responsive to determining the transaction value exceeds the present permitted transaction amount;

adding the transaction request to an aggregate transaction record responsive to determining the transaction value does not exceed the present permitted transaction amount;

updating the present permitted transaction amount of the sending account address reflecting a debit of the transaction value; and updating the present permitted transaction amount of the receiving account address reflecting a credit of the transaction value;

execute smart contract code deployed on the blockchain network to determine, utilizing a smart contract system on a server for netting transactions, a net transaction amount for each account address comprised by the aggregate transaction record by aggregating debits and credits across the plurality of transaction requests within a single smart contract execution, with transaction values treated as debits for sending account addresses and credits for receiving account addresses; and execute the net transaction amount for each account address by transacting tokens to and from the sending account addresses and receiving account addresses comprised by the plurality of transaction requests, defined as a plurality of account addresses, upon reaching an execution condition, by:

withdrawing an amount of tokens from a first subset of account addresses of the plurality of account addresses having a net transaction amount reflecting a net debit based on a value of the net transaction amount for the account address; and depositing an amount of tokens to a second subset of account addresses of the plurality of account addresses having a net transaction amount reflecting a net credit based on a value of the net transaction amount for the account address.

11. The system of claim 10 wherein the execution condition is defined as at least one of transaction completion, a time threshold, a gross transaction amount threshold, a risk tolerance threshold, or a custom condition based on at least one of a transaction volume threshold, a transaction frequency threshold, or a time-based scheduling parameter.

12. The system of claim 11 wherein the execution condition is a custom condition based on at least one of a transaction volume threshold, a transaction frequency threshold, or a time-based scheduling parameter.

13. The system of claim 10 wherein at least one of the sending account or the receiving account is authenticated.

14. The system of claim 10 wherein the smart contract system is operable to add a transaction fee to each token transaction for the account addresses.

15. The system of claim 10 wherein the software, when executed by the processor, is further operable to execute the net transaction amount by recording a net transaction smart contract to the blockchain network, the net transaction smart contract comprising the account addresses of the plurality of account addresses and the tokens transacted with each account address of the plurality of account addresses.

16. The system of claim 10 wherein:

each transaction request of the plurality of transaction requests is operable to have an associated transaction request smart contract recorded on the blockchain network, defining a plurality of transaction request smart contracts; and each transaction request smart contract is operable to comprise a transaction tax added to the transaction value.

17. The system of claim 10 wherein the software, when executed by the processor, is further operable to, for each refused transaction, re-determine if the transaction value in first in-network tokens is greater than the present permitted transaction amount of the sending account address after at least one of a first time interval and an intervening transaction involving the sending account address, defining a transaction retry, for one or more of a predetermined number of transaction retry attempts or after a second time interval.

18. A blockchain value transfer system utilizing a smart contract system on a server for netting transactions comprising:

means for processing a plurality of transaction requests, each transaction request comprising an intra-chain token value transfer that comprises:

a sending account address on a blockchain network;

a receiving account address on the blockchain network; and a transaction value based on a quantity of in-network tokens;

means for performing a balance check procedure on each transaction request based on an aggregation of credits and debits comprising:

identifying a present permitted transaction amount in in-network tokens for the sending account address;

determining if the transaction value in in-network tokens is greater than the present permitted transaction amount of the sending account address;

refusing the transaction request responsive to determining the transaction value exceeds the present permitted transaction amount;

adding the transaction request to an aggregate transaction record responsive to determining the transaction value does not exceed the present permitted transaction amount;

updating the present permitted transaction amount of the sending account address reflecting a debit of the transaction value; and updating the present permitted transaction amount of the receiving account address reflecting a credit of the transaction value;

means for executing smart contract code deployed on the blockchain network to determine, by the smart contract system, a net transaction amount for each account address comprised by the aggregate transaction record by aggregating debits and credits across the plurality of transaction requests within a single smart contract execution, with transaction values treated as debits for sending account addresses and credits for receiving account addresses; and means for executing the net transaction amount for each account address by transacting tokens to and from the sending account addresses and receiving account addresses comprised by the plurality of transaction requests, defined as a plurality of account addresses, upon reaching an execution condition, comprising:

withdrawing an amount of tokens from a first subset of account addresses of the plurality of account addresses having a net transaction amount reflecting a net debit based on a value of the net transaction amount for the account address; and depositing an amount of tokens to a second subset of account addresses of the plurality of account addresses having a net transaction amount reflecting a net credit based on a value of the net transaction amount for the account address.

19. The system of claim 18 wherein the execution condition is defined as at least one of transaction completion, a time threshold, a gross transaction amount threshold, a risk tolerance threshold, or a custom condition based on at least one of a transaction volume threshold, a transaction frequency threshold, or a time-based scheduling parameter.

20. The system of claim 19 wherein the execution condition is a custom condition based on at least one of a transaction volume threshold, a transaction frequency threshold, or a time-based scheduling parameter.

21. The system of claim 19 wherein at least one of the sending account or the receiving account is authenticated.

22. The system of claim 19 wherein the smart contract system is operable to add a transaction fee to each token transaction for the account addresses.

23. The system of claim 19 wherein the means for executing the net transaction amount is further operable to record a net transaction smart contract to the blockchain network, the net transaction smart contract comprising the account addresses of the plurality of account addresses and the tokens transacted with each account address of the plurality of account addresses.

24. The system of claim 19 wherein:

each transaction request of the plurality of transaction requests is operable to have an associated transaction request smart contract recorded on the blockchain network, defining a plurality of transaction request smart contracts; and each transaction request smart contract is operable to comprise a transaction tax added to the transaction value.

25. The system of claim 19 further comprising means for, for each refused transaction, re-determining if the transaction value in first in-network tokens is greater than the present permitted transaction amount of the sending account address after at least one of a first time interval and an intervening transaction involving the sending account address, defining a transaction retry, for one or more of a predetermined number of transaction retry attempts or after a second time interval.

* * * * *